(12) United States Patent
Suenaga et al.

(10) Patent No.: US 6,996,077 B1
(45) Date of Patent: Feb. 7, 2006

(54) SATELLITE BROADCASTING SYSTEM

(75) Inventors: Masashi Suenaga, Zushi (JP); Masaru Oka, Yokohama (JP); Yoichi Koishi, Tokyo (JP); Yukiyoshi Fujimori, Yokohama (JP); Hideo Kikuchi, Kawaguchi (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/147,763

(22) PCT Filed: Jul. 3, 1998

(86) PCT No.: PCT/JP98/03020

§ 371 (c)(1),
(2), (4) Date: Mar. 3, 1999

(87) PCT Pub. No.: WO99/01957

PCT Pub. Date: Jan. 14, 1999

(30) Foreign Application Priority Data

| Jul. 3, 1997 | (JP) | 9-178659 |
| Jul. 3, 1997 | (JP) | 9-178674 |
| Jul. 3, 1997 | (JP) | 9-178676 |
| Jul. 3, 1997 | (JP) | 9-178677 |
| Jul. 3, 1997 | (JP) | 9-178678 |
| Jul. 3, 1997 | (JP) | 9-178679 |

(51) Int. Cl.
*H04B 7/216* (2006.01)

(52) U.S. Cl. .................. 370/320; 370/316; 370/343
(58) Field of Classification Search .......... 370/320, 370/324, 281, 319, 203, 330, 331, 310, 329; 455/13.2–13.4, 12.1, 21, 20, 427, 103, 63, 455/428, 166.1, 186.2, 272, 450; 375/130–134, 375/200–219, 5, 63, 320–322, 270, 301, 375/364, 376; 348/732–734; 342/457, 352; 704/275
See application file for complete search history.

(56) References Cited

U.S. PATENT DOCUMENTS 4,617,674 A * 10/1986 Mangulis et al.
5,099,245 A * 3/1992 Sagey ............... 342/357
5,101,501 A   3/1992 Gilhousen et al.

(Continued)

FOREIGN PATENT DOCUMENTS

| EP | 0 707 389 | * 4/1996 |
| JP | 58-3339 | 1/1983 |
| JP | 58-045286 | 3/1983 |

(Continued)

OTHER PUBLICATIONS

R. De Gaudenzi, et al., IEEE Transactions on Vehicular Technology, vol. 43, No. 2, pp. 194–210, "Analysis of An Advanced Satellite Digital Audio Broadcasting System and Complementary Terrestrial Gap–Filler Single Frequency Network", May 1994.

(Continued)

*Primary Examiner*—Chi Pham
*Assistant Examiner*—Prenell Jones
(74) *Attorney, Agent, or Firm*—Oblon, Spivak, McClelland, Maier & Neustadt, P.C.

(57) ABSTRACT

In a broadcasting receiver, to quickly switch channels of the received multiplexed broadcasting signals at a high response speed to improve the convenience for a viewer, when broadcasting signals of a plurality of channels are to be code-division-multiplexed and broadcasted from a ground broadcasting station (BC1, BC2) to a broadcasting receiver (MS) in a service area via a geostationary satellite (SAT), the broadcasting signals are multiplexed and transmitted after matching the spreading code phase between the channels in the ground broadcasting station (BC1, BC2). Alternatively, the spreading code phase difference between the channels of a CDM broadcasting signal arriving from the ground broadcasting station (BC1, BC2) is detected in the geostationary satellite (SAT), and the broadcasting signal is transmitted to the broadcasting receiver (MS) after matching the spreading code phase between the channels on the basis of the detection result.

168 Claims, 36 Drawing Sheets

U.S. PATENT DOCUMENTS

| | | | | |
|---|---|---|---|---|
| 5,109,390 A | | 4/1992 | Gilhousen et al. | |
| 5,111,209 A | * | 5/1992 | Toriyama | 342/357 |
| 5,140,694 A | * | 8/1992 | Benden | 455/12.1 |
| 5,323,322 A | * | 7/1994 | Mueller et al. | 701/215 |
| 5,422,682 A | * | 6/1995 | Nakade et al. | 348/734 |
| 5,463,656 A | * | 10/1995 | Polivka et al. | |
| 5,469,468 A | * | 11/1995 | Schilling | 375/200 |
| 5,566,168 A | | 10/1996 | Dent | |
| 5,594,490 A | * | 1/1997 | Dawson et al. | |
| 5,657,031 A | * | 8/1997 | Anderson et al. | 343/757 |
| 5,678,175 A | * | 10/1997 | Stuart et al. | 375/63 |
| 5,774,859 A | * | 6/1998 | Houser et al. | 704/275 |
| 5,864,579 A | * | 1/1999 | Briskman | 375/200 |
| 5,901,339 A | * | 5/1999 | Saito | 375/5 |
| 6,091,933 A | * | 7/2000 | Sherman et al. | 455/13.1 |
| 6,236,862 B1 | * | 5/2001 | Erten et al. | 455/501 |
| 6,333,924 B1 | * | 12/2001 | Porcelli et al. | 370/331 |

FOREIGN PATENT DOCUMENTS

| | | | |
|---|---|---|---|
| JP | 6-186996 | 7/1984 | |
| JP | 63-035001 | 2/1988 | |
| JP | 63-108827 | 5/1988 | |
| JP | 3-62630 | 3/1991 | |
| JP | 5-14899 | 1/1993 | |
| JP | 5-14902 | 1/1993 | |
| JP | 5-41683 | 2/1993 | |
| JP | 05-091003 | 4/1993 | |
| JP | 5-152835 | 6/1993 | |
| JP | 6-501309 | 9/1993 | |
| JP | 6-14005 | 1/1994 | |
| JP | 6-85534 | 3/1994 | |
| JP | 6-161496 | 6/1994 | |
| JP | 2-186996 | 7/1994 | |
| JP | 7-142920 | 6/1995 | |
| JP | 7-211102 | 8/1995 | |
| JP | 7-321721 | 12/1995 | |
| JP | 8-98105 | 4/1996 | |
| JP | 8-188123 | 7/1996 | |
| JP | 8-293827 | 11/1996 | |
| JP | 9-36794 | 2/1997 | |
| JP | 09-153844 | 6/1997 | |
| JP | 10-242936 | 9/1998 | |
| KR | 7-23022 | 1/1995 | |
| KR | 1995-0030705 | 11/1995 | |
| KR | 8-8798 | 1/1996 | |
| KR | 1996-0020059 | 6/1996 | |
| KR | 1997-8295 | 5/1997 | |
| KR | 1998-043562 | 9/1998 | |
| WO | WO 97/08852 | * | 3/1997 |

OTHER PUBLICATIONS

E. Russo, Communications, Technical Program, Conference Record, IEEE International Conference, vol. 3, pp. 1468–1474, "Implementation of a Space Diversity System For Kα–Band Satellite Communications", May 23–26, 1993.

J. Goldhirsh, et al., Proceedings of the IEEE, vol. 85, No. 6, pp. 970–980, "Three–Site Space–Diversity Experiment at 20 GHz Using Acts in the Eastern United States", Jun. 1997.

M. Luglio, Digital Satellite Communications, Tenth International Conference, vol. 1, pp. 143–151, "Fade Countermeasures in ka Band: Application of Frequency Diversity to a Satellite System", May 15–19, 1995.

C. W. Bostian, et al., IEEE Transactions on Antennas and Propagation, vol. 38, No. 7, pp. 1035–1038, "Satellite Path Diversity Reception at 11.4 GHz: Direct measurements, Radar Observations, and Model Predications", Jul. 1990.

Son Byonte, Book Publishtion Seijin Company, p. 44 "Broadcast Satellite Engineering", Jan. 10, 1997.

* cited by examiner

GROUND BROADCASTING
STATION TRANSMISSION
TIMING

SATELLITE/BROADCASTING
RECEIVER RECEPTION TIMING

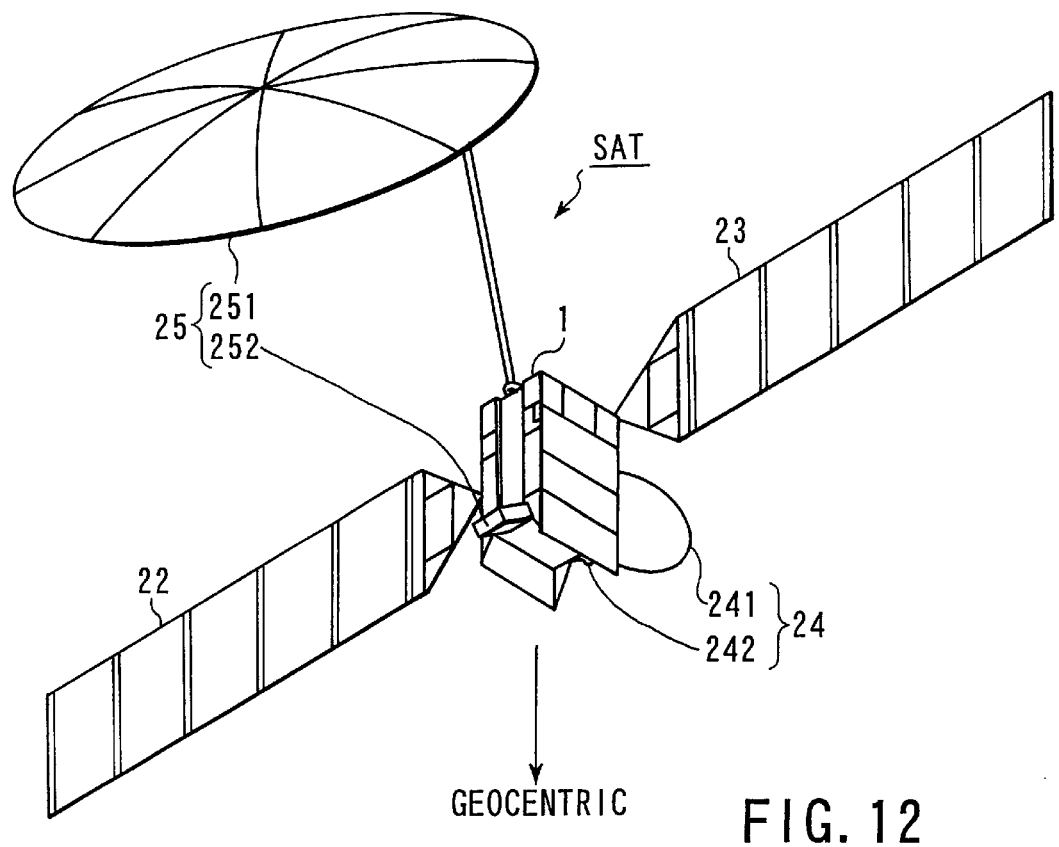
FIG. 12
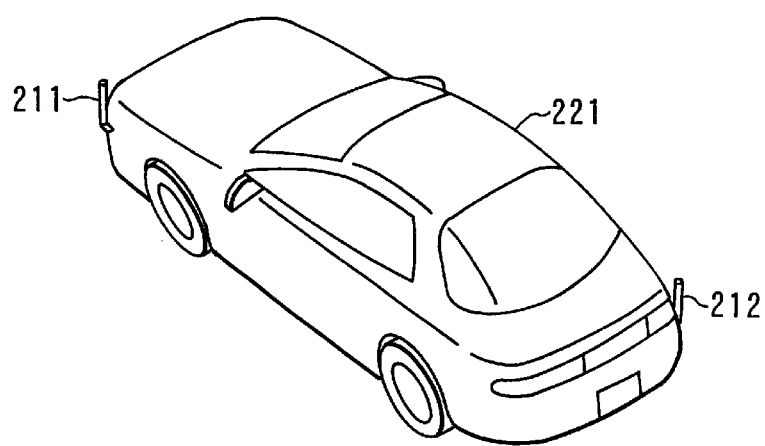
FIG. 14
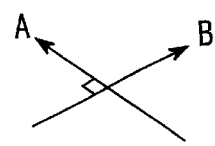

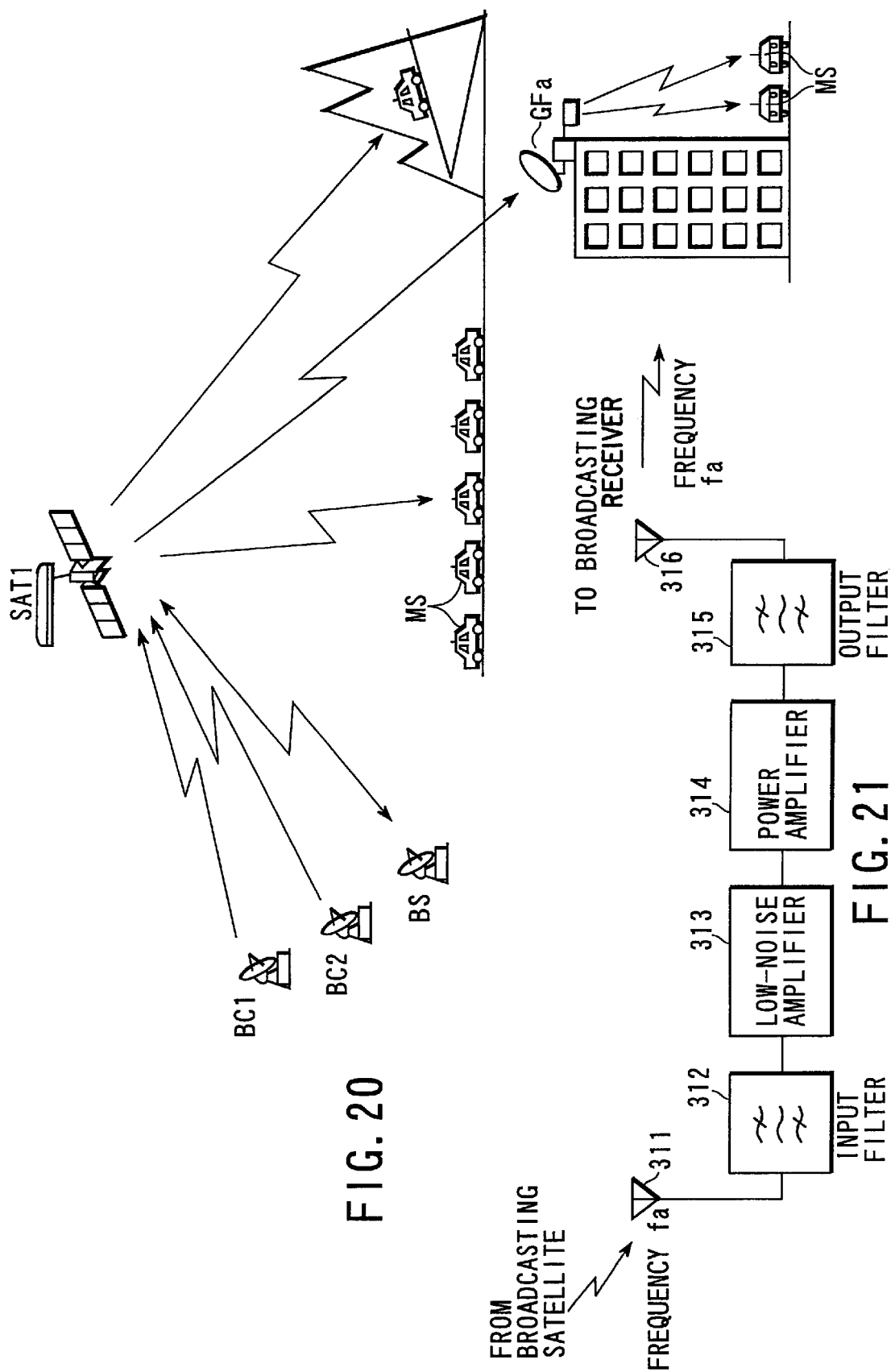

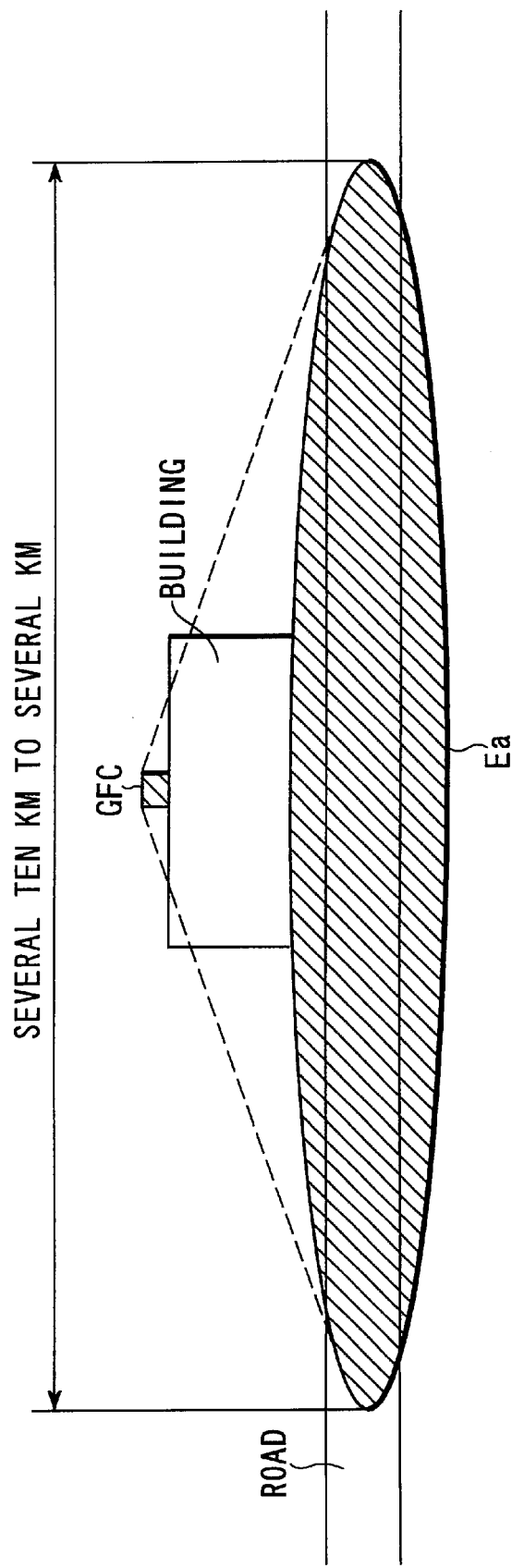
F I G. 24

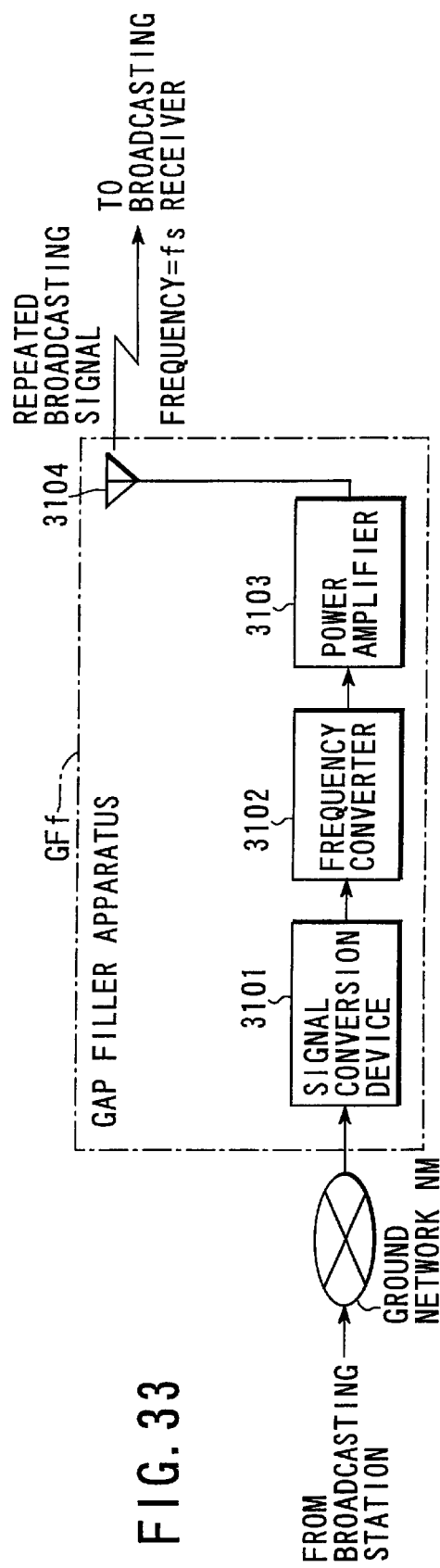
F I G. 33
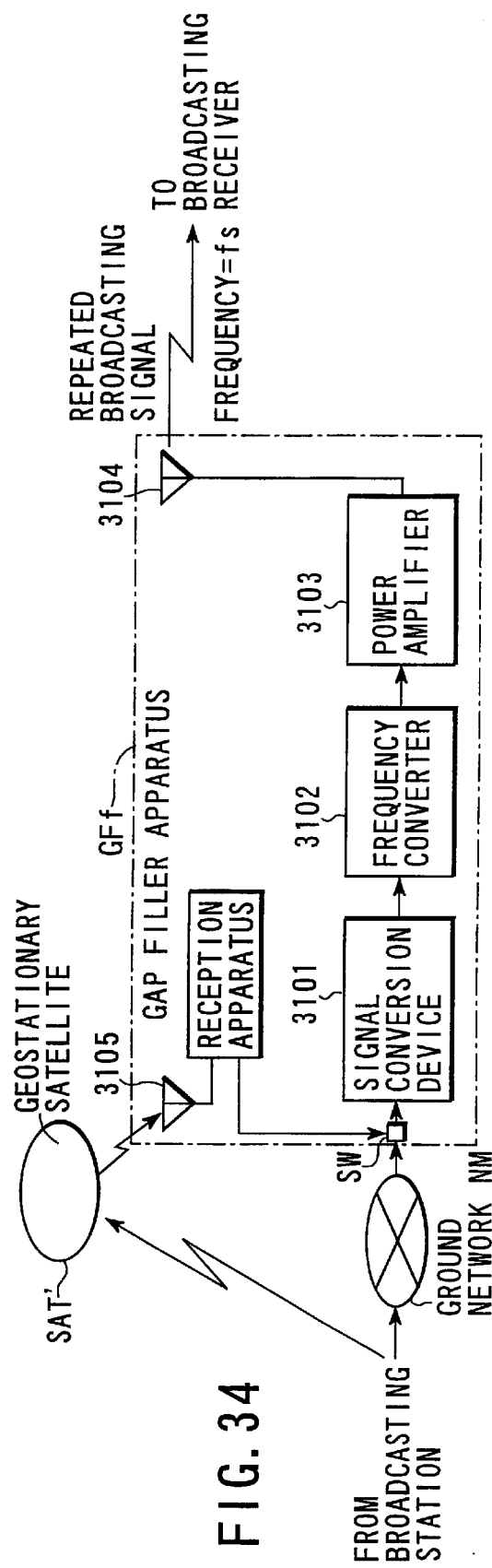
F I G. 34

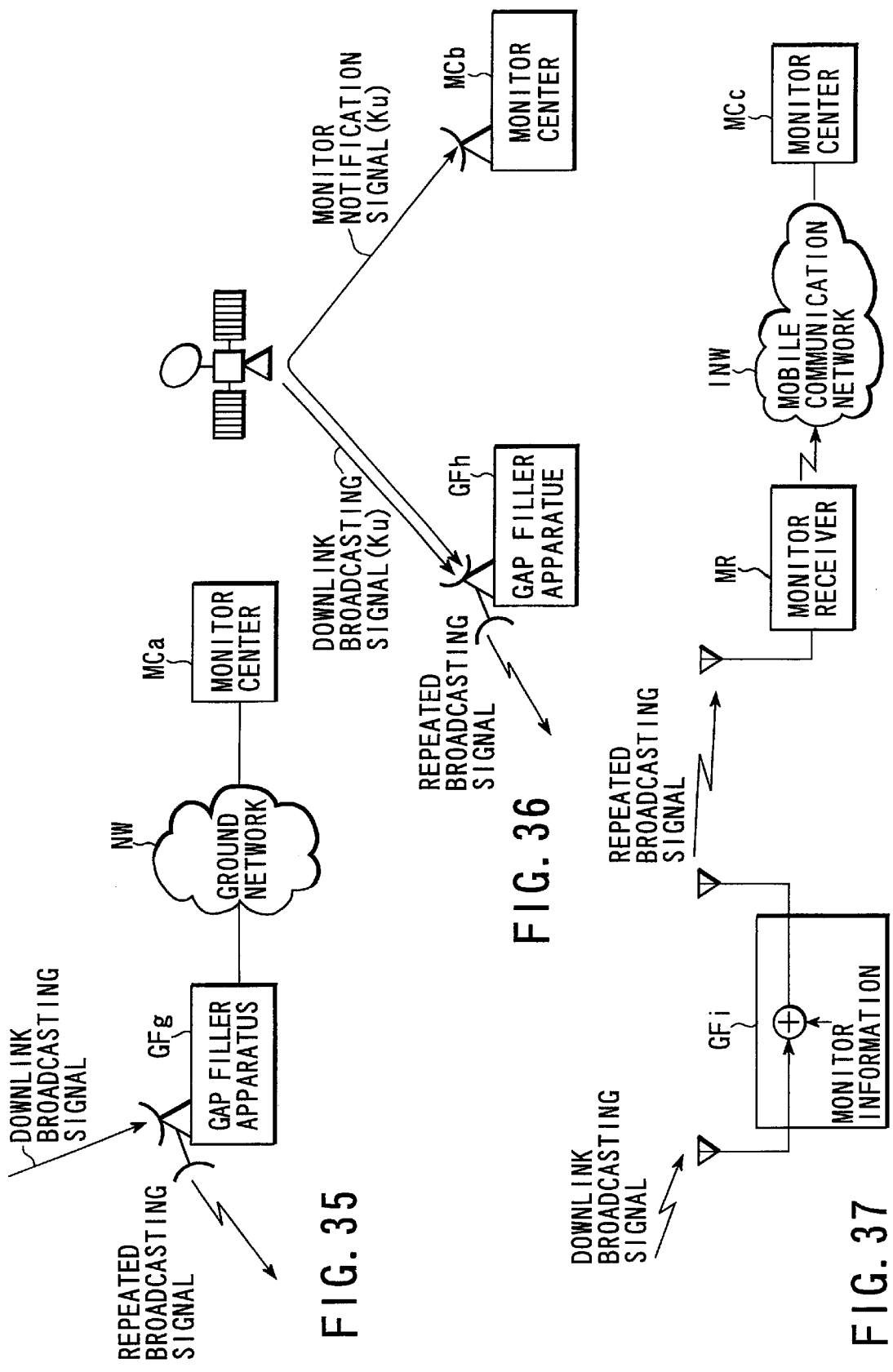

SATELLITE BROADCASTING SYSTEM

TECHNICAL FIELD

The present invention relates to a satellite broadcasting system for broadcasting information such as video, audio, and data to a specific ground service area using a broadcasting satellite or a communication satellite on the geostationary orbit and, more particularly, to a system for multiplexing and broadcasting a plurality of channels by code division multiplex (CDM: Code Division Multiplex).

BACKGROUND ART

In recent years, various communication systems have been developed along with an increase in requirements for communications and progress in communication technologies. One of such communication systems is a satellite broadcasting system using a broadcasting satellite or a communication satellite on the geostationary orbit. The satellite broadcasting system has an advantage that it can provide an information broadcasting service to a wide service area without any large-scale infrastructure on the ground.

A satellite broadcasting system in operation to date is an analog system which multiplexes a plurality of channels by frequency division multiplex (FDM: Frequency Division Multiplex). In a system of this type, however, the degree of channel multiplex per frequency is low, so this system cannot meet a requirement for more channels, which has arisen along with recent advances in multimedia technologies.

Recently, digital satellite broadcasting systems have been extensively studied and developed. In this case, use of, e.g., orthogonal frequency division multiplex (OFDM: Orthogonal Frequency Division Multiplex) or code division multiplex (CDM: Code Division Multiplex) has been examined as channel multiplex schema.

However, these multiplex schema have various problems to be solved before they are applied to the satellite broadcasting system. Especially, CDM requires a time as long as, e.g., ten-odd seconds until the receiver establishes spreading code synchronization for a broadcasting signal. For this reason, the receiver needs a long time from the start to completion of channel switching. The viewers must wait for a long time every time the channel is switched and feel displeased. In some cases, important information may be lost during the channel switching period, and a measure is necessary.

Considering the above problems, a demand has arisen for a satellite broadcasting system which allows the broadcasting receiver to quickly switch the channels for the received multiplexed broadcasting signals at a high response speed, thereby improving the convenience for the viewers.

In Japan, satellite broadcasting systems using a BS (Broadcasting Satellite) and a CS (Communication Satellite) have already been put into practice, and digital broadcasting has also been started. In other countries as well, satellite broadcasting systems of almost the same scale have been developed and put into practice.

However, these satellite broadcasting systems require use of a parabolic antenna having a diameter of about 40 to 50 cm or a planar array antenna almost equal in size as a reception antenna. In addition, unless the antenna is precisely directed to the satellite, no sufficient gain is obtained, and reception is disabled.

These systems assume indoor reception/viewing, so it is hard to provide a satellite broadcasting receiver using a simple antenna system meeting requirements for use on a mobile or use as a portable device. An apparatus meeting these requirements can effectively function as a means for providing urgent information in disasters or the like and its implementation in the near future is awaited.

Various types of satellite broadcasting systems, receivable by a receiver using a simple antenna system, or satellite broadcasting receivers have been proposed to cope with the requirements. However, since these systems or apparatuses use a very high frequency in, e.g., the S band, and radio waves have high linear propagation properties, the radio waves may be shielded by a small obstacle such as an electrical wire in an extreme case. Generally, when the reception terminal is moving, small obstacles frequently enter between the broadcasting satellite and the reception terminal. This repeatedly generates hits a nd largely influences the reception quality.

From this viewpoint, a demand has a risen for a radio receiver, a radio broadcasting system, and a radio broadcasting apparatus capable of minimizing the influence of hits due to obstacles and obtaining a satisfactory reception quality.

A direct wave from the satellite cannot be received in an area behind buildings. To solve this problem, conventionally, a public antenna having a large diameter is arranged on the rooftop of a high-rise building or a pylon. The radio signal from the satellite is received and amplified by this public antenna. This received radio signal is distributed to the receivers of users behind buildings through coaxial cables or optical cables. With this arrangement, users behind buildings, who cannot receive the radio signal from the satellite, can also completely receive transmission information from the satellite.

However, such a public reception system requires large-scale construction and enormous cost because cables must be laid to all users. Recently, information transmission using the satellite broadcasting system not only to fixed stations but also to mobile stations has been proposed. In this case, users as fixed stations behind buildings can receive information from the satellite through the above-described public reception system. However, mobile stations behind the buildings cannot receive information from the satellite because no coaxial cables or optical cables can be laid to the mobile stations.

Under the circumstance, a demand has arisen for a satellite broadcasting system capable of making not only a fixed station but also a mobile station in an area behind buildings, where a radio signal from the satellite cannot be directly received, properly receive the radio signal without preparing large-scale equipment, thereby realizing an inexpensive and effective gap filler, and a gap filler apparatus therefor.

In satellite broadcasting systems of any types, when the number of broadcasting channels is increased, the output requirement for a repeater-side power amplifier on the satellite becomes high accordingly, so it is difficult to require an increase in number of broadcasting channels.

In view of the foregoing, a demand has arisen for a satellite broadcasting system and a reception terminal, which can easily increase the number of channels with a simple arrangement.

The satellite broadcasting systems require use of a parabolic antenna having a diameter of about 40 to 50 cm or a planar array antenna almost equal in size as a reception antenna. In addition, unless the antenna is precisely directed to the satellite, no sufficient gain is obtained, and reception is disabled. These systems assume indoor reception/viewing, so it is hard to provide a satellite broadcasting receiver using a simple antenna system meeting requirements for use on a mobile or use as a portable device. An apparatus meeting these requirements can effectively function as a means for providing urgent information in disasters or the like and its implementation in the near future is awaited.

Under the circumstance, a demand has arisen for a satellite broadcasting system, receivable by a receiver using a simple antenna system meeting requirements for use on a mobile or use as a portable device, and a satellite broadcasting receiver.

Development of a satellite broadcasting receiver for receiving the above-described satellite broadcasting on a mobile such as an automobile is prevalent recently.

To receive the satellite broadcasting on a mobile such as an automobile, the driver must switch the reception channel in a number of channels, as described above. Since this channel selection operation is cumbersome and distracts the driver from driving, a traffic accident may be caused.

To prevent this danger, various danger prevention methods have been proposed conventionally but any conclusive methods has not appeared. Therefore, a demand has arisen for a satellite broadcasting receiver capable of switching the reception channel without distracting the driver from driving.

Music for stimulating the driver sometimes contributes to prevent driving asleep. However, depending on the degree of fatigue of the driver, monotonous music may make the driver sleep, resulting in an adverse effect. This applies not only to the drivers of automobiles but also to operators steering various mobiles.

From this viewpoint, a demand has arisen for a satellite broadcasting receiver capable of switching the reception channel without distracting the driver of a mobile from driving. Also, a demand has arisen for a satellite broadcasting receiver capable of controlling reception channel switching in accordance with the fatigue state of the driver to prevent a traffic accident.

Accordingly, it is an object of the present invention to provide a satellite broadcasting system allowing a broadcasting receiver to quickly switch the channels of received multiplexed broadcasting signals at a high response speed, thereby improving the convenience for a viewer.

It is another object of the present invention to provide a radio receiver, a radio broadcasting system, and a radio broadcasting apparatus capable of minimizing the influence of hits due to obstacles and obtaining a satisfactory reception quality.

It is still another object of the present invention to provide a satellite broadcasting system capable of making not only a fixed station but also a mobile station in an area behind buildings, where a radio signal from the satellite cannot be directly received, properly receive the radio signal without preparing large-scale equipment, thereby realizing an inexpensive and effective gap filler, and a gap filler apparatus therefor.

It is still another object of the present invention to provide a satellite broadcasting system and a reception terminal, which can easily increase the number of channels with a simple arrangement.

It is still another object of the present invention to provide a satellite broadcasting system capable of receiving a signal by a receiver using a simple antenna system meeting requirements for not only indoor use but also use on a mobile or use as a portable device, and a satellite broadcasting receiver.

It is still another object of the present invention to provide a satellite broadcasting receiver capable of switching the reception channel without distracting the driver of a mobile from driving. It is still another object of the present invention to provide a satellite broadcasting receiver capable of controlling reception channel switching in accordance with the fatigue state of the driver to prevent a traffic accident.

DISCLOSURE OF INVENTION

According to an aspect of the present invention, there is provided a satellite broadcasting system for transmitting a plurality of broadcasting signals of a plurality of channels from a ground broadcasting station, repeating the broadcasting signals with a geostationary satellite, and broadcasting the broadcasting signals to a broadcasting receiver in a predetermined service area on the ground, the ground broadcasting station comprising multiplex means for spreading spectra of the broadcasting signals using different spreading codes in units of channels and synthesizing the broadcasting channels to code-division-multiplex the broadcasting signals of the plurality of channels, and transmitting the broadcasting signals, and transmission synchronization means for setting a phase relationship of the spreading codes between the broadcasting signals of the channels code-division-multiplexed by the multiplex means in a predetermined synchronization state.

According to another aspect of the present invention, there is provided a satellite broadcasting system for transmitting a plurality of broadcasting signals of a plurality of channels from a ground broadcasting station, repeating the broadcasting signals with a geostationary satellite, and broadcasting the broadcasting signals to a broadcasting receiver in a predetermined service area on the ground, the ground broadcasting station comprising multiplex means for spreading spectra of the broadcasting signals using different spreading codes in units of channels and synthesizing the broadcasting channels to code-division-multiplex the broadcasting signals of the plurality of channels, and transmitting the broadcasting signals, and the geostationary satellite comprising phase difference detection means for receiving the code-division-multiplexed broadcasting signals transmitted from the ground broadcasting station and detecting a phase difference of the spreading codes between the channels of the code-division-multiplexed broadcasting signals, and transmission synchronization means for setting a phase relationship of the spreading codes between the channels of the received code-division-multiplexed broadcasting signals in a predetermined synchronization state on the basis of a detection result from the phase difference detection means and transmitting the broadcasting signals to the predetermined service area.

According to still another aspect of the present invention, there is provided a satellite broadcasting system for transmitting a plurality of broadcasting signals of a plurality of channels from a ground broadcasting station, repeating the broadcasting signals with a geostationary satellite, and broadcasting the broadcasting signals to a broadcasting receiver in a predetermined service area on the ground, the ground broadcasting station comprising multiplex means for spreading spectra of the broadcasting signals using different spreading codes in units of channels and synthesizing the broadcasting channels to code-division-multiplex the broadcasting signals of the plurality of channels, and transmitting the broadcasting signals, and phase difference information transmission means for transmitting information representing a phase difference of the spreading codes between the broadcasting signals of the channels, which are multiplexed by the multiplex means, to notify the geostationary satellite of the information, and the geostationary satellite comprising phase difference information reception means for receiving the information representing the phase difference, and transmission synchronization means for setting a phase relationship of the spreading codes between the channels of the received code-division-multiplexed broadcasting signals in a predetermined synchronization state on the basis of the information representing the phase difference, which is received by the phase difference information reception means, and transmitting the broadcasting signals to the predetermined service area.

According to still another aspect of the present invention, there is provided a satellite broadcasting system for transmitting a plurality of broadcasting signals of a plurality of channels from a ground broadcasting station, repeating the broadcasting signals with a geostationary satellite, and broadcasting the broadcasting signals to a broadcasting receiver in a predetermined service area on the ground, the ground broadcasting station comprising multiplex means for spreading spectra of the broadcasting signals using different spreading codes in units of channels and synthesizing the broadcasting channels to code-division-multiplex the broadcasting signals of the plurality of channels, and transmitting the broadcasting signals, and phase difference information transmission means for transmitting information representing a phase difference of the spreading codes between the broadcasting signals of the channels, which are multiplexed by the multiplex means, to notify the broadcasting receiver of the information, and the broadcasting receiver comprising phase difference information reception means for receiving the information representing the phase difference, and reception synchronization means for establishing spreading code synchronization for the channels of the code-division-multiplexed broadcasting signals received via the geostationary satellite, on the basis of the information representing the phase difference, which is received by the phase difference information reception means.

According to still another aspect of the present invention, there is provided a satellite broadcasting system for transmitting a plurality of broadcasting signals of a plurality of channels from a ground broadcasting station, repeating the broadcasting signals with a geostationary satellite, and broadcasting the broadcasting signals to a broadcasting receiver in a predetermined service area on the ground, the ground broadcasting station comprising multiplex means for spreading spectra of the broadcasting signals using different spreading codes in units of channels and synthesizing the broadcasting channels to code-division-multiplex the broadcasting signals of the plurality of channels, and transmitting the broadcasting signals, the geostationary satellite comprising phase difference detection means for receiving the code-division-multiplexed broadcasting signals transmitted from the ground broadcasting station and detecting a phase difference of the spreading codes between the channels of the code-division-multiplexed broadcasting signals, and phase difference information transmission means for transmitting information representing the phase difference of the spreading codes between the broadcasting signals of the channels, which is detected by the phase difference detection means, to notify the broadcasting receiver of the information, and the broadcasting receiver comprising phase difference information reception means for receiving the information representing the phase difference, and reception synchronization means for establishing spreading code synchronization for the channels of the code-division-multiplexed broadcasting signals received via the geostationary satellite, on the basis of the information representing the phase difference, which is received by the phase difference information reception means.

According to still another aspect of the present invention, there is provided a satellite broadcasting system for transmitting a broadcasting signal of at least one channel from each of a plurality of ground broadcasting stations, repeating the broadcasting signals with a geostationary satellite, and broadcasting the broadcasting signals to a broadcasting receiver in a predetermined service area on the ground, each of the plurality of ground broadcasting stations comprising transmission means for spreading spectra of broadcasting signals to be transmitted from a self station using different spreading codes in units of channels and transmitting the broadcasting signals, and the geostationary satellite comprising phase difference detection means for receiving the broadcasting signals of the channels, which are transmitted from the plurality of ground broadcasting stations, and detecting a phase difference of the spreading codes between the broadcasting signals of the channels, and repeat transmission synchronization means for setting a phase relationship of the spreading codes between the channels of the broadcasting signals received from the plurality of ground broadcasting stations in a predetermined synchronization state on the basis of a detection result from the phase difference detection means and transmitting the broadcasting signals to the predetermined service area. There is also provided a satellite broadcasting system for transmitting a broadcasting signal of at least one channel from each of a plurality of ground broadcasting stations, repeating the broadcasting signals with a geostationary satellite, and broadcasting the broadcasting signals to a broadcasting receiver in a predetermined service area on the ground, each of the plurality of ground broadcasting stations comprising transmission means for spreading spectra of broadcasting signals to be transmitted from a self station using different spreading codes in units of channels and transmitting the broadcasting signals, and transmission timing control means for variably controlling a transmission timing of the broadcasting signals to be transmitted by the transmission means in units of channels, and the geostationary satellite comprising phase difference detection means for receiving the broadcasting signals of the channels, which are transmitted from the plurality of ground broadcasting stations, and detecting a phase difference of the spreading codes between the broadcasting signals of the channels, and phase difference information notification means for supplying information representing the phase difference detected by the phase difference detection means to each of the ground broadcasting stations as sources, thereby causing the transmission timing control means to variably control the transmission timing such that the phase difference of the spreading codes between the broadcasting signals of the channels transmitted from the ground broadcasting stations is made zero.

According to still another aspect of the present invention, there is provided a radio receiver carried by a mobile and used in a radio communication system for radio-transmitting a transmission signal modulated by a predetermined modulation scheme for multipath transmission for which both a direct wave and an indirect wave are used, comprising signal synthesis means for synthesizing signals obtained by a plurality of antennas spaced apart from each other, and reception means for receiving a synthesis signal obtained by the signal synthesis means and performing predetermined multipath reception processing. There is also provided a radio receiver used in a radio communication system for radio-transmitting a predetermined transmission signal and carried by a mobile, comprising reception means for demodulating transmission data from the radio-transmitted transmission signal, storage means for storing the transmission data obtained by the reception means at least for a predetermined period, hit detection means for detecting a hit generated in the transmission signal received by the reception means, and compensation means for compensating transmission data corresponding to a transmission signal portion where the hit is detected by the hit detection means, on the basis of the transmission data stored in the storage means.

According to still another aspect of the present invention, there is provided a radio broadcasting system for radio-broadcasting a predetermined transmission signal from a radio broadcasting apparatus to a radio receiver, comprising reception means, arranged in the radio receiver, for demodulating transmission data from the radio-broadcasted transmission signal, delay means, arranged in the radio receiver, for delaying the transmission data obtained by the reception means at least for a predetermined period, hit detection means, arranged in the radio receiver, for detecting a hit generated in the transmission signal received by the reception means, retransmission request means, arranged in the radio receiver, for requesting the radio broadcasting apparatus to retransmit a transmission signal corresponding to a portion where the hit is detected by the hit detection means, retransmission means, arranged in the radio broadcasting apparatus, for transmitting the transmission signal corresponding to the requested portion using a predetermined retransmission channel in response to the retransmission request from the retransmission request means, and compensation means, arranged in the radio receiver, for compensating, in the transmission data delayed by the delay means, transmission data corresponding to the transmission signal portion where the hit is detected by the hit detection means, using transmission data demodulated, by the reception means, from the transmission signal transmitted from the retransmission means in response to the request from the retransmission request means and arriving through the retransmission channel.

According to still another aspect of the present invention, there is provided a radio receiver carried by a mobile and used in a radio broadcasting system for radio-broadcasting a predetermined transmission signal from a radio broadcasting apparatus to the radio receiver, comprising reception means for demodulating transmission data from the radio-broadcasted transmission signal, delay means for delaying the transmission data obtained by the reception means at least for a predetermined period, hit detection means for detecting a hit generated in the transmission signal received by the reception means, retransmission request means for requesting the radio broadcasting apparatus to retransmit a transmission signal corresponding to a portion where the hit is detected by the hit detection means, and compensation means for compensating, in the transmission data delayed by the delay means, transmission data corresponding to the transmission signal portion where the hit is detected by the hit detection means, using transmission data demodulated, by the reception means, from the transmission signal transmitted from the radio broadcasting apparatus in response to the request from the retransmission request means and arriving through a predetermined retransmission channel.

According to still another aspect of the present invention, there is provided a radio broadcasting apparatus used in a radio broadcasting system for radio-broadcasting a predetermined transmission signal from the radio broadcasting apparatus to a radio receiver, comprising means for receiving a retransmission request from the radio receiver, and retransmission means for transmitting a transmission signal of a requested portion using a predetermined retransmission channel in response to the request.

According to still another aspect of the present invention, there is provided a satellite broadcasting system for repeating a broadcasting signal transmitted from a ground broadcasting station with a satellite and broadcasting the broadcasting signal to a predetermined service area on the ground, comprising a gap filler apparatus comprising means for receiving the broadcasting signal repeated by the satellite, and means for radio-transmitting a signal having the same frequency as that of the broadcasting signal transmitted from the satellite, to an area in the service area, where the broadcasting signal from the satellite cannot be received.

According to still another aspect of the present invention, there is provided a gap filler apparatus used in a satellite broadcasting system for transmitting a broadcasting signal to a predetermined service area on the ground via a satellite, comprising a first antenna for receiving the broadcasting signal transmitted from the satellite, a radio circuit section for at least amplifying the broadcasting signal received by the first antenna and outputting a transmission broadcasting signal having the same frequency as that of the received broadcasting signal, and a second antenna for radio-transmitting the transmission broadcasting signal output from the radio circuit section to an area in the service area, where the broadcasting signal from the satellite cannot be received. There is also provided a satellite broadcasting system comprising a first satellite placed in a predetermined orbit to transmit a broadcasting signal sent from a ground broadcasting station to a predetermined service area on the ground, and a second satellite placed in the same orbit as that of the first satellite while being spaced apart from the first satellite by a predetermined distance to synchronously transmit the same broadcasting signal as that transmitted from the first satellite to the service area.

According to still another aspect of the present invention, there is provided a satellite broadcasting system comprising a satellite for repeating a broadcasting signal transmitted from a ground broadcasting station and transmitting the broadcasting signal to a predetermined service area on the ground, a plurality of broadcasting receivers each having a function of receiving and reconstructing the broadcasting signal repeated by the satellite in the service area, and a gap filler apparatus for receiving the broadcasting signal repeated by the satellite and transmitting the received broadcasting signal to an area in the service area, where the broadcasting signal from the satellite cannot be received, wherein the satellite comprises conversion means for converting the broadcasting signal transmitted from the ground broadcasting station into first and second broadcasting signals having different frequencies and radio-transmitting the first and second broadcasting signals, and the gap filler apparatus comprises means for receiving the second broadcasting signal transmitted from the satellite and converting the second broadcasting signal into a third broadcasting signal having the same frequency as that of the first broadcasting signal, and means for radio-transmitting the third broadcasting signal to the area in the service area, where the first broadcasting signal from the satellite cannot be received.

According to still another aspect of the present invention, there is provided a satellite broadcasting system comprising a satellite for repeating a broadcasting signal transmitted from a ground broadcasting station and transmitting the broadcasting signal to a predetermined service area on the ground, a plurality of broadcasting receivers each having a function of receiving and reconstructing the broadcasting signal repeated by the satellite in the service area, and a gap filler apparatus for receiving the broadcasting signal repeated by the satellite and transmitting the received broadcasting signal to an area in the service area, where the broadcasting signal from the satellite cannot be received, wherein the satellite comprises means for repeating a first broadcasting signal transmitted from the ground broadcasting station and a second broadcasting signal having the same contents as those of the first broadcasting signal, and the gap filler apparatus comprises means for receiving the second broadcasting signal transmitted from the satellite and converting the second broadcasting signal into a third broadcasting signal having the same frequency as that of the first broadcasting signal, and means for radio-transmitting the third broadcasting signal to the area in the service area, where the first broadcasting signal from the satellite cannot be received.

According to still another aspect of the present invention, there is provided a satellite broadcasting system for repeating a broadcasting signal transmitted from a ground broadcasting station with a satellite and transmitting the broadcasting signal to a predetermined service area on the ground, comprising ground network transmission means for transmitting, through a ground network, a second broadcasting signal having the same contents as those of a first broadcasting signal transmitted from the ground broadcasting station to the satellite, and a gap filler apparatus for receiving the second broadcasting signal transmitted by the ground network transmission means, converting the received second broadcasting signal into a third broadcasting signal in the same frequency band as that of the broadcasting signal transmitted from the satellite, and radio-transmitting the third broadcasting signal to an area in the service area, where the broadcasting signal from the satellite cannot be received.

According to still another aspect of the present invention, there is provided a satellite broadcasting system for repeating a broadcasting signal transmitted from a ground broadcasting station with a satellite and transmitting the broadcasting signal to a predetermined service area on the ground, comprising another satellite for repeating a second broadcasting signal having the same contents as those of a first broadcasting signal transmitted from the ground broadcasting station to the satellite, and a gap filler apparatus for receiving the second broadcasting signal repeated by the other satellite, converting the received second broadcasting signal into a third broadcasting signal in the same frequency band as that of the broadcasting signal transmitted from the satellite, and radio-transmitting the third broadcasting signal to an area in the service area, where the broadcasting signal from the satellite cannot be received.

According to still another aspect of the present invention, there is provided a satellite broadcasting system for repeating a broadcasting signal transmitted from a ground broadcasting station with a satellite and transmitting the broadcasting signal to a predetermined service area on the ground, comprising ground network transmission means for transmitting, through a ground network, a second broadcasting signal having the same contents as those of a first broadcasting signal transmitted from the ground broadcasting station to the satellite, another satellite for repeating a second broadcasting signal having the same contents as those of a first broadcasting signal transmitted from the ground broadcasting station to the satellite, and a gap filler apparatus for selectively receiving one of the second broadcasting signal transmitted by the ground network transmission means and the second broadcasting signal repeated by the other satellite, converting the received second broadcasting signal into a third broadcasting signal in the same frequency band as that of the broadcasting signal transmitted from the satellite, and radio-transmitting the third broadcasting signal to an area in the service area, where the broadcasting signal from the satellite cannot be received.

According to still another aspect of the present invention, there is provided a gap filler apparatus used in a satellite broadcasting system for repeating a broadcasting signal transmitted from a ground broadcasting station with a satellite and transmitting the broadcasting signal to a predetermined service area on the ground, comprising ground network reception means for receiving, from the ground broadcasting station through a ground network, a second broadcasting signal having the same contents as those of the broadcasting signal transmitted from the ground broadcasting station to the satellite, conversion means for converting the second broadcasting signal received by the ground network reception means into a third broadcasting signal in the same frequency band as that of the broadcasting signal transmitted from the satellite, and transmission means for radio-transmitting the third broadcasting signal obtained by the conversion means to an area in the service area, where the broadcasting signal from the satellite cannot be received.

According to still another aspect of the present invention, there is provided a gap filler apparatus used in a satellite broadcasting system for repeating a broadcasting signal transmitted from a ground broadcasting station with a satellite and transmitting the broadcasting signal to a predetermined service area on the ground, comprising satellite reception means for receiving the broadcasting signal transmitted from the satellite, ground network reception means for receiving, through a ground network, a second broadcasting signal having the same contents as those of the broadcasting signal transmitted from the ground broadcasting station to the satellite, conversion means for converting the second broadcasting signal received by the ground network reception means into a third broadcasting signal in the same frequency band as that of the broadcasting signal transmitted from the satellite, and selective transmission means for selecting one of the broadcasting signal received by the satellite reception means and the third broadcasting signal obtained by the conversion means and radio-transmitting the selected signal to an area in the service area, where the broadcasting signal from the satellite cannot be received.

According to still another aspect of the present invention, there is provided a satellite broadcasting system for repeating a broadcasting signal with a satellite and broadcasting the broadcasting signal to a predetermined service area on the ground, comprising a gap filler apparatus for receiving the broadcasting signal repeated by the satellite and radio-transmitting the received broadcasting signal to an area in the service area, wherein the broadcasting signal from the satellite cannot be received, and a monitor apparatus connected to the gap filler apparatus through a communication line, wherein the gap filler apparatus comprises monitor information transmission means for generating monitor information representing an operation state of a self apparatus and transmitting the monitor information to the monitor apparatus through the communication line, and the monitor apparatus comprises means for receiving the monitor information transmitted from the gap filler apparatus through the communication line, and performing predetermined processing of monitoring the operation state of the gap filler apparatus on the basis of the received monitor information.

According to still another aspect of the present invention, there is provided a satellite broadcasting system for repeating a broadcasting signal with a satellite and broadcasting the broadcasting signal to a predetermined service area on the ground, comprising a gap filler apparatus for receiving the broadcasting signal repeated by the satellite and radio-transmitting the received broadcasting signal to an area in the service area, wherein the broadcasting signal from the satellite cannot be received, a monitor receiver set in the reception disabled area and having a function of receiving the received broadcasting signal transmitted from the gap filler apparatus, and a monitor apparatus connected to the monitor receiver through a communication line, wherein the gap filler apparatus comprises means for generating monitor information representing an operation state of a self apparatus, inserting the monitor information into the received broadcasting signal, and radio-transmitting the broadcasting signal, the monitor receiver comprises means for receiving the received broadcasting signal transmitted from the gap filler apparatus and extracting the monitor information from the received broadcasting signal, means for detecting a reception state of the received broadcasting signal, and means for transmitting the extracted monitor information and detection information of the reception state to the monitor apparatus through the communication line, and the monitor apparatus comprises means for receiving the monitor information and the detection information, which are transmitted from the monitor receiver through the communication line, and performing predetermined processing of monitoring the operation state of the gap filler apparatus on the basis of the received monitor information and detection information.

According to still another aspect of the present invention, there is provided a satellite broadcasting system in which a plurality of channel signals having different center frequencies are transmitted from a transmission station to a satellite placed in a geostationary orbit, and the channel signals are transmitted from the satellite to a service area and received by a reception terminal, the satellite comprising signal reception means for receiving the plurality of channel signals transmitted from the transmission station, classification means for frequency-converting the channel signals received by the reception means and classifying the signals in accordance with frequency positions, polarization setting means for amplifying the channel signals classified by the classification means and then setting, for each channel signal, right circular polarization or left circular polarization in accordance with classification, and signal transmission means for transmitting the channel signals for which polarization is set by the polarization setting means, and the reception terminal comprising reception means for receiving the channel signals transmitted from the signal transmission means, polarization processing means for selecting circular polarization corresponding to selected channels of the channel signals received by the reception means, and channel selection means for selecting a desired channel signal from the channel signals for which circular polarization is selected by the polarization processing means.

According to still another aspect of the present invention, there is provided a satellite broadcasting system in which a plurality of channel signals having different center frequencies are transmitted from a transmission station to a satellite placed in a geostationary orbit, and the channel signals are transmitted from the satellite to a service area and received by a reception terminal, the satellite comprising signal reception means for receiving the plurality of channel signals transmitted from the transmission station, classification means for frequency-converting the channel signals received by the reception means and classifying the signals in accordance with frequency positions, polarization setting means for amplifying the channel signals classified by the classification means and then setting, for each channel signal, vertical polarization or horizontal polarization in accordance with classification, and signal transmission means for transmitting the channel signals for which polarization is set by the polarization setting means, and the reception terminal comprising reception means for receiving the channel signals transmitted from the signal transmission means, polarization processing means for selecting linear polarization corresponding to selected channels of the channel signals received by the reception means, and channel selection means for selecting a desired channel signal from the channel signals for which linear polarization is selected by the polarization processing means.

According to still another aspect of the present invention, there is provided a reception terminal comprising reception means for receiving a plurality of right- or left-circularly polarized channel signals, and channel selection means for selecting circular polarization corresponding to selected channels for the channel signals received by the reception means and outputting the channel signals.

According to still another aspect of the present invention, there is provided a reception terminal comprising reception means for receiving a plurality of vertically or horizontally polarized channel signals, polarization processing means for selecting linear polarization corresponding to selected channels for the channel signals received by the reception means, and channel selection means for selecting a desired channel signal from the channel signals for which linear polarization is selected by the polarization processing means.

According to still another aspect of the present invention, there is provided a satellite broadcasting system for providing digital broadcasting using a geostationary satellite placed in a geostationary orbit above the equator, comprising a reception antenna mounted on the geostationary satellite to receive digital signals of a plurality of channels sent to the geostationary satellite, a signal processing unit mounted on the geostationary satellite to signal-convert the digital signals of the plurality of channels received by the reception antenna, power-amplify the signals, and output the signals, and a transmission antenna mounted on the geostationary satellite and comprising a primary radiator for radiating the digital channels of the plurality of channels output from the signal processing unit and a reflecting mirror for radiating a radio wave radiated by the primary radiator to a specific area to form a transmission beam, the reflecting mirror having a diameter for obtaining a power strength receivable by a receiver for satellite broadcasting in the specific area.

According to still another aspect of the present invention, there is provided a satellite broadcasting receiver for receiving digital broadcasting using a geostationary satellite placed in a geostationary orbit above the equator, comprising a microphone for converting speech of a user into an electrical signal, speech recognition means for recognizing a channel designated by the user from the electrical signal obtained by the microphone, and reception means for receiving, from broadcasting signals transmitted from the geostationary satellite, the channel recognized by the speech recognition means.

According to still another aspect of the present invention, there is provided a satellite broadcasting receiver for receiving digital broadcasting using a geostationary satellite placed in a geostationary orbit above the equator, comprising fatigue state estimation means for detecting a fatigue state of a driver of a mobile on the basis of a moving state of the mobile carrying the satellite broadcasting receiver, and reception means for receiving, from broadcasting signals transmitted from the geostationary satellite, a channel corresponding to the fatigue state detected by the fatigue state estimation means.

According to still another aspect of the present invention, there is provided a satellite broadcasting receiver for receiving digital broadcasting using a geostationary satellite placed in a geostationary orbit above the equator, comprising timepiece means for counting time, view data detection means for detecting a channel received by the satellite broadcasting receiver and a reception time, an interface connectable to a recording medium on/from which data can be written/read, and view data recording control means for recording, on the recording medium connected to the interface, the reception channel and time detected by the view data detection means in correspondence with each other.

BRIEF DESCRIPTION OF DRAWINGS

FIG. 12 is a perspective view showing the outer appearance of a broadcasting satellite SAT in FIG. 11.

FIG. 14 is a perspective view showing an example of antenna set state on a mobile in the seventh embodiment.

FIG. 20 is a schematic view showing a satellite broadcasting system having a gap filler function according to the 10th embodiment of the present invention.

FIG. 21 is a block diagram showing the arrangement of a gap filler apparatus used in the satellite broadcasting system according to the 10th embodiment.

FIG. 24 is a view for explaining coverage of a dead area in the satellite broadcasting system according to the 11th embodiment.

FIG. 33 is a block diagram showing the arrangement of a gap filler apparatus used in the system shown in FIG. 30.

FIG. 33 is a schematic view showing a satellite broadcasting system having a gap filler function according to the 15th embodiment of the present invention.

FIG. 34 is a schematic view showing a modification of the system shown in FIG. 33.

FIG. 35 is a schematic view showing the first arrangement of a satellite broadcasting system having a gap filler function according to the 16th embodiment of the present invention.

FIG. 36 is a schematic view showing the second arrangement of the satellite broadcasting system having the gap filler function according to the 16th embodiment.

FIG. 37 is a schematic view showing the third arrangement of the satellite broadcasting system having the gap filler function according to the 16th embodiment.

FIG. 42 is a view showing the receiver of the reception terminal shown in FIG. 41.

FIG. 52 is a view showing a display example of a selection window of hierarchical reception channels stored in the program data storage area of the satellite broadcasting receiver shown in FIG. 51.

BEST MODE OF CARRYING OUT THE INVENTION

The present invention will be described in more detail with reference to the accompanying drawings.

The first aspect of the present invention will be described throughout the first to sixth embodiments.

(First Embodiment)

Figure 1:
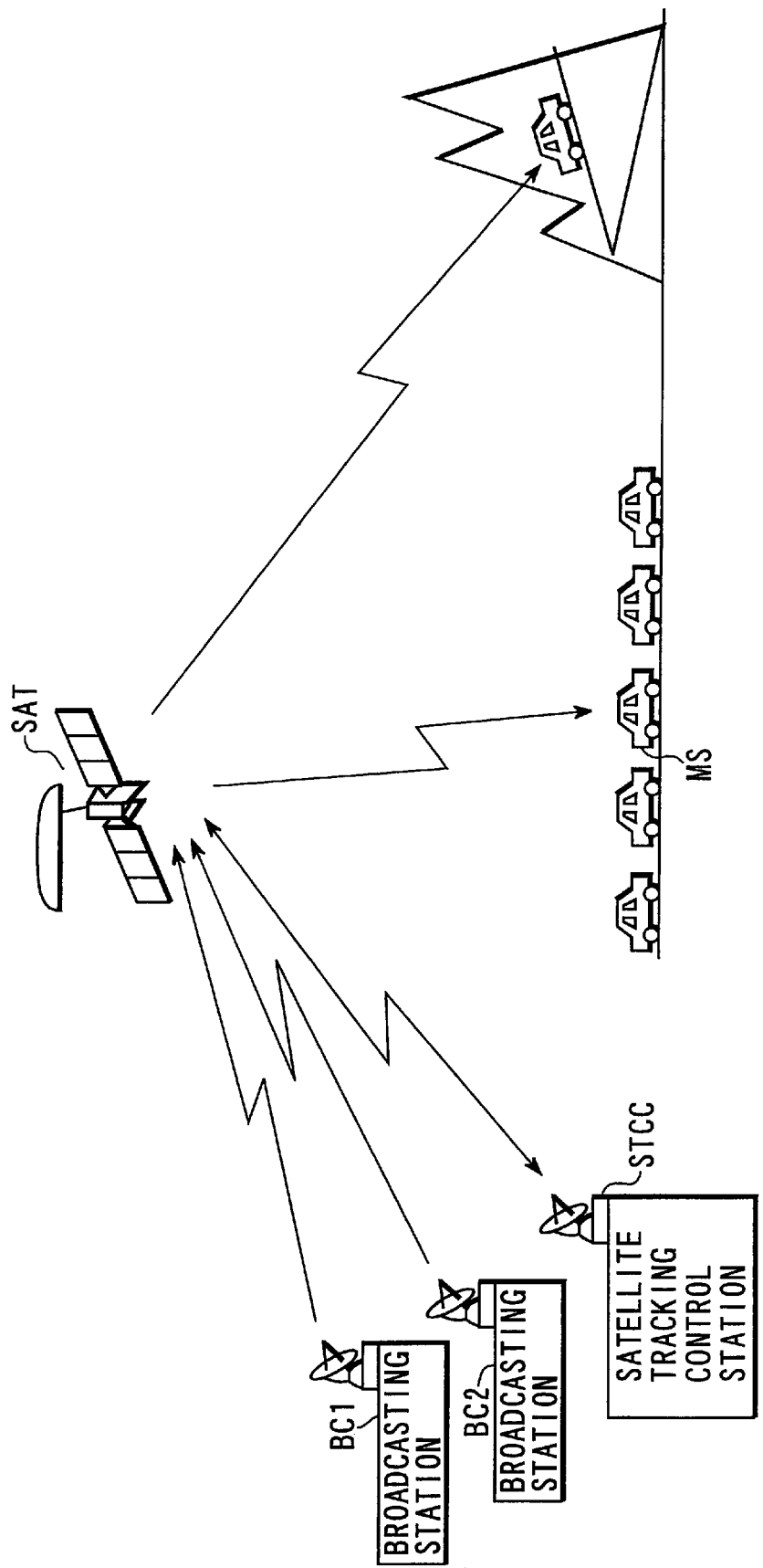
FIG 1. is a schematic view showing a satellite broadcasting system according to the first embodiment of the present invention.

FIG. 1 is a schematic view showing a satellite broadcasting system according to the first embodiment of the present invention.

This satellite broadcasting system includes a plurality of ground broadcasting stations (VSAT) BC1 and BC2 or feeder link stations, a geostationary satellite SAT, and a satellite tracking control station STCC.

Each of the ground broadcasting stations (VSAT) BC1 and BC2 or the feeder link stations transmits program information prepared and edited by a broadcaster to the geostationary satellite SAT through an uplink transmission channel in the Ka band (26.5 to 40 GHz) or the Ku band (12.5 to 18 GHz).

The geostationary satellite SAT has a Ka-band or Ku-band antenna having a diameter of 2.5-m class and an S-band (e.g., 2.6 GHz) antenna having a diameter of 15-m class. A broadcasting signal multiplexed and transmitted from one of the broadcasting stations (VSAT) BC1 and BC2 or the feeder link stations is received and amplified by the Ka- or Ku-band antenna and then converted into a signal for the S band. The converted broadcasting signal is transmitted from the S-band antenna to a service area through a downlink transmission channel in the S band. The uplink transmission antenna carried by the geostationary satellite SAT may have a diameter smaller than 2.5-m class. The S-band antenna may also have a diameter of not 15-m class but 8-m class.

The satellite tracking control station STCC monitors and controls the operation state of the geostationary satellite SAT.

In the service area, a broadcasting receiver (not shown) stationarily set, e.g., in an office or at home or a movable broadcasting receiver MS carried by an automobile or carried as a portable device receives the broadcasting signal transmitted from the geostationary satellite SAT to the S-band downlink transmission channel in the S band. In the S-band downlink transmission channel, a plurality of channels, a maximum of 900 channels having a transmission rate of 64 to 256 Kbps/channel are multiplexed. To transmit a video signal using a channel, MPEG4 (moving picture experts group 4) is used as a video coding method.

Figure 2:
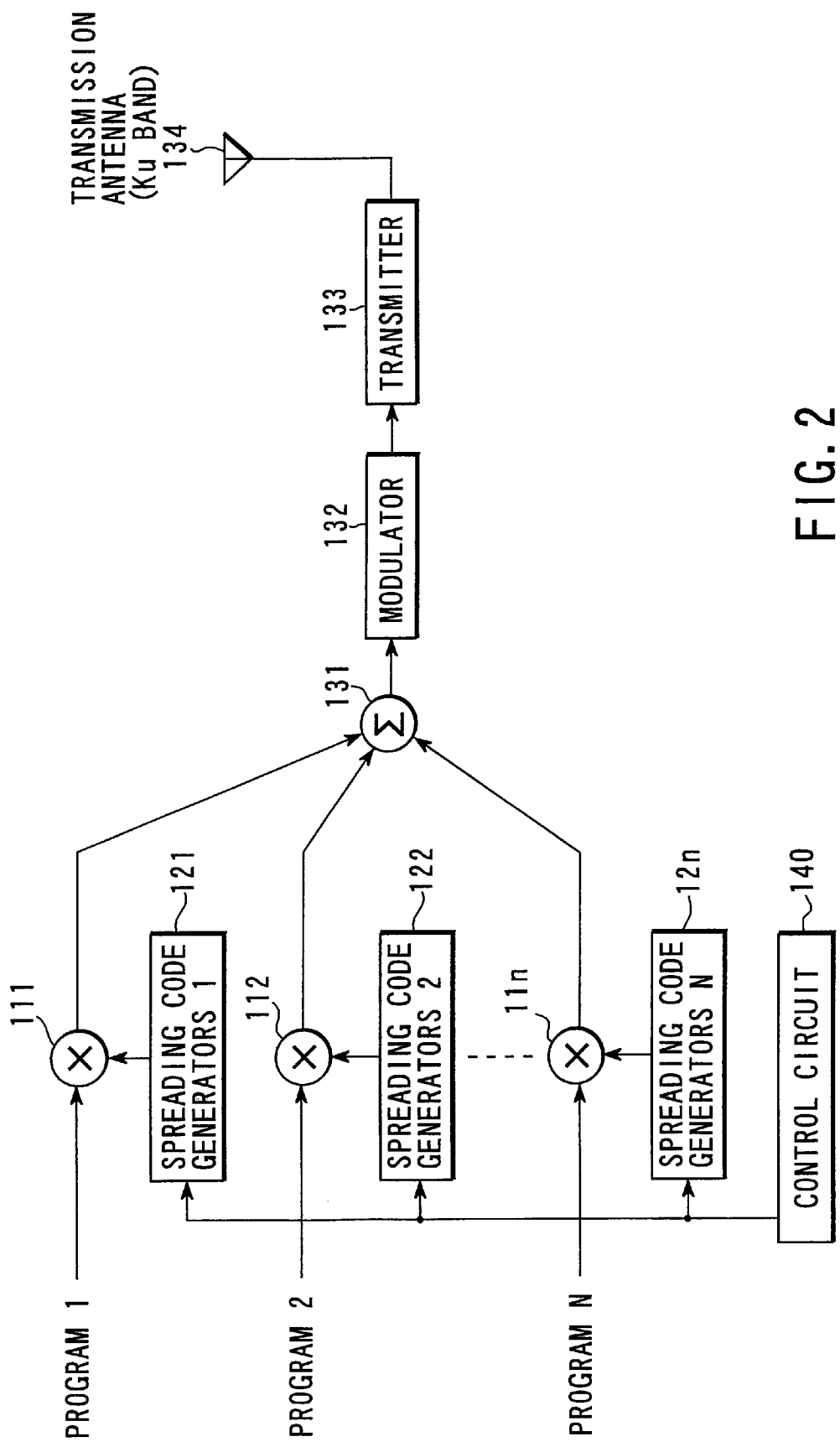
FIG. 2 is a block diagram showing the arrangement of a ground broadcasting station in the first embodiment.

Each of the ground broadcasting stations BC1 and BC2 of the first embodiment has a function of matching the phases of spreading codes between a plurality of channels when a plurality of programs are to be subjected to code division multiplex and transmitted and has the following arrangement. FIG. 2 is a block diagram showing the arrangement of the transmission section.

Broadcasting signals of a plurality of programs (N programs in FIG. 2) edited by a circuit (not shown) are input to modulators 11 $_1$ to 11n, respectively. The spread modulators 11 $_1$ to 11n spread-spectrum-modulate the broadcasting signals using different spreading codes generated from spreading code generators 12 $_1$ to 12n, respectively. The broadcasting signals spread-spectrum-modulated by the spread modulators 11 $_1$ to 11n are synthesized into one code division multiplex (CDM) broadcasting signal by a synthesizer 131 and input to a modulator 132. The modulator 132 further modulates the CDM broadcasting signal by digital modulation such as QPSK or QAM. The modulated CDM broadcasting signal is frequency-converted into a Ka- or Ku-band radio signal by a transmitter 133. The radio signal is amplified to a predetermined transmission power level and then transmitted from an antenna 134 to the geostationary satellite.

The ground broadcasting station MS has a control circuit 140. The control circuit 140 generates a reference phase signal for designating the reference phase of a spreading code and supplies it to the spreading code generators 12 $_1$ to 12n. The spreading code generators 12 $_1$ to 12n start to generate spreading codes in synchronism with the reference phase signal supplied from the control circuit 140.

With this arrangement, the broadcasting signals of the programs are spread-modulated by the spread modulators 11 $_1$ to 11n using the spreading codes generated from the spreading code generators 12 $_1$ to 12n in synchronism with the reference phase, respectively. For this reason, the CDM broadcasting signal output from the synthesis circuit 131 has spreading code phases matched between the channels, so the CDM broadcasting signal having matched spreading code phases is broadcasted to the broadcasting receiver MS through the geostationary satellite SAT.

Spreading code synchronization is established for one of the channels in the CDM broadcasting signal arriving through the geostationary satellite SAT upon, e.g., powering on, and then, the spreading codes corresponding to all channels are generated in phase. Even when switching to another channel is performed, the broadcasting receiver MS can receive the channel in a very short time only by switching the spreading code without newly establishing spreading code synchronization to the channel.

(Second Embodiment)

In the second embodiment of the present invention, a geostationary satellite SAT detects the spreading code phase difference between the channels of a CDM broadcasting signal arriving from each of a ground broadcasting station BC1 or BC2, matches the spreading code phases between the channels on the basis of the detection result, and then transmits a signal to a broadcasting receiver MS.

Figure 3:
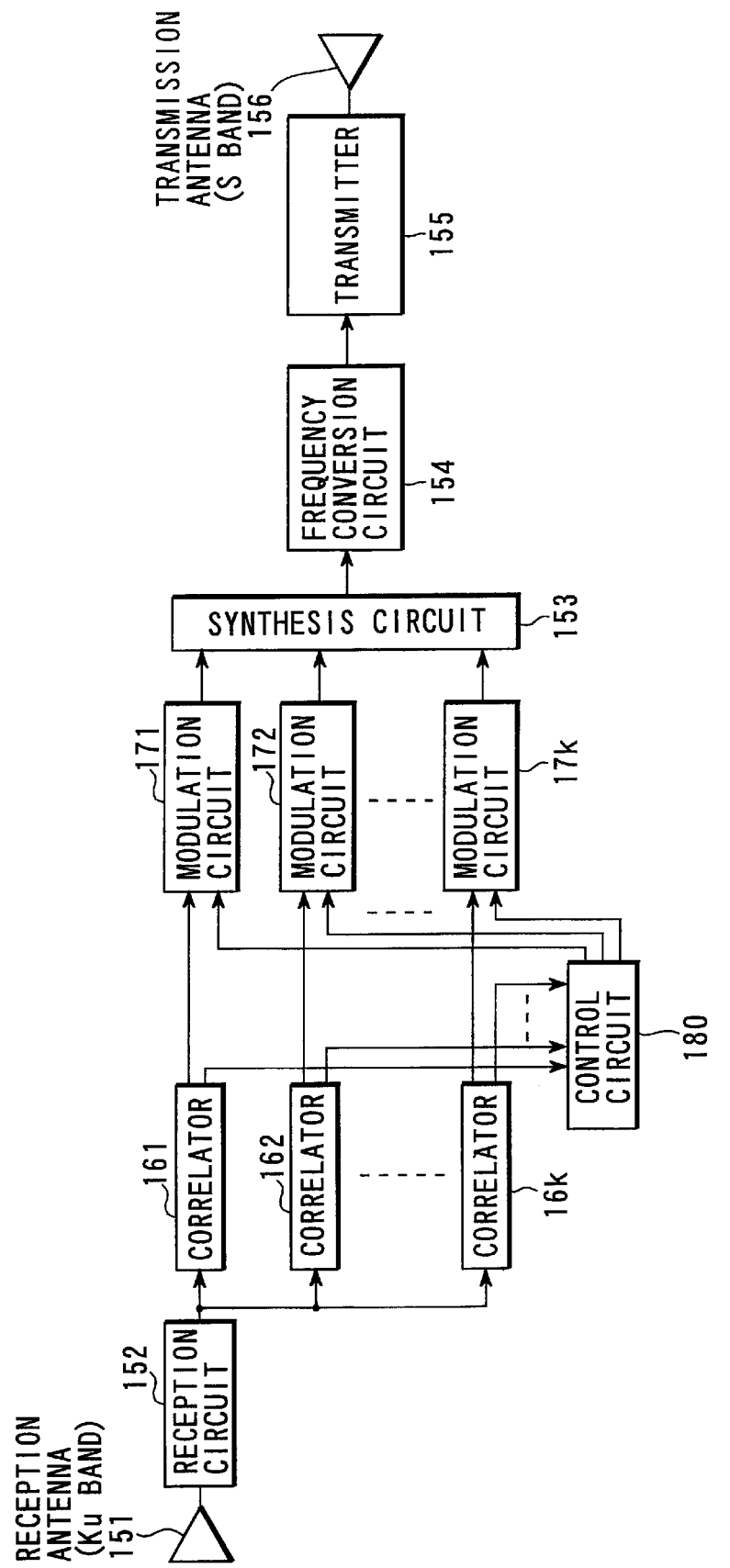
FIG. 3 is a block diagram showing the arrangement of a geostationary satellite in the second embodiment of the present invention.

FIG. 3 is a block diagram showing the arrangement of the geostationary satellite SAT according to the second embodiment. Referring to FIG. 3, a CDM broadcasting signal transmitted from the ground broadcasting station BC1 or BC2 is received by a Ku-band reception antenna 151 and input to a reception circuit 152. The CDM broadcasting signal is low-noise-amplified, down-converted into an IF signal, and distributed to $k$ correlators 161 to 16k. The number of correlators 161 to 16k is set in correspondence with a total number $k$ of channels to be multiplexed/transmitted by the ground broadcasting station BC1 or BC2. The correlators 161 to 16k despread the spectrum of the received IF signal using spreading codes which are set in advance in units of channels. The despread reception signals are input to spread modulation circuits 171 to 17k, respectively.

When the spectrum of the received IF signal is to be despread, each of the correlators 161 to 16k correlates the received IF signal with a spreading code (a quadrature code such as a Walsh code or a Gold code prepared independently of the PN code) and inputs the correlation value to a control circuit 180. The control circuit 180 detects the phase difference between a quadrature code generated in the geostationary satellite SAT with the received quadrature code on the basis of the correlation value input from each of the correlators 161 to 16k in units of channels. A phase control signal for making the detected phase difference zero is generated in units of channels and supplied to a corresponding one of the spread modulation circuits 171 to 17k.

Each of the spread modulation circuits 171 to 17k adjusts the spreading code generation phase on the basis of the phase control signal supplied from the control circuit 180. The spectra of the received signals input from the correlators 161 to 16k are spread using the spreading codes, and the spread broadcasting signals are input to a synthesis circuit 153. The synthesis circuit 153 synthesizes the broadcasting signals output from the spread modulators 171 to 17k. The CDM broadcasting signal obtained by synthesis is input to a frequency conversion circuit 154.

The frequency conversion circuit 154 frequency-converts the CDM broadcasting signal into a frequency in the S band (2.6 GHz), which is assigned to the self system in advance, and inputs the signal to a transmitter 155. The transmitter 155 amplifies the frequency-converted CDM broadcasting signal to a predetermined transmission power level and transmits the CDM broadcasting signal from an S-band transmission antenna 156 to a service area.

With this arrangement, the phase difference between the spreading codes of the channel signals in the CDM broadcasting signal transmitted from the ground broadcasting station BC1 or BC2 is detected in the geostationary satellite SAT. The spectra of the channel signals are spread again using spreading codes phase-controlled to make the detected phase difference zero and then transmitted to the service area in the S band. For this reason, even when the spreading code phases do not match between the channels of the CDM broadcasting signal arriving from the ground broadcasting station BC1 or BC2, the CDM broadcasting signal is transmitted and received by the broadcasting receiver MS after the phase difference is absorbed in the geostationary satellite SAT.

Spreading code synchronization is established for one of the channels in the CDM broadcasting signal arriving through the geostationary satellite SAT upon, e.g., powering on. Even when switching to another channel is performed, the broadcasting receiver MS can receive the channel in a very short time only by switching the spreading code without newly establishing spreading code synchronization to the channel.

(Third Embodiment)

In the third embodiment of the present invention, a ground broadcasting station BC1 or BC2 detects the spreading code phase difference between channels in generating a CDM broadcasting signal and transmitting the CDM broadcasting signal, and the phase difference information is multiplexed to the CDM broadcasting signal and transmitted. In selectively receiving one of the channels of the CDM broadcasting signal arriving through a geostationary satellite SAT, a broadcasting receiver MS initializes the chip phase of the spreading code on the basis of the phase difference information received together with the CDM broadcasting signal, and selectively despreads the spectrum of the broadcasting signal of each channel using the spreading code to reconstruct the broadcasting signal.

Figure 4:
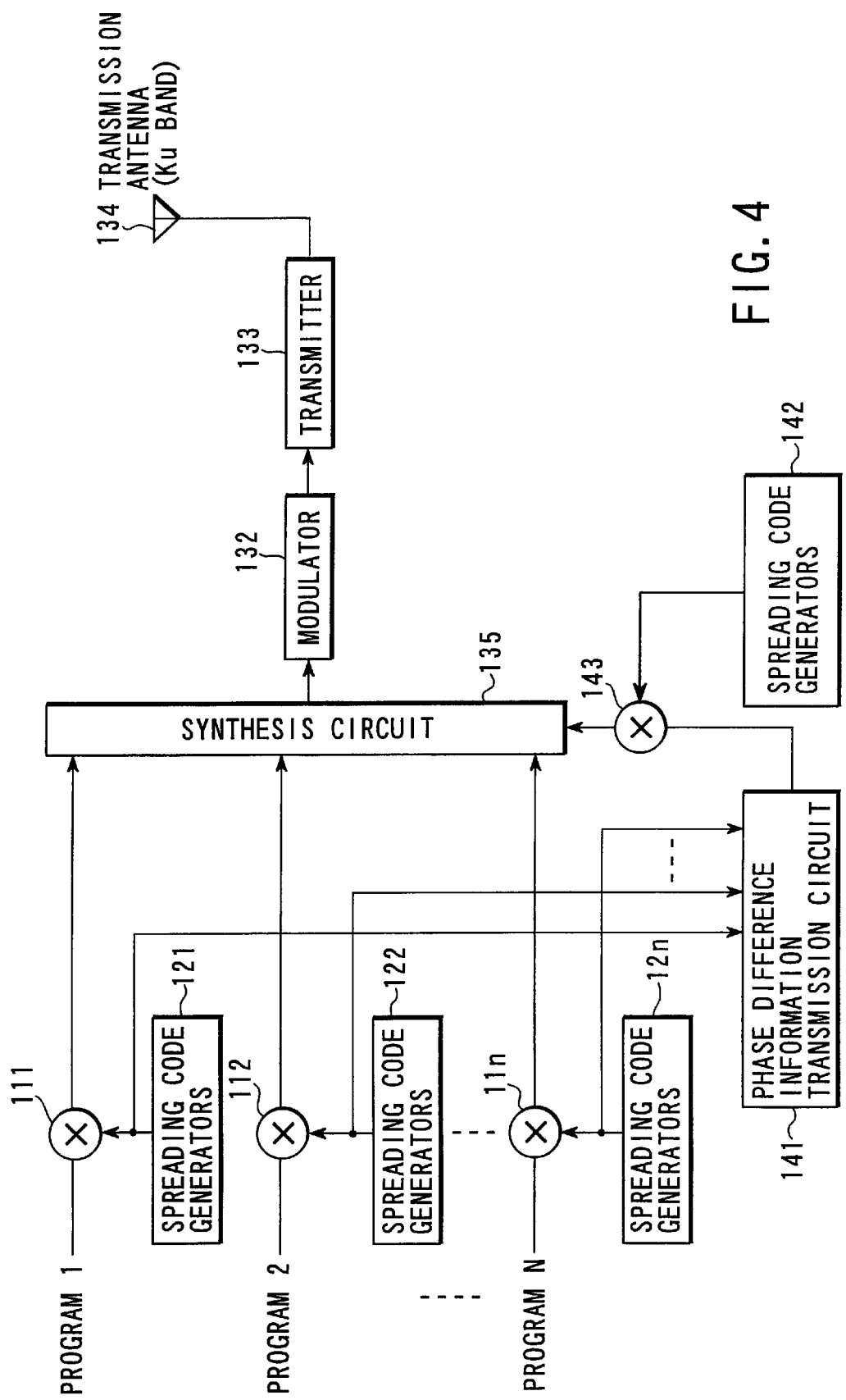
FIG. 4 is a block diagram showing the arrangement of a ground broadcasting station in the third embodiment of the present invention.

FIG. 4 is a block diagram showing the arrangement of the transmission section of each of the ground broadcasting stations BC1 and BC2 according to this embodiment. The same reference numerals as in FIG. 2 denote the same parts in FIG. 4, and a detailed description thereof will be omitted.

Spreading codes generated from spreading code generators 121 to 12n are input to a phase difference information transmission circuit 141. The phase difference information transmission circuit 141 detects the phase difference of each spreading code from the reference phase. Information representing the phase difference is coded and primary-modulated and input to a spread modulator 143. The spread modulator 143 spreads the spectrum of the phase difference information input from the phase difference information transmission circuit 141 using a spreading code generated from a spread modulator 42 and inputs the phase difference information to a synthesis circuit 135. The synthesis circuit 135 synthesizes the spread-modulated signal of each of the channel broadcasting signals output from spread modulators 111 to 11n with the spread-modulated signal of the phase difference information output from the spread modulator 142 and supplies the synthesized signal to a modulator 132 for transmission.

Figure 5:
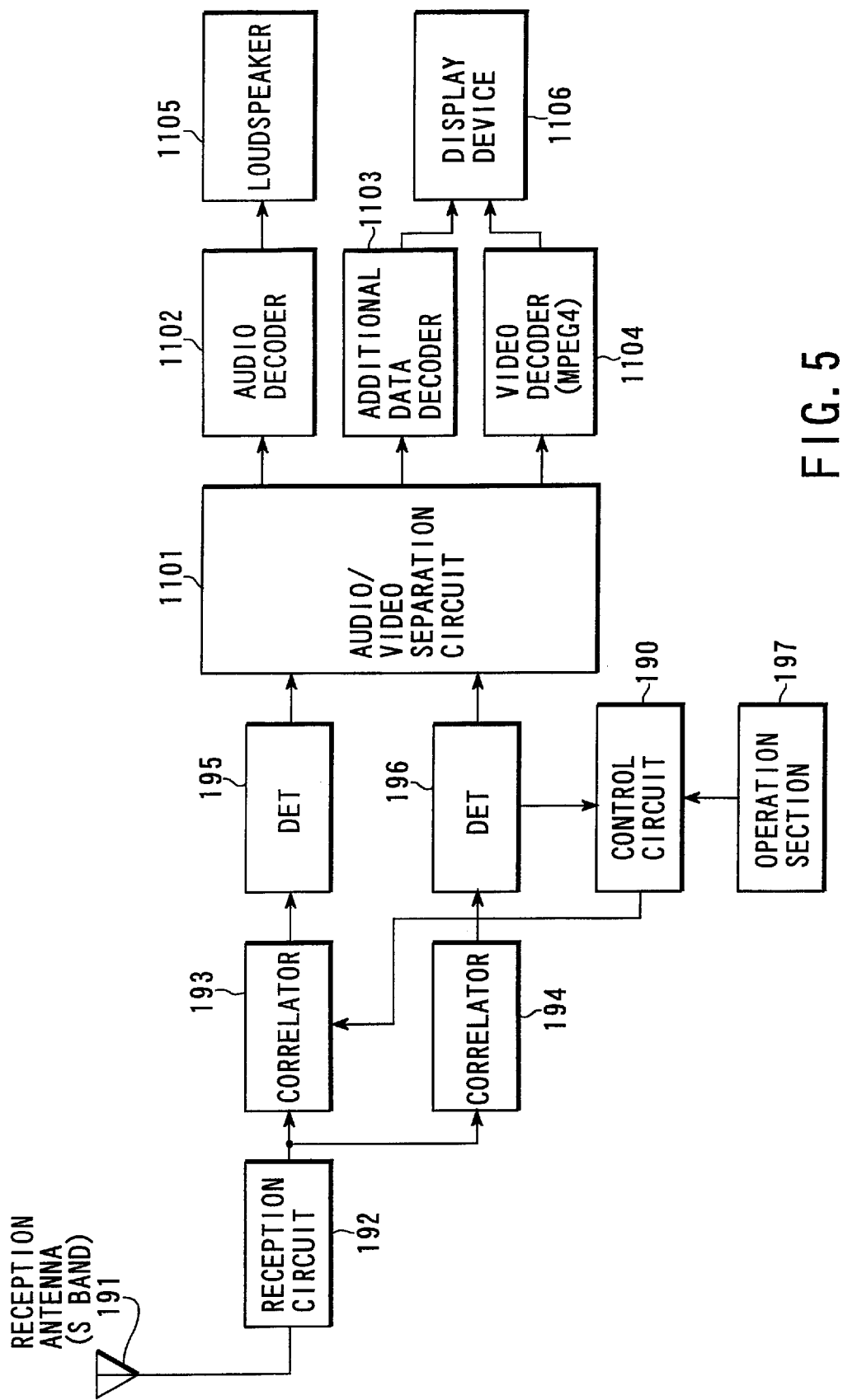
FIG 5 is a block diagram showing the arrangement of a broadcasting receiver in the third embodiment.

The broadcasting receiver MS has the following arrangement. FIG. 5 is a block diagram showing the arrangement of the broadcasting receiver MS. The CDM broadcasting signal arriving from the geostationary satellite SAT is received by an S-band reception antenna 191, input to a reception circuit 192, low-noise-amplified, and frequency-converted into an IF signal. The received IF signal is distributed to first and second correlators 193 and 194.

The first correlator 193 despreads the spectrum of the received IF signal using a spreading code corresponding to a reception channel designated from a control circuit 190, and inputs the despread channel signal to a detector (DET) 195. The reception channel is designated by the user by operating a remote-control operation section 197. The detector 195 detects the channel signal by a detection method corresponding to, e.g., QPSK. The obtained received broadcasting signal is input to an audio/video separation circuit 1101.

The audio/video separation circuit 1101 separates the reconstructed reception signal into audio data, video data, and additional data such as text data. The separated received audio data is input to an audio decoder 1102. The received video signal is input to a video decoder 1104. The additional data is input to an additional data decoder 1103. The audio decoder 1102 decodes the received audio data to reconstruct the audio signal, and the audio signal is amplified and output from a loudspeaker 1105. The video decoder 1104 decodes the received video data by MPEG4 and causes a display device 1106 constituted by, e.g., a liquid crystal display to display the decoded video signal. The additional data decoder 1103 decodes the additional data such as text data and causes the display device 1106 to display the decoded data together with the video signal.

The second correlator 194 despreads the spectrum of the received IF signal output from the reception circuit 192 using a spreading code prepared in advance for transmission of phase difference information. The phase difference information signal obtained by despreading is detected by a detector 196, decoded, and input to the control circuit 190.

Every time the operation section 197 switches channels, the control circuit 190 designates a spreading code corresponding to the designated channel for the first correlator 193 and also designates the spreading code generation phase set on the basis of the phase difference information. For this reason, the first correlator 193 generates the spreading code corresponding to the reception channel, designated by the control circuit 190, from the designated chip phase, so the spectrum of the received IF signal is despread using this spreading code.

In this system, information representing the spreading code phase difference between the channels is multiplexed on the CDM broadcasting signal and transmitted from the ground broadcasting station BC1 or BC2 together with the CDM broadcasting signal. The broadcasting receiver MS separates and extracts the phase difference information from the CDM broadcasting signal. The chip phase of the spreading code is initialized on the basis of the phase difference information, so the spectrum of the broadcasting signal of a desired channel is despread using this spreading code to reconstruct the broadcasting signal.

Even when, in spreading the spectra of the broadcasting signals of channels using spreading codes and transmitting them, the ground broadcasting station BC1 or BC2 spreads the spectra of the broadcasting signals of the channels without synchronizing the spreading codes of the channels, the broadcasting receiver MS initializes the chip phases of the spreading codes on the basis of the phase difference information sent from the ground broadcasting station BC1 or BC2 together with the CDM broadcasting signal so that the spectrum of the CDM broadcasting signal is despread using the spreading code. For this reason, as compared to a case wherein the spreading code of each channel is searched for to establish synchronization, spreading code synchronization for each channel can be established in a short time. Therefore, the channels can be quickly switched at a high response speed.

(Fourth Embodiment)

In the fourth embodiment of the present invention, when a ground broadcasting station BC1 or BC2 is to generate a CDM broadcasting signal and transmit it, the phase difference between the spreading codes of channels is detected, and the phase difference information is multiplexed on the CDM broadcasting signal and transmitted. In a geostationary satellite SAT, the phase difference information is separated and extracted. Using a spreading code-whose phase is set on the basis of the phase difference information, the spectrum of each channel signal of the CDM broadcasting signal is newly spread, and the signal is transmitted to a service area.

Figure 6:
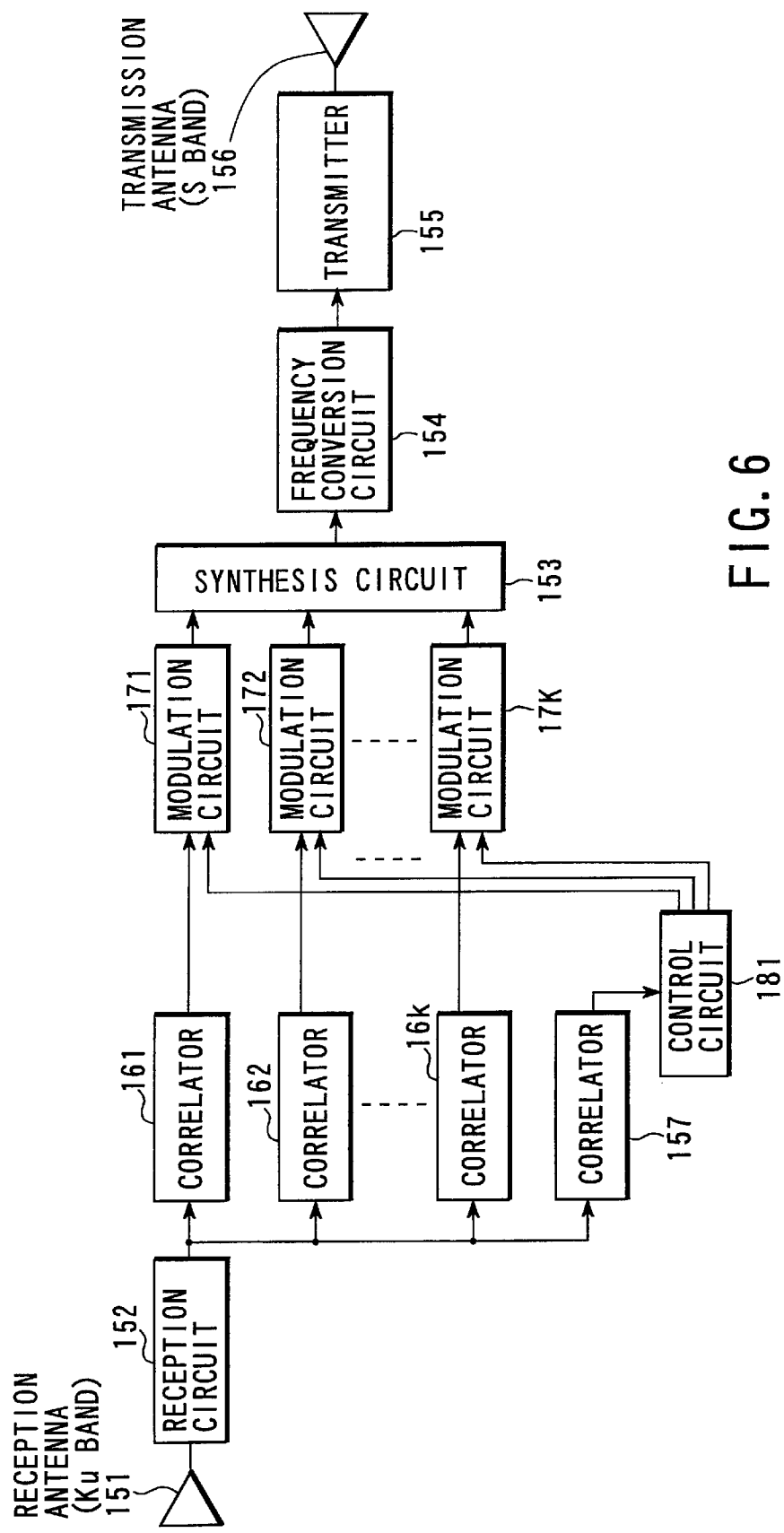
FIG. 6 is a block diagram showing the arrangement of a geostationary satellite in the fourth embodiment of the present invention.

FIG. 6 is a block diagram showing the arrangement of the geostationary satellite SAT according to this embodiment. The same reference numeral as in FIG. 3 denote the same parts in FIG. 6, and a detailed description thereof will be omitted.

The geostationary satellite SAT has not only a group of correlators 161 to 16k for despreading the spectra of the CDM broadcasting signal in units of channels but also a correlator 157 for separating and extracting the phase difference information. The correlator 157 despreads the spectrum of the received IF signal output from a reception circuit 152 using a spreading code which is set in advance for transmission of the phase difference information, thereby separating and extracting the phase difference information.

A control circuit 181 generates phase control signals for designating the chip phases of the spreading codes of the channels on the basis of the phase difference information separated and extracted by the correlator 157 and supplies the phase control signals to spread modulation circuits 171 to 17k, respectively.

Each of the spread modulation circuits 171 to 17k initializes the chip phase of the spreading code on the basis of the phase control signal and newly spreads the spectrum of the channel signal, which has temporarily been despread by a corresponding one of the correlators 161 to 16k, using the spreading code with the initialized phase. The spectra of the channel signals newly spread by the spread modulation circuits 171 to 17k are synthesized into a CDM broadcasting signal by a synthesis circuit 153. The CDM broadcasting signal is converted into a frequency in the S band by a frequency conversion circuit 154, amplified to a predetermined transmission power level by a transmitter 155, and then transmitted from an S-band transmission antenna 156 to a ground service area.

With this arrangement, even when the ground broadcasting station BC1 or BC2 spreads the spectra of the broadcasting signals of channels without synchronizing the spreading codes of the channels, the spectrum of the CDM broadcasting signal transmitted from the ground broadcasting station BC1 or BC2 is newly spread in the geostationary satellite SAT on the basis of phase difference information simultaneously transmitted from the ground broadcasting station BC1 or BC2, and transmitted to the ground service area.

A broadcasting receiver MS receives the CDM broadcasting signal wherein spreading code synchronization between channels is established. For this reason, once spreading code synchronization is established for any one of the channels of the CDM broadcasting signal, the broadcasting receiver MS can separate the broadcasting signal of a desired channel and reconstruct it only by switching the spreading code without newly establishing spreading code synchronization for the remaining channels. Therefore, the channels can be quickly switched at a high response speed. In addition, in this embodiment, the broadcasting receiver MS need not have a circuit for initializing the spreading code generation phase for each channel on the basis of the phase difference information, so the arrangement of the broadcasting receiver MS can be simplified.

(Fifth Embodiment)

In the fifth embodiment of the present invention, the phase difference of the spreading code of each channel of a CDM broadcasting signal, arriving from a ground broadcasting station BC1 or BC2, from a reference phase is detected in a geostationary satellite SAT, and the detected phase difference information is multiplexed on the CDM broadcasting signal and transmitted to a ground service area. Upon selectively receiving the channels of the CDM broadcasting signal, a broadcasting receiver MS initializes the chip phases of the spreading codes on the basis of the phase difference information which has been received together with the CDM broadcasting signal, so the spectrum of the broadcasting signal of each channel is selectively despread using the spreading code to reconstruct the broadcasting signal.

Figure 7:
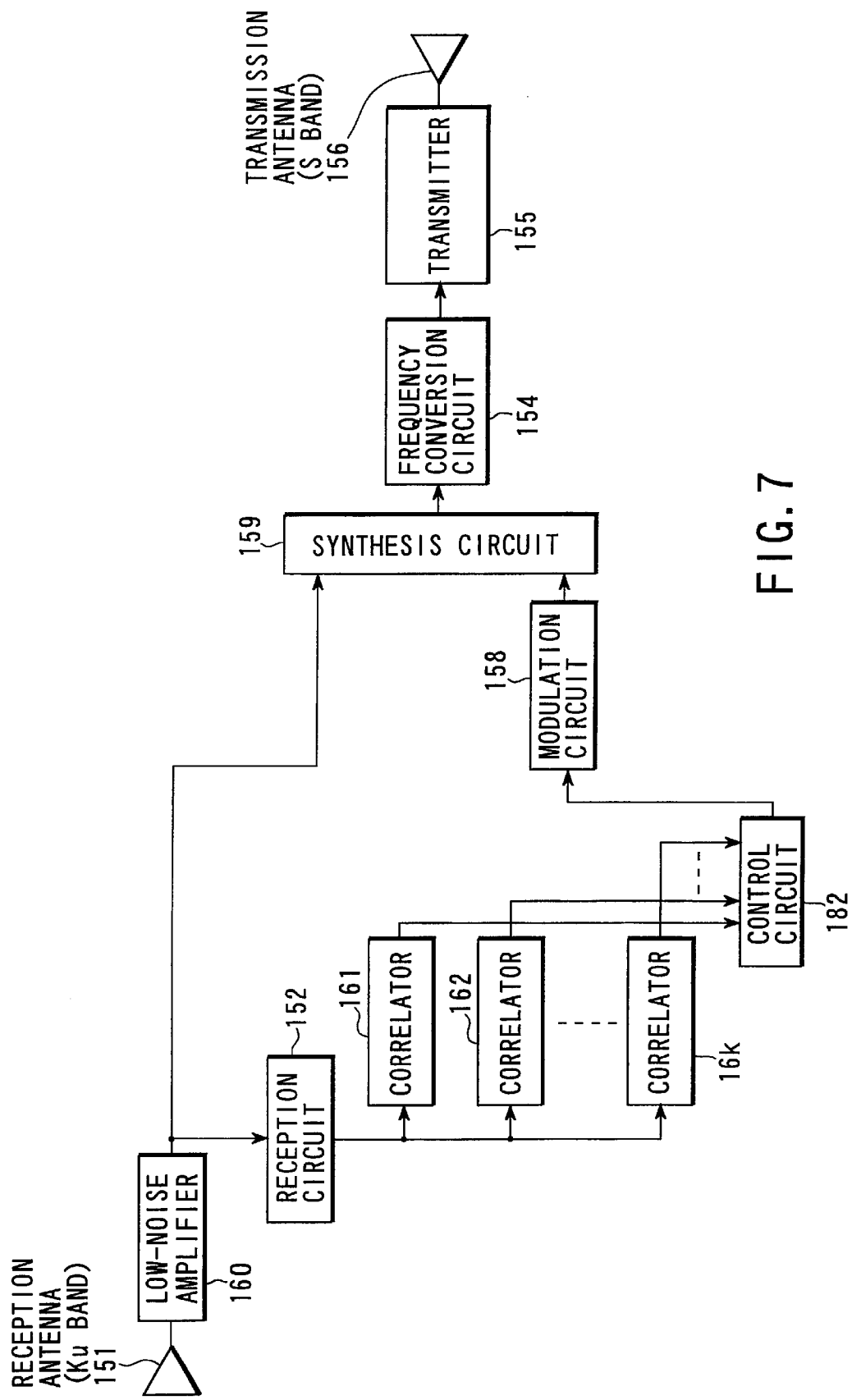
FIG. 7 is a block diagram showing the arrangement of a geostationary satellite in the fifth embodiment of the present invention.

FIG. 7 is a block diagram showing the arrangement of the geostationary satellite SAT according to this embodiment. The same reference numeral as in FIG. 3 denote the same parts in FIG. 7, and a detailed description thereof will be omitted.

The CDM broadcasting signal arriving from the ground broadcasting station BC1 or BC2 is received by a reception antenna 151, and then low-noise-amplified and converted into an IF signal by a reception circuit 152. The received IF signal is distributed to correlators 161 to 16k which are arranged in correspondence with the total number of channels to be transmitted from the ground broadcasting station BC1 or BC2.

Each of the correlators 161 to 16k correlates the received IF signal with a spreading code and inputs the correlation value to a control circuit 182. The control circuit 182 detects the phase difference between a quadrature code generated by the geostationary satellite SAT and the received quadrature code on the basis of the correlation value input from a corresponding one of the correlators 161 to 16k in units of channels. Information representing the phase difference detected in units of channels is coded and input to a spread modulation circuit 158.

The spread modulation circuit 158 spreads the spectrum of the phase difference information using the spreading code, and the spread phase difference information is input to a synthesis circuit 159. The synthesis circuit 159 synthesizes the spread signal of the phase difference information with the CDM broadcasting signal output from the reception circuit 152. The CDM broadcasting signal obtained by synthesis is frequency-converted into a frequency in the S-band by a frequency conversion circuit 154, amplified to a predetermined transmission power level by a transmitter 155, and then transmitted from an S-band transmission antenna 156 to the ground service area.

As the broadcasting receiver to be used in this embodiment, the same arrangement as that described in the third embodiment with reference to FIG. 5 can be used.

With this arrangement, when the geostationary satellite SAT receives the CDM signal transmitted from the ground broadcasting station BC1 or BC2, the phase difference between the spreading code of each channel and the reference phase is detected in the geostationary satellite SAT. The information representing the phase difference is multiplexed to the CDM signal and supplied to the broadcasting receiver MS.

The broadcasting receiver MS separates and extracts the phase difference information from the CDM broadcasting signal and initializes the chip phases of the spreading codes on the basis of the phase difference information, so the spectrum of the broadcasting signal of a desired channel is despread using the spreading code to reconstruct the broadcasting signal.

Even when, in spreading the spectrum of the broadcasting signals of channels using spreading codes and transmitting them, the ground broadcasting station BC1 or BC2 spreads the spectra of the broadcasting signals of the channels without synchronizing the spreading codes of the channels, the broadcasting receiver MS initializes the chip phases of the spreading codes on the basis of the phase difference information sent from the ground broadcasting station BC1 or BC2 together with the CDM broadcasting signal so that the spectrum of the CDM broadcasting signal is despread using the spreading code. For this reason, as compared to a case wherein the spreading code of each channel is searched for to establish synchronization, spreading code synchronization for each channel can be established in a short time. Therefore, the channels can be quickly switched at a high response speed.

In addition, according to this embodiment, the ground broadcasting station BC1 or BC2 need not have a circuit for detecting the phase difference between the spreading codes of the channels and multiplex/transmitting the detection information, so the circuit arrangement of the ground broadcasting station BC1 or BC2 can be simplified.

(Sixth Embodiment)

In the sixth embodiment of the present invention, the spreading code phase difference between CDM broadcasting signals transmitted from a plurality of ground broadcasting stations BC1, BC2, and BC3 is detected in a geostationary satellite SAT. A phase control signal for making the phase difference zero is supplied from the geostationary satellite SAT to each of the ground broadcasting stations BC1, BC2, and BC3 as sources. Each of the ground broadcasting stations BC1, BC2, and BC3 variably controls the transmission timing of the broadcasting signal to be transmitted from the self apparatus on the basis of the supplied phase difference information such that the spreading code phase difference between the CDM broadcasting signals transmitted from the ground broadcasting stations BC1, BC2, and BC3 becomes zero on the geostationary satellite SAT.

Figure 8:
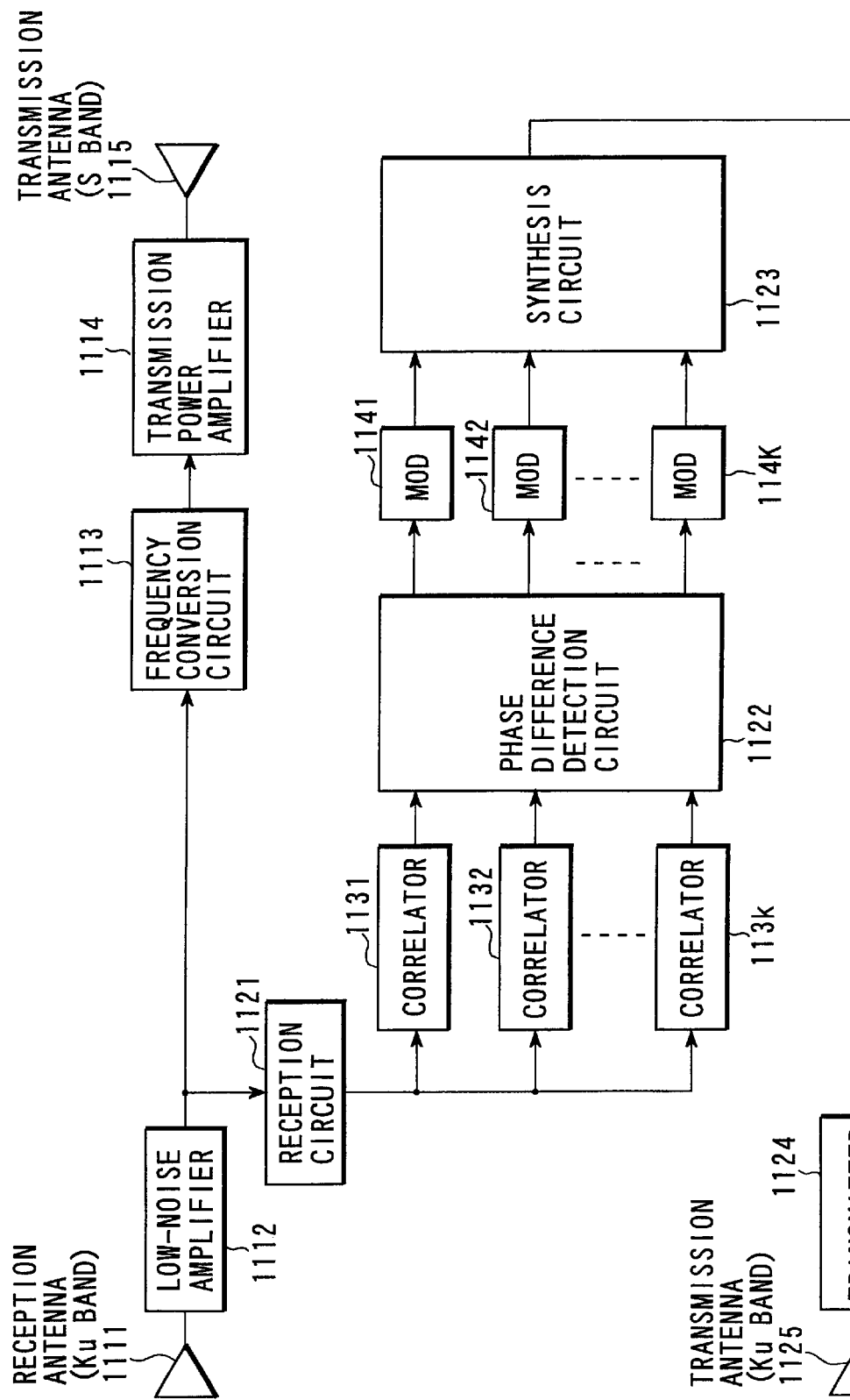
FIG. 8 is a block diagram showing the arrangement of a geostationary satellite in the sixth embodiment of the present invention.

FIG. 8 is a block diagram showing the arrangement of the geostationary satellite SAT according to this embodiment. In FIG. 8, the CDM broadcasting signal transmitted from each of the ground broadcasting stations BC1, BC2, and BC3 is received by a reception antenna 1111 and amplified by a low-noise amplifier 1112. The received CDM broadcasting signal is frequency-converted from the Ku band to the S band by a frequency conversion circuit 1113, amplified to a predetermined transmission power level by a transmission power amplifier 1114, and transmitted from an S-band transmission antenna 1115 to a ground service area.

The received CDM broadcasting signal output from the low-noise amplifier 1112 is input to a reception circuit 1121, frequency-converted into, e.g., an IF signal, and then distributed to correlators 1131 to 113k. The number of correlators 1131 to 113k corresponds to a total number $\underline{k}$ of channels to be multiplexed/transmitted by each of the ground broadcasting stations BC1 and BC2.

Each of the correlators 1131 to 113k correlates the received IF signal with a spreading code and inputs the correlation value to a phase difference detection circuit 1122. The phase difference detection circuit 1122 detects the phase difference between a spreading code generated by the geostationary satellite SAT and each received spreading code on the basis of the correlation value input from a corresponding one of the correlators 1131 to 113k in units of channels. A phase control signal for making the detected phase difference zero is generated in units of channels, and the phase control signals are input to modulation circuits (MOD) 1141 to 114k, respectively.

Each of the modulation circuits 1141 to 114k performs, for the phase control signal, primary modulation such as QPSK and spread spectrum modulation using a spreading code for phase control signal transmission. The spread-modulated signals output from the modulation circuits 1141 to 114 kare synthesized to one signal by a synthesis circuit 1123 and input to a transmitter 1124 as a CDM phase control signal. The transmitter 1124 performs processing of frequency-converting the CDM phase control signal into a signal in the Ku band and processing of amplifying the frequency-converted transmission signal in the Ku band to a predetermined transmission power level. The CDM phase control signal output from the transmitter 1124 is transmitted from a Ku-band transmission antenna 1125 to the ground broadcasting station BC1 or BC2 as a source through a Ku-band downlink transmission channel.

Figure 9:
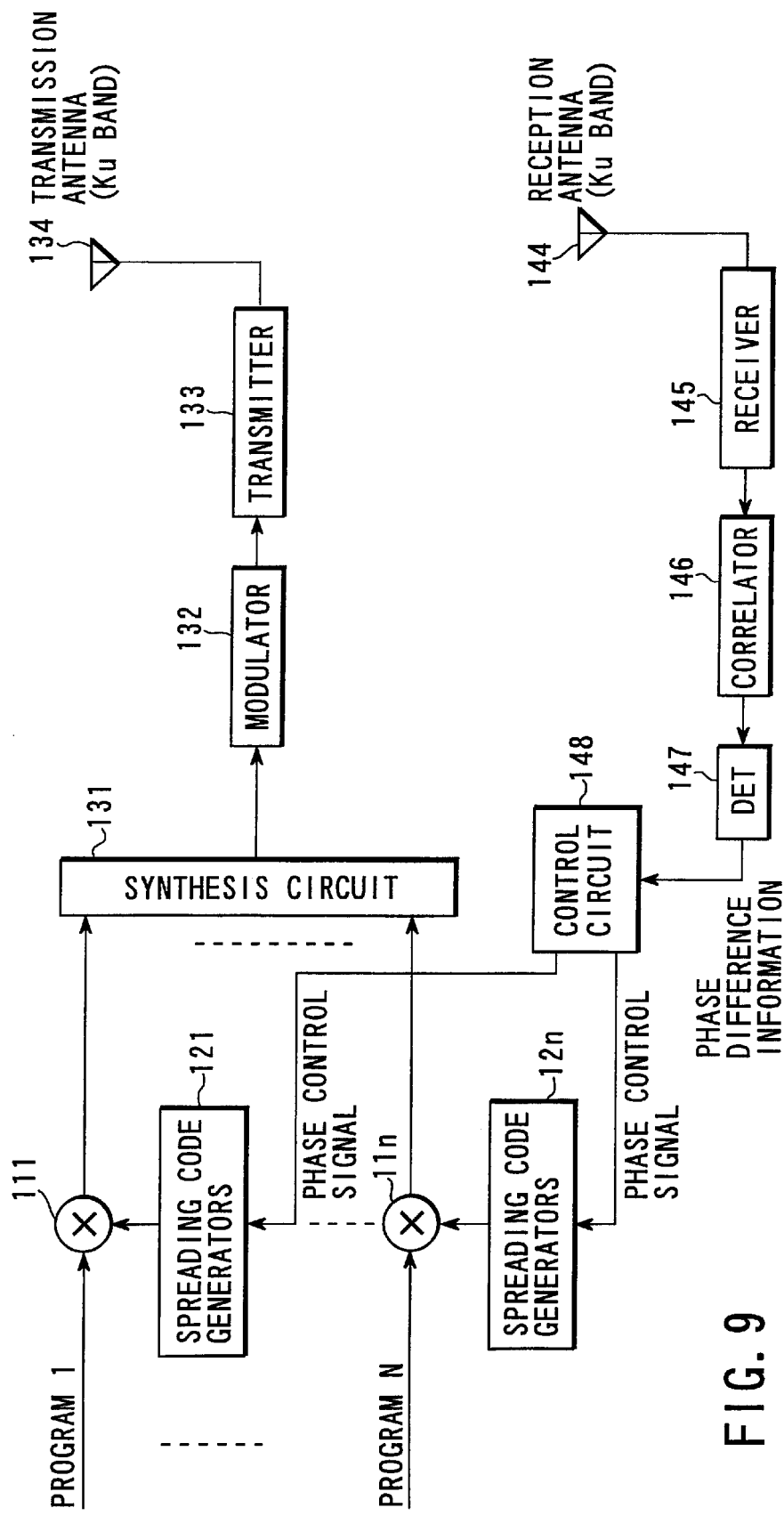
FIG. 9 is a block diagram showing the arrangement of a ground broadcasting station in the sixth embodiment.

Each of the ground broadcasting stations BC1 and BC2 has the following arrangement. FIG. 9 is a block diagram showing the arrangement of the transmission section. The same reference numerals as in FIG. 2 denote the same parts in FIG. 9.

The CDM phase difference control signal sent from the geostationary satellite SAT through the Ku-band downlink transmission channel is received by a reception antenna 144, input to a receiver 145, low-noise-amplified, and frequency-converted into an IF signal. The spectrum of the received IF signal is despread by a correlator 146 using a spreading code for phase control signal transmission. The resultant reception signal is detected by a detector (DET) 147 using a detection method corresponding to, e.g., QPSK. The reconstructed phase control signal is input to a control circuit 148.

The control circuit 148 supplies the reconstructed phase control signal to a corresponding one of spreading code generators 121 to 12n in units of channels. The spreading code generators 121 to 12n correct the spreading code generation start phases to timings given by the phase control signals. Accordingly, each of spread modulators 111 to 11n spreads the spectrum of the broadcasting signal of each program using the spreading code whose generation timing is corrected by a corresponding one of the spreading code generators 121 to 12n.

The spread-modulated signals of the broadcasting signals output from the spread modulators 111 to 11n are synthesized into one signal by a synthesis circuit 121 and input to a modulator 132. The signal is modulated, frequency-converted into a transmission signal in the Ku band by a transmitter 133, amplified to a predetermined transmission power level, and transmitted from a transmission antenna 134 to the geostationary satellite SAT.

With this arrangement, in the geostationary satellite SAT, the spreading code phase difference between the CDM broadcasting signals transmitted from the ground broadcasting stations BC1, BC2, and BC3 is detected, and the phase control signal for making the phase difference zero is multiplexed by CDM and transmitted to each of the ground broadcasting stations BC1, BC2, and BC3 as sources. Each of the ground broadcasting stations BC1, BC2, and BC3 controls the spreading code generation start timing for each channel in accordance with the phase difference information sent from the geostationary satellite SAT, thereby delaying the transmission timing of the CDM broadcasting signal to be transmitted from the self apparatus.

Figure 10A:
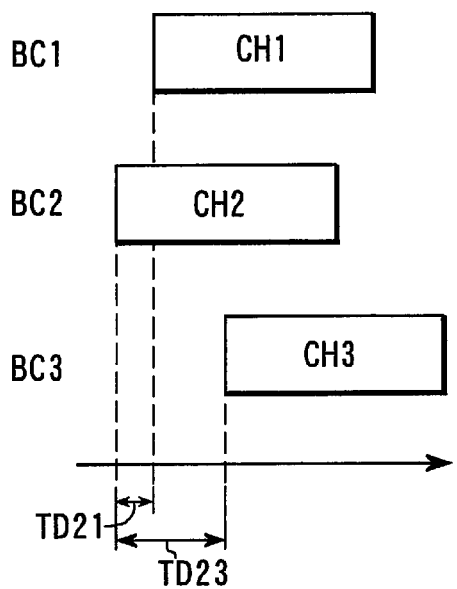
FIGS. 10A and 10B are timing charts used to explain the operation of the sixth embodiment.

Therefore, the ground broadcasting stations BC1, BC2, and BC3 start transmitting the CDM broadcasting signals at different timings. For example, as shown in FIG. 10A, the ground broadcasting station BC2 starts transmitting a CDM broadcasting signal in which channels CH11 to CH1n are multiplexed. Next, at a time point delayed from the transmission start point of the ground broadcasting station BC2 by TD21, the ground broadcasting station BC1 starts transmitting a CDM broadcasting signal in which channels CH21 to CH2n are multiplexed. Subsequently, at a time point delayed from the transmission start point of the ground broadcasting station BC2 by TD23, the ground broadcasting station BC3 starts transmitting a CDM broadcasting signal in which channels CH31 to CH3n are multiplexed.

Figure 10B:
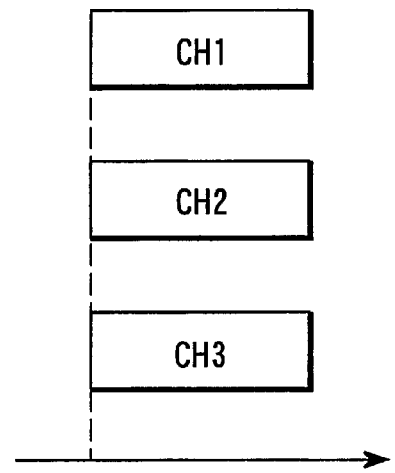

The delay amounts of the transmission timings of the CDM broadcasting signals are set on the basis of the phase control signals sent from the geostationary satellite SAT such that the relative correlation values between the CDM broadcasting signals transmitted from the ground broadcasting stations BC1, BC2, and BC3 become zero on the geostationary satellite SAT, as described previously. For this reason, the CDM broadcasting signals transmitted from the ground broadcasting stations BC1, BC2, and BC3 are received by the geostationary satellite SAT while making the relative phase differences zero, as shown in FIG. 10B.

The broadcasting receiver receives CDM broadcasting signals with spreading codes synchronized between the ground broadcasting stations BC1, BC2, and BC3. Thus, once spreading code synchronization is established for a CDM broadcasting signal transmitted from one of the ground broadcasting stations, the broadcasting signal from a desired ground broadcasting station can be separated and reconstructed only by switching the spreading code without newly establishing spreading code synchronization for the CDM broadcasting signals from the remaining ground broadcasting stations. Therefore, when the reception channel is to be switched from the CDM broadcasting signal transmitted from the ground broadcasting station BC1 to the CDM broadcasting signal transmitted from the different ground broadcasting station BC2, switching can be quickly performed at a high response speed.

Under the phase control of this embodiment, spreading code synchronization between a plurality of channels transmitted from one ground broadcasting station is also established on the geostationary satellite SAT. Hence, even when the broadcasting receiver MS is to switch the channel between the plurality of channels transmitted from one ground broadcasting station, the channel can be switched in a very short time at a high response speed only by switching the spreading code to a corresponding one.

As another embodiment of the present invention, the broadcasting receiver may be carried by a high-speed mobile such as an aircraft.

Generally, to receive a radio signal from the geostationary satellite SAT on an aircraft, a doppler shift in reception frequency occurs in the broadcasting receiver MS on the aircraft because of the large relative speed between the geostationary satellite SAT and the aircraft. In the conventional system using FDM or TDM, the bandwidth per channel is as narrow as about 10 KHz. A doppler shift of about several KHz makes it very difficult to receive a desired channel. Therefore, the receiver carried by aircraft, which is used in the conventional system using FDM or TDM, requires various measures for correcting doppler shift, resulting in a bulky apparatus.

However, in the satellite broadcasting system employing CDM as in the present invention, the broadcasting signal of each channel is spread in a wide band of, e.g., 25 MHz by spectrum spreading. Consequently, even when a doppler shift is generated in this state to shift the reception frequency by about several KHz, the shift amount in the frequency band (25 MHz) of the channel is very small, so the influence of the doppler shift can be neglected. For this reason, according to this embodiment, the broadcasting receiver used on an ground automobile or the like can be directly carried and used on an aircraft, and the aircraft-carried-type broadcasting receiver can be made much smaller and more inexpensive than the conventional apparatus.

The broadcasting receiver used in the CDM satellite broadcasting system of the present invention can also be carried by a high-speed mobile such as the Shinkansen. In this case as well, high-quality reception can be performed using a compact apparatus while neglecting the influence of a doppler shift.

In addition, when the broadcasting receiver is carried by a train, so-called diversity reception can be employed using the length of the train such that reception antennas are set on cars separated from each other, and reception signals from the antennas are synthesized. This arrangement allows higher-quality reception.

The present invention is not limited to the above embodiments, and various changes and modifications can be made for the procedure of setting phase synchronization between spreading codes, contents of the processing, or the arrangements of the ground broadcasting station, the geostationary satellite, and the broadcasting receiver.

As has been described above in the first to sixth embodiments, according to the first aspect of the present invention, the spreading code phase relationship between the broadcasting signals of channels code-division-multiplexed by a multiplex means is set in a predetermined state by a synchronization means. Alternatively, the phase difference between the spreading codes of the channel signals of a multiplexed broadcasting signal obtained by a multiplex means is detected by a phase difference detection means, and information representing the phase difference between the spreading codes, which is detected by the phase difference detection means, is supplied to the broadcasting receiver by a notification means. With this arrangement, a satellite broadcasting system allowing the broadcasting receiver to quickly switch the channels of the multiplexed broadcasting signals at a high response speed can be provided.

The second aspect of the present invention will be described next throughout the seventh to ninth embodiments.

Figure 11:
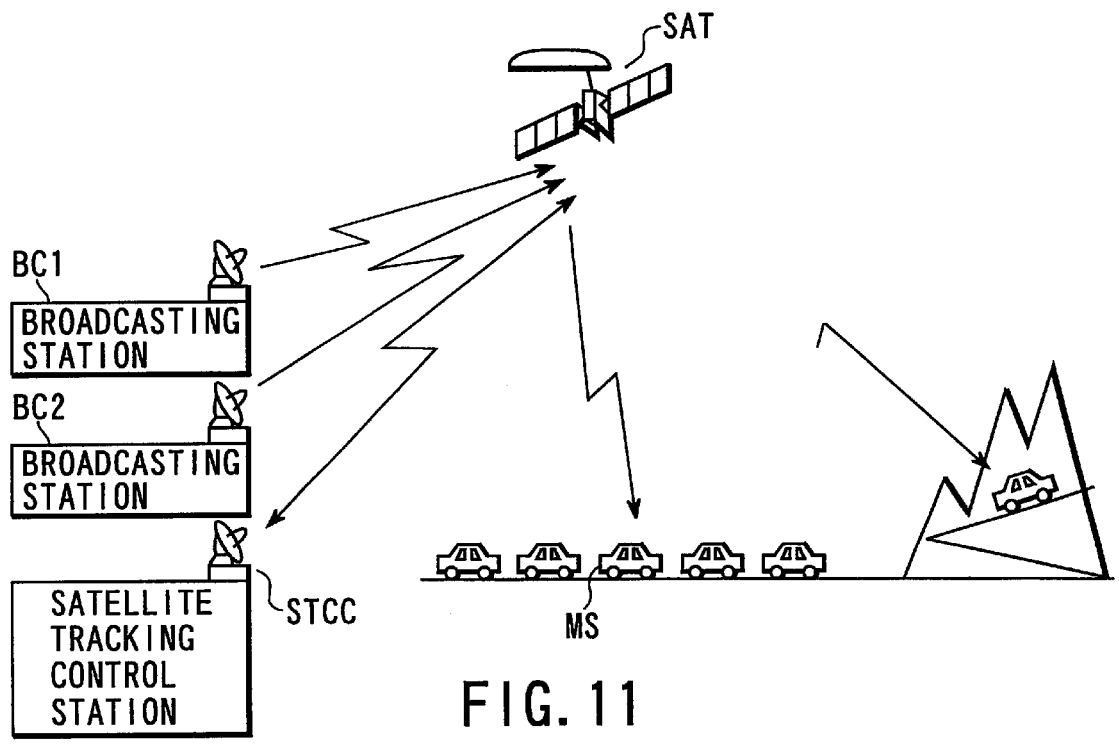
FIG. 11 is a view showing the schematic arrangement of a satellite broadcasting system according to the seventh to ninth embodiments of the present invention.

FIG. 11 is a view showing the schematic arrangement of a satellite broadcasting system according to the seventh to ninth embodiments of the present invention. This satellite broadcasting system includes a plurality of ground broadcasting stations BC1 and BC2 and a broadcasting satellite SAT. Each of the ground broadcasting stations BC1 and BC2 transmits a program signal prepared and edited by a broadcaster to the broadcasting satellite SAT through a Ka- or Ku-band uplink transmission channel. The broadcasting satellite SAT is managed by a satellite tracking control station STCC to keep a predetermined position on the geostationary orbit above the equator.

As shown in FIG. 12, the broadcasting satellite SAT is constructed by attaching, to a satellite main body 21, solar cell panels 22 and 23 serving as power sources, a Ka- or Ku-band antenna 24, and an S-band antenna 25. The Ka- or Ku-band antenna 24 includes a reflecting mirror 241 having a diameter of, e.g., 2.5-m class, and a primary radiator 242. The S-band antenna 25 includes a reflecting mirror 251 having a diameter of, e.g., 8- to 15-m class, and a primary radiator group 252.

A broadcasting signal transmitted from the ground broadcasting station BC1 or BC2 is received by the Ka- or Ku-band antenna 24, demodulated and amplified by a signal processing unit assembled in the satellite main body 21, and converted into a signal in the S-band. The converted broadcasting signal is transmitted from the S-band antenna 25 to a service area through an S-band downlink transmission channel.

In the service area, a fixed station set, e.g., in an office or at home, or a mobile station MS such as an automobile-carried-type receiver or a portable terminal device receives the broadcasting signal from the broadcasting satellite SAT, as shown in FIG. 11.

In the S-band downlink transmission channel, a plurality of channels, a maximum of 900 channels having a transmission rate of, e.g., 64 to 256 kbps/channel are multiplexed using only code division multiplex or both code division multiplex and time division multiplex or frequency division multiplex. To transmit a video signal using a channel, MPEG4 (Moving Picture Expert Group 4) is used as a video coding method.

(Seventh Embodiment)

Figure 13:
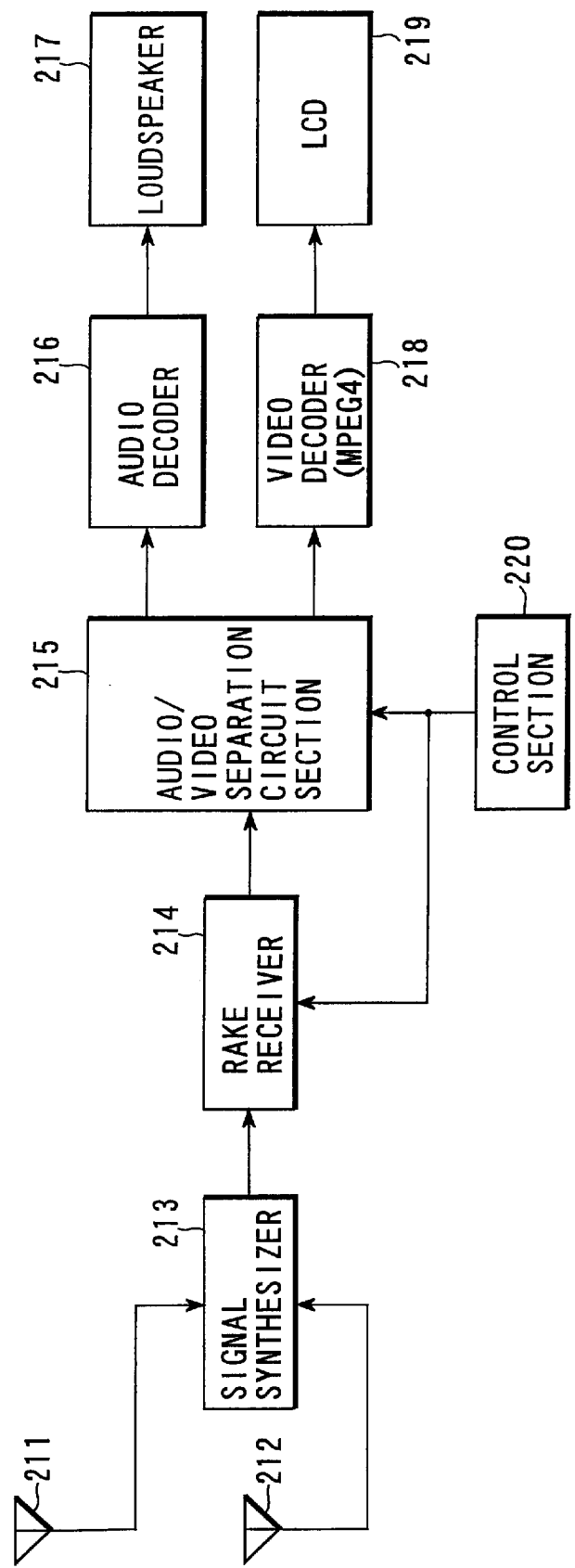
FIG. 13 is a view showing the arrangement of a satellite broadcasting receiver according to the seventh embodiment of the present invention.

FIG. 13 is a view showing the arrangement of a satellite broadcasting receiver according to the seventh embodiment of the present invention. This satellite broadcasting receiver is used in the satellite broadcasting system shown in FIG. 11.

As shown in FIG. 13, the satellite broadcasting receiver of this embodiment includes two antennas 211 and 212, a signal synthesizer 213, a RAKE receiver 214, an audio/video separation circuit section 215, an audio decoder 216, a loudspeaker 217, a video decoder 218, a liquid crystal display (LCD) 219, and a control section 220.

Each of the two antennas 211 and 212 receives a radio wave arriving through the downlink transmission channel and generates a corresponding electrical signal (transmission signal). The antennas 211 and 212 are preferably rod antennas and separated from each other as far as possible.

The transmission signals obtained by the antennas 211 and 212 are synthesized by the signal synthesizer 213, and the synthesized signal is supplied to the RAKE receiver 214. The transmission signal after synthesis by the signal synthesizer 213 is sequentially subjected to known processing such as down-conversion to an IF or a baseband frequency, conversion into a digital signal, spectrum despreading in a plurality of systems, integration in a plurality of systems over one symbol period, synthesis of the integration results of the plurality of systems, deinterleave processing, Viterbi decoding, or error correction decoding, thereby obtaining reception data.

The reception data obtained by the RAKE receiver 214 is supplied to the audio/video separation circuit section 215 and separated into audio data and video data. The audio data is decoded and converted into analog data by the audio decoder 216. The audio data is converted into an audio signal and supplied to the loudspeaker 217, so the audio signal is amplified and output from the loudspeaker 217. The video data is decoded by the video decoder 218 using, e.g., MPEG4 and supplied to the liquid crystal display 219, so a corresponding image is displayed on the liquid crystal display 219.

Tuning control for the RAKE receiver 214 and separation control for the audio/video separation circuit section 215 are performed by the control section 220 on the basis of a predetermined control program.

FIG. 14 is a perspective view showing an example of the set state of the antennas 211 and 212 on a mobile.

In FIG. 14, the antennas 211 and 212 are respectively set near the left corner on the front side and near the right corner on the rear side of a mobile 221 (an automobile in FIG. 14). Since the automobile has an almost rectangular shape when viewed from the upper side, the antennas 211 and 212 are set near diagonal points of the rectangle, respectively. The antennas 211 and 212 are offset from each other in the moving direction of the mobile 221 (direction indicated by an arrow A in FIG. 14) and in a direction perpendicular to the moving direction (direction indicated by an arrow B in FIG. 14).

Figure 15A:
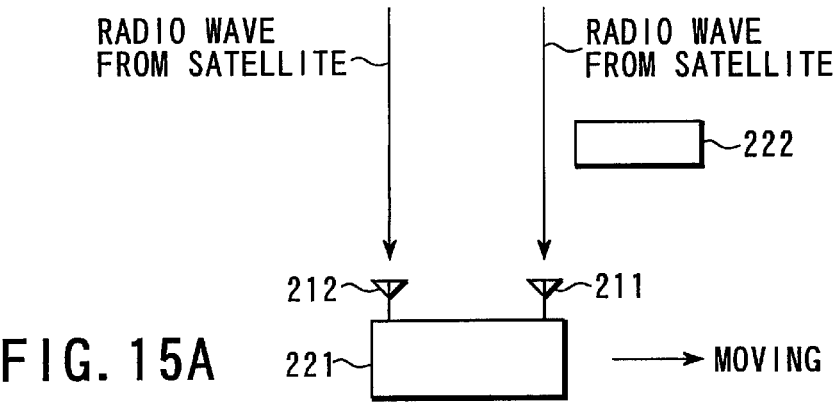
FIGS. 15A to 15C are views showing a change in radio wave arrival at the satellite broadcasting receiver shown in FIG. 13 when a mobile having the satellite broadcasting receiver moves under an obstacle.

With this arrangement, unless an obstacle 222 is present between the mobile 221 carrying the satellite broadcasting receiver of this embodiment and the broadcasting satellite SAT, radio waves from the broadcasting satellite SAT can be received by both the antennas 211 and 212, as shown in FIG. 15A.

At this time, a transmission signal is obtained by each of the antennas 211 and 212, though the two transmission signals may have a phase difference.

However, since the transmission signals obtained by the antennas 211 and 212 are synthesized by the signal synthesizer 213 and the synthesized signal is supplied to the RAKE receiver 214, the transmission signals obtained by the antennas 211 and 212 are used, in the RAKE receiver 214, for RAKE reception as different transmission signals arriving through different paths, i.e., used for reception at high S/N ratio using the path diversity effect. That is, the signal synthesizer 213 performs not processing of phase-matching the transmission signals obtained by the antennas 211 and 212 but simple synthesis.

Figure 15B:
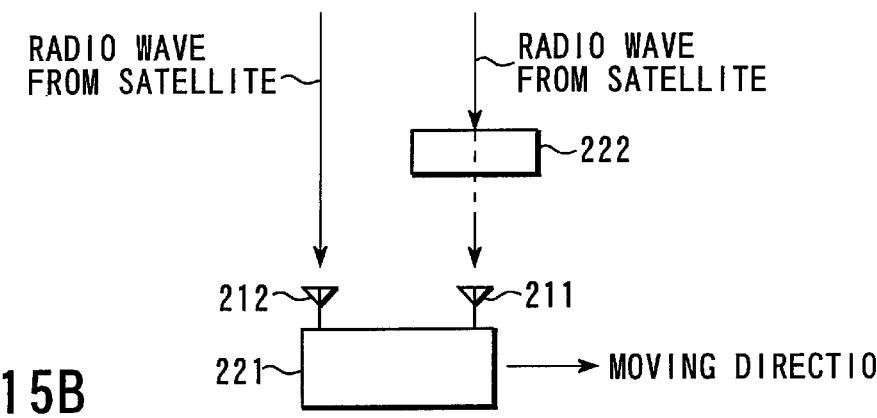

Assume that the mobile 221 in the state shown in FIG. 15A moves in the moving direction shown in FIG. 15A and assumes a state shown in FIG. 15B. The radio wave which is to reach the antenna 211 is shielded by the obstacle 222, so the antenna 211 cannot receive the radio wave.

In this state, however, the radio wave which is to reach the antenna 212 is not shielded by the obstacle 222. Since the antenna 212 can receive the radio wave, the reception operation is continuously performed.

Figure 15C:
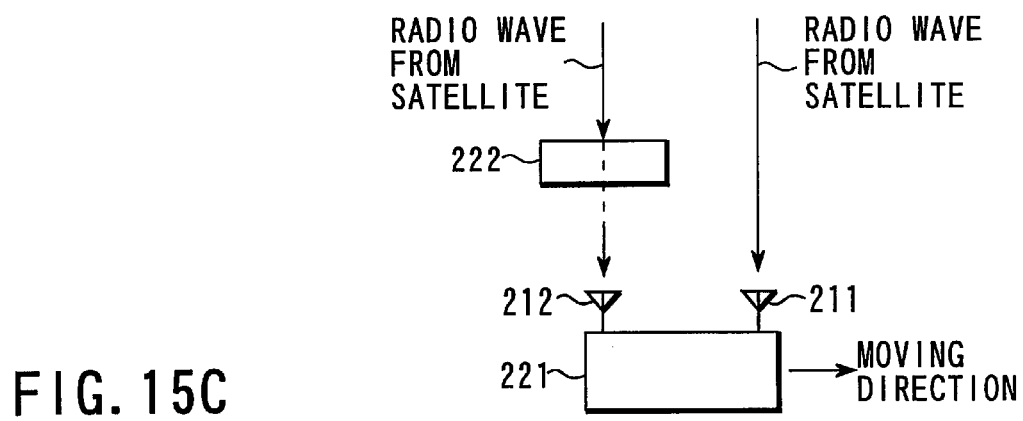

The mobile 221 in the state shown in FIG. 15B further moves in the moving direction shown in FIG. 15B, and the radio wave which is to reach the antenna 212 is shielded by the obstacle 222 to disable radio wave reception by the antenna 212, as shown in FIG. 15C. Even in this case, as far as the width of the obstacle 222 is smaller than the distance between the antenna 211 and the antenna 212 along the moving direction of the mobile 221, the radio wave which is to reach the antenna 211 is not influenced by the obstacle 222 even when the radio wave which is to reach the antenna 212 is shielded by the obstacle 222. Therefore, as shown in FIG. 15C, the antenna 211 can receive the radio wave, and the reception operation is continuously performed.

Figure 16A:
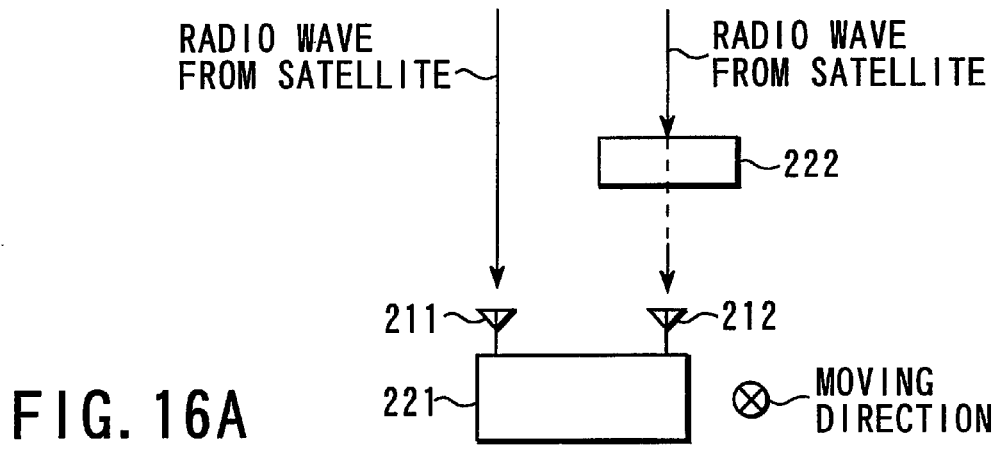
FIGS. 16A and 16B are views showing a change in radio wave arrival at the satellite broadcasting receiver shown in FIG. 13 when the mobile having the satellite broadcasting receiver moves under the obstacle.
Figure 16B:
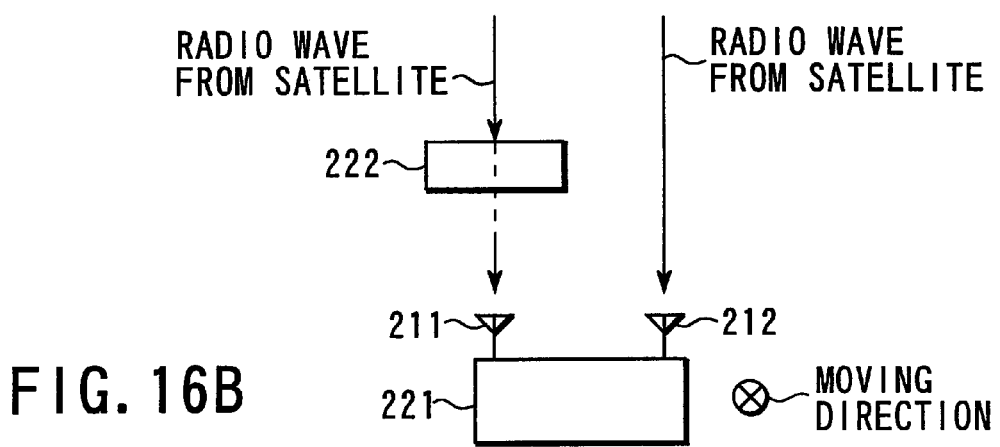

Assume that the obstacle 222 is present only partially above the direction perpendicular to the moving direction of the mobile 221, as shown in FIGS. 16A and 16B. In this situation, even when the radio wave which is to reach one antenna is shielded by the obstacle 222, the radio wave reaches the other antenna, so the reception operation is continuously performed.

In this state, even when the obstacle 222 extends along the moving direction of the mobile 221 over a length larger than the distance between the antenna 211 and the antenna 212 along the moving direction of the mobile 221, the reception operation is continuously performed.

As far as the width of the obstacle 222 is smaller than the distance between the antenna 211 and the antenna 212 along the moving direction of the mobile 221, or the obstacle 222 is present only partially above the direction perpendicular to the moving direction of the mobile 221, the radio wave can always be received even when the mobile 221 passes under the obstacle 222, and no hit takes place.

Even when the width of the obstacle 222 is larger than the distance between the antenna 211 and the antenna 212, the hit time can be shortened because the time when both the antenna 211 and the antenna 212 cannot receive the radio waves is shortened.

Figure 17:
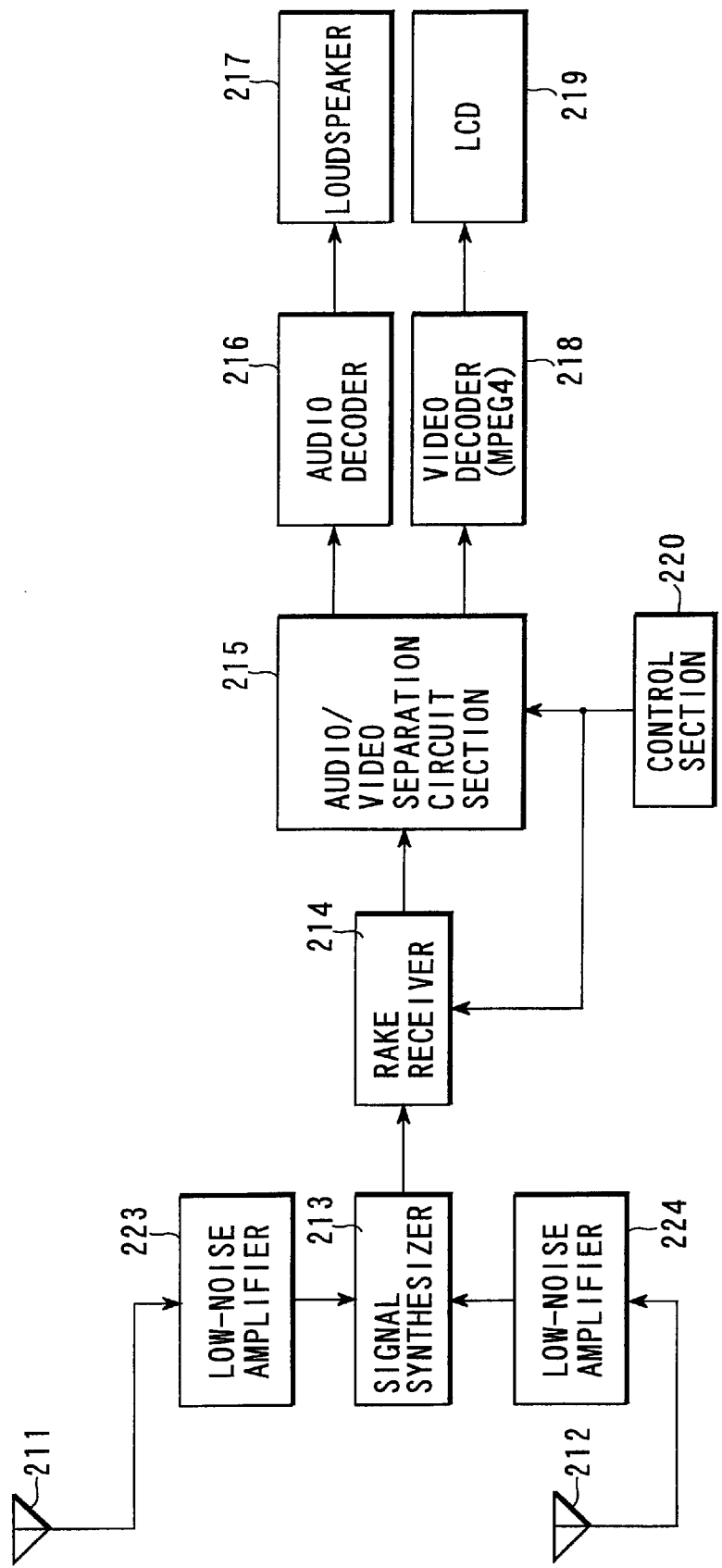
FIG. 17 is a view showing a modification of the satellite broadcasting receiver according to the seventh embodiment.

The satellite broadcasting receiver of this embodiment can be modified by inserting low-noise amplifiers 223 and 224 between the antennas 211 and 212 and the signal synthesizer 213, as shown in FIG. 17, such that the transmission signals can be low-noise-amplified and then synthesized by the signal synthesizer 213.

A space diversity system for performing reception using a plurality of antennas, as in this embodiment, is known. However, the known space diversity system aims to reduce the influence of fading due to multipath transmission and is unnecessary for the system of this embodiment using multipath transmission. The arrangement as a characteristic feature of this embodiment may appear to be similar to the known space diversity system. However, this embodiment allows reception at a high S/N ratio by positively using the multipath signal, so the influence of fading due to multipath transmission is not reduced at all. This means that the arrangement of this embodiment is achieved on the basis of a technical concept different from that of the space diversity system.

(Eighth Embodiment)

Figure 18:
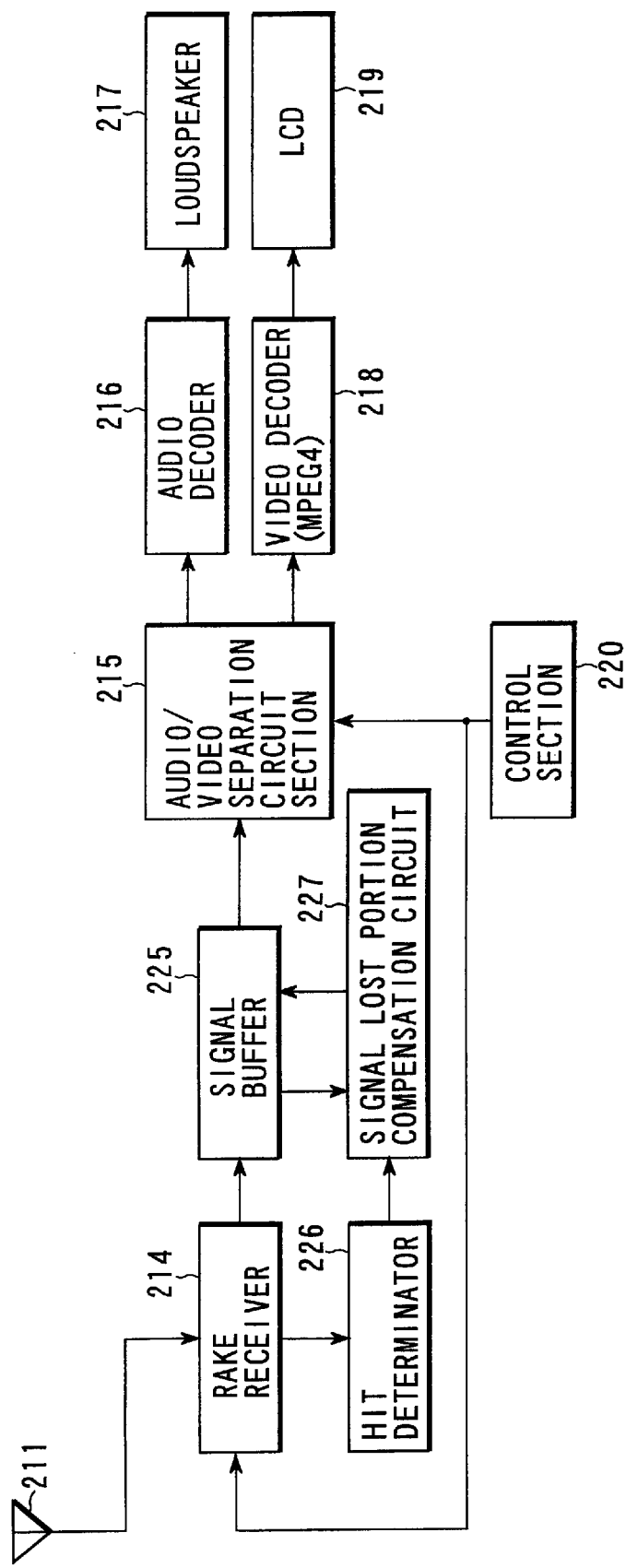
FIG. 18 is a view showing the arrangement of a satellite broadcasting receiver according to the eighth embodiment of the present invention.

FIG. 18 is a view showing the arrangement of a satellite broadcasting receiver according to the eighth embodiment of the present invention. The same reference numerals as in FIG. 13 denote the same parts in FIG. 18, and a detailed description thereof will be omitted.

This satellite broadcasting receiver is used in the satellite broadcasting system shown in FIG. 11.

As shown in FIG. 18, the satellite broadcasting receiver of this embodiment includes an antenna 211, a RAKE receiver 214, an audio/video separation circuit section 215, an audio decoder 216, a loudspeaker 217, a video decoder 218, a liquid crystal display 219, a control section 220, a signal buffer 225, a hit determinator 226, and a signal lost portion compensation circuit 227.

The signal buffer 225 stores and holds reception data obtained by the RAKE receiver 214 for a predetermined time and then supplies it to the audio/video separation circuit section 215. The signal buffer 225 also serves as a work field for reception data processing by the signal lost portion compensation circuit 227.

The hit determinator 226 monitors the operation condition (e.g., the output condition of reception data) of the RAKE receiver 214 and detects a hit. Upon detecting a hit, the hit determinator 226 notifies the signal lost portion compensation circuit 227 of it.

The signal lost portion compensation circuit 227 performs processing of compensating the reception data (lost portion) when the hit determinator 226 detects a hit.

The operation of the satellite broadcasting receiver having the above arrangement will be described next.

If a radio wave sent from a broadcasting satellite SAT normally reaches the antenna 211, the reception data is normally extracted, by the RAKE receiver 214, from the transmission signal obtained by the antenna 211. The reception data obtained by the RAKE receiver 214 is stored and held by the signal buffer 225 and sequentially supplied to the audio/video separation circuit section 215 every time a predetermined time has elapsed. If the radio wave normally continuously reaches the antenna 211, no hit is detected by the hit determinator 226, and the signal lost portion compensation circuit 227 does not perform any processing for the reception data stored in the signal buffer 225. Therefore, the reception data is simply delayed by the buffer 225 for a predetermined time.

Assume that a mobile carrying the satellite broadcasting receiver of this embodiment moves, and an obstacle enters between the broadcasting satellite SAT and the antenna 211. The radio wave sent from the broadcasting satellite SAT is shielded by the obstacle and prevented from reaching the antenna 211. At this time, no transmission signal is supplied to the RAKE receiver 214 anymore, and the reception data output from the RAKE receiver 214 indicates no-signal state.

The hit determinator 226 detects a hit and notifies the signal lost portion compensation circuit 227 of it. In response to this, the signal lost portion compensation circuit 227 generates compensation data for the lost portion by, e.g., copying or estimating the data on the basis of predetermined data (e.g., data of a portion having a high correlation with the lost portion) around the lost portion in the reception data of the normal portion, which is stored and held by the signal buffer 225. The signal lost portion compensation circuit 227 writes the generated compensation data in the signal buffer 225 to compensate for the lost portion.

As described above, according to this embodiment, even when the radio wave is shielded by an obstacle to generate a hit, the lost portion of the reception data due to the hit is compensated for on the basis of the reception data around the normally received portion, so reception data without any lost portion is generated. With this arrangement, degradation in reception quality can be minimized.

(Ninth Embodiment)

Figure 19:
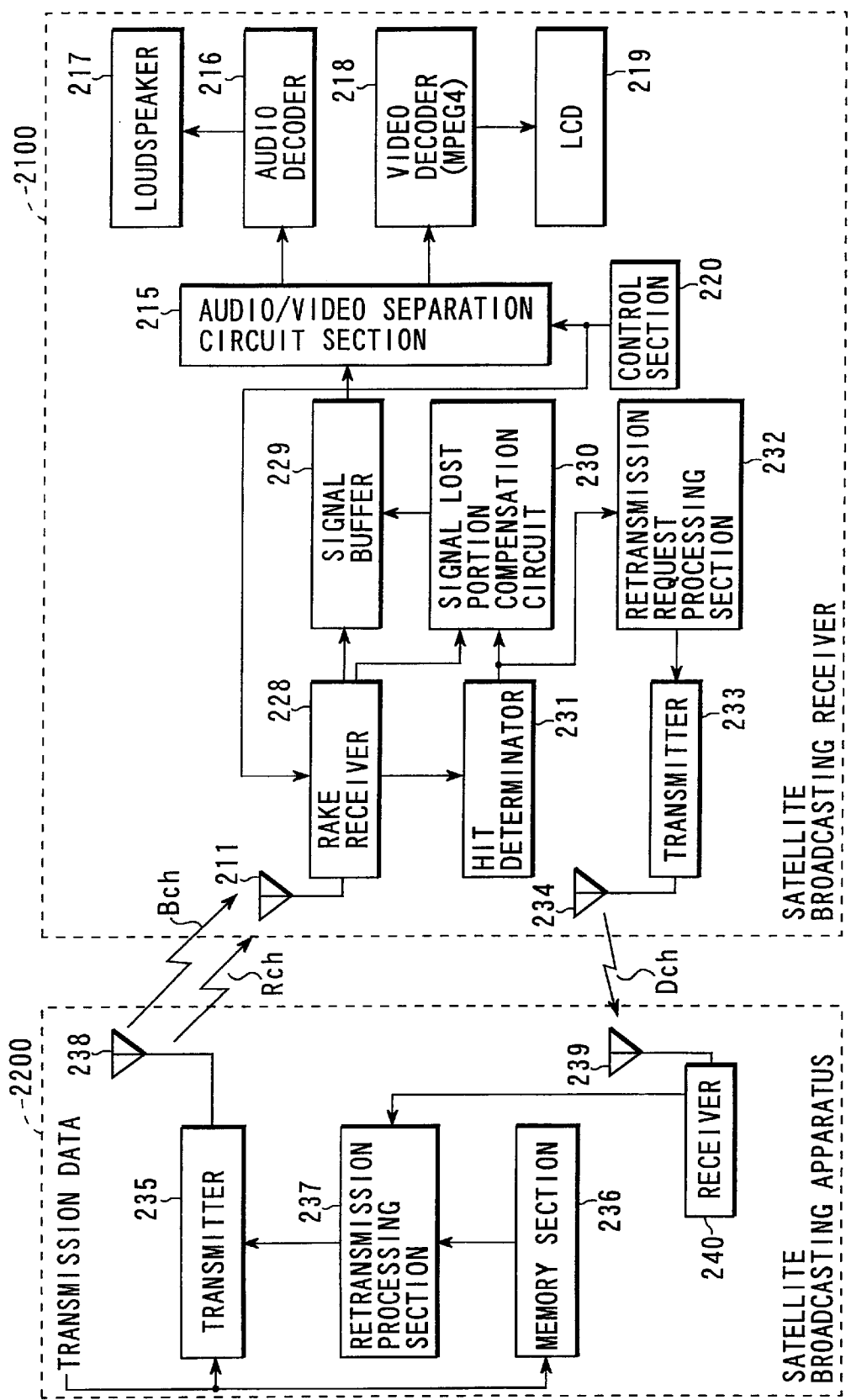
FIG. 19 is a view showing the arrangement of a satellite broadcasting system according to the ninth embodiment of the present invention.

FIG. 19 is a view showing the arrangement of a satellite broadcasting system according to the ninth embodiment of the present invention. The same reference numerals as in FIGS. 13 and 18 denote the same parts in FIG. 19, and a detailed description thereof will be omitted.

The overall arrangement of this satellite broadcasting system is the same as that of the satellite broadcasting system shown in FIG. 11. FIG. 19 shows the arrangements of one of satellite broadcasting receivers 2100 carried by mobile stations MS in FIG. 11 and one of satellite broadcasting apparatuses 2200 set in broadcasting stations BC in FIG. 11.

As shown in FIG. 19, the satellite broadcasting receiver 2100 of this embodiment includes an antenna 211, an audio/video separation circuit section 215, an audio decoder 216, a loudspeaker 217, a video decoder 218, a liquid crystal display 219, a control section 220, a RAKE receiver 228, a signal buffer 229, a signal lost portion compensation circuit 230, a hit determinator 231, a retransmission request processing section 232, a transmitter 233, and an antenna 234.

A transmission signal obtained by the antenna 211 is subjected, in the RAKE receiver 228, to the same reception processing as that in the RAKE receiver 214 of the seventh embodiment to obtain reception data. However, the RAKE receiver 228 extracts reception data associated with an arbitrary one of broadcasting channels Bch, and parallelly, extracts reception data associated with a predetermined retransmission channel Rch. The reception data associated with the arbitrary one of the broadcasting channels Bch is supplied to the signal buffer 229. The reception data associated with the retransmission channel Rch is supplied to the signal lost portion compensation circuit 230.

The reception data associated with the broadcasting channel Bch is stored and held by the signal buffer 229 for a predetermined time, i.e., delayed for a predetermined time, and then supplied to the audio/video separation circuit section 215. The reception data associated with the retransmission channel Rch is used by the signal lost portion compensation circuit 230 to compensate for the lost portion.

The signal lost portion compensation circuit 230 performs processing of compensating the reception data (lost portion) using the reception data associated with the retransmission channel Rch when the hit determinator 231 detects a hit.

The hit determinator 231 monitors the operation condition (e.g., the output condition of the reception data associated with the broadcasting channel Bch) of the RAKE receiver 228 and detects a hit. Upon detecting a hit, the hit determinator 231 notifies the signal lost portion compensation circuit 230 and the retransmission request processing section 232 of it.

When the hit determinator 231 detects a hit, the retransmission request processing section 232 generates retransmission request data for requesting retransmission of the lost portion. The retransmission request data generated by the retransmission request processing section 232 is converted into a predetermined transmission signal to be radio-transmitted by the transmitter 233, and then, sent from the antenna 234 to the satellite broadcasting apparatus 2200 through a request channel Dch.

The satellite broadcasting apparatus 2200 of this embodiment includes a transmitter 235, a memory section 236, a retransmission processing section 237, antennas 238 and 239, and a receiver 240.

In the satellite broadcasting apparatus 2200, transmission data generated by a transmission data generation section (not shown) or the like is supplied to the transmitter 235 and simultaneously supplied to the memory section 236 and stored and held as transmission data which has already been transmitted.

The transmission data is subjected, in the transmitter 235, to processing such as error correction coding, convolution coding, interleave processing, spectrum spreading processing, conversion into an analog signal, up-conversion to a frequency for the broadcasting channel Bch, or power amplification, and then transmitted from the antenna 238 to the satellite broadcasting receiver 2100 via the broadcasting satellite SAT.

When the transmission signal transmitted through the request channel Dch is supplied to the receiver 240 via the antenna 239, the transmission signal is received by the receiver 240, and retransmission request data is reconstructed. The retransmission request data is supplied to the retransmission processing section 237. The retransmission processing section 237 extracts the transmission data of a portion represented by the retransmission request data from the memory section 236, generates retransmission data containing the transmission data, and supplies the retransmission data to the transmitter 235.

The retransmission data is subjected, in the transmitter 235, to processing such as error correction coding, convolution coding, interleave processing, spectrum spreading processing, conversion into an analog signal, up-conversion to a frequency for the retransmission channel Rch, or power amplification, and then transmitted from the antenna 238 to the satellite broadcasting receiver 2100 via the broadcasting satellite SAT.

The operation of the satellite broadcasting system having the above arrangement will be described next.

If a radio wave sent from the broadcasting satellite SAT normally reaches the antenna 211, the reception data is normally extracted, by the RAKE receiver 228, from the transmission signal obtained by the antenna 211. The reception data associated with the broadcasting channel Bch and obtained by the RAKE receiver 228 is stored and held by the signal buffer 229 and sequentially supplied to the audio/video separation circuit section 215 every time a predetermined time has elapsed. If the radio wave normally continuously reaches the antenna 211, no hit is detected by the hit determinator 231, and the signal lost portion compensation circuit 230 does not perform any processing for the reception data stored in the signal buffer 229. Therefore, the reception data associated with the broadcasting channel Bch is simply delayed by the signal buffer 229 for a predetermined time.

In this state, the retransmission request processing section 232 does not generate retransmission request data. When all the remaining satellite broadcasting receivers are in the above-described normal state, no transmission signal is transmitted through the request channel Dch. Hence, no retransmission request data is obtained by the receiver 240, and no retransmission request data is supplied to the retransmission processing section 237. As a result, no retransmission data is generated and output by the retransmission processing section 237.

Assume that the mobile carrying the satellite broadcasting receiver 2100 of this embodiment moves, and an obstacle enters between the broadcasting satellite SAT and the antenna 211. The radio wave sent from the broadcasting satellite SAT is shielded by the obstacle and prevented from reaching the antenna 211. At this time, no transmission signal is supplied to the RAKE receiver 228 anymore, and the reception data output from the RAKE receiver 228 indicates no-signal state.

The hit determinator 231 detects a hit and notifies the signal lost portion compensation circuit 230 and the retransmission request processing section 232 of it.

In response to this, the retransmission request processing section 232 generates retransmission request data for requesting retransmission of the transmission data of the lost portion due to the hit. The retransmission request data reaches the retransmission processing section 237 through the transmitter 233, the antenna 234, the request channel Dch, the antenna 239, and the receiver 240.

Upon receiving the retransmission request data, the retransmission processing section 237 extracts the transmission data of the portion requested by the retransmission request data from the memory section 236 and generates retransmission data containing the transmission data. The retransmission data reaches the signal lost portion compensation circuit 230 through the transmitter 235, the antenna 238, the retransmission channel Rch, the antenna 211, and the RAKE receiver 228. In response to this, the signal lost portion compensation circuit 230 writes the retransmission data in the signal buffer 229 to compensate for the lost portion.

As described above, according to this embodiment, even when the radio wave is shielded by an obstacle to generate a hit, the satellite broadcasting apparatus 2200 retransmits the transmission data of the lost portion generated in the reception data due to the hit, in response to the request from the satellite broadcasting receiver 2100. The satellite broadcasting receiver 2100 compensates for the lost portion using the retransmission data, thereby generating reception data without any lost portion. With this arrangement, degradation in reception quality can be minimized.

The present invention is not limited to the above embodiments. For example, in the above embodiments, the present invention is applied to a satellite broadcasting receiver or a satellite broadcasting apparatus used for a satellite broadcasting system. However, the present invention can also be applied to another radio communication system.

In the seventh embodiment, spread spectrum modulation is used as modulation for multipath transmission. However, the present invention can also be applied to a radio communication apparatus used in a system using another modulation scheme such as multicarrier modulation used in OFDM (Orthogonal Frequency Division Multiplex).

The seventh embodiment can also be applied when three or more antennas are used.

In the seventh embodiment, the antenna 211 and the antenna 212 are respectively set near the left corner on the front side and near the right corner on the rear side of the mobile 221. However, the arrangement is not limited to this.

In the seventh embodiment, an automobile is exemplified as the mobile 221. However, the radio receiver of the present invention can also be carried by another mobile such as a train. For a train, the antenna 211 and the antenna 212 are set at diagonal positions of each car. Alternatively, the antennas may be set at the head of the first car and at the end of the last car.

The eighth or ninth embodiment can incorporate the arrangement of the antennas 211 and 212 and the signal synthesizer 213 in the seventh embodiment.

Various changes and modifications can be made within the spirit and scope of the present invention.

As has been described above in the seventh to ninth embodiments, according to the second aspect of the present invention, in a radio receiver used in a radio communication system for radio-transmitting a transmission signal modulated by a predetermined modulation scheme for multipath transmission using not only a direct wave but also an indirect wave, a reception means performs predetermined multipath reception processing for a synthesis signal obtained by synthesizing, by a signal synthesis means, signals obtained by a plurality of antennas spaced apart from each other.

As another form, in a radio receiver used in a radio communication system for radio-transmitting a predetermined transmission signal, transmission data demodulated from the radio-transmitted transmission signal by a reception means is stored in a storage means at least for a predetermined time. A hit in the transmission signal received by the reception means is monitored by a hit detection means. Transmission data corresponding to a transmission signal portion where a hit is detected is compensated by a compensation means on the basis of the transmission data stored in the storage means or using transmission data demodulated from a transmission signal retransmitted by a retransmission means in the radio broadcasting apparatus in response to a retransmission request sent by a retransmission request means.

With this arrangement, the influence of a hit due to an obstacle can be minimized, and a satisfactory reception quality can be obtained.

The third aspect of the present invention will be described next throughout the 10th to 16th embodiments.

(10th Embodiment)

FIG. 20 is a schematic view showing a satellite broadcasting system having a gap filler function according to the 10th embodiment of the present invention.

This satellite broadcasting system includes a plurality of ground broadcasting stations (VSAT) BC1 and BC2 or feeder link stations, a geostationary satellite SAT1, and a satellite tracking control station STCC.

Each of the ground broadcasting stations (VSAT) BC1 and BC2 or feeder link stations transmits program information prepared and edited by a broadcaster to the geostationary satellite SAT1 through an uplink transmission channel in the Ka band (26.5 to 40 GHz) or the Ku band (12.5 to 18 GHz).

The geostationary satellite SAT1 has a Ka-band or Ku-band antenna having a diameter of 2.5-m class and an S-band (e.g., 2.6 GHz) antenna having a diameter of 15-m class. A broadcasting signal multiplexed and transmitted from one of the broadcasting stations (VSAT) BC1 and BC2 or the feeder link stations is received and amplified by the Ka- or Ku-band antenna and then converted into a signal for the S band. The converted broadcasting signal is transmitted from the S-band antenna to a service area through a downlink transmission channel in the S band. The uplink transmission antenna carried by the geostationary satellite SAT1 may have a diameter smaller than 2.5-m class. The S-band antenna may also have a diameter of not 15-m class but 8-m class.

The satellite tracking control station STCC monitors and controls the operation state of the geostationary satellite SAT1.

In the service area, a broadcasting receiver (not shown) stationarily set, e.g., in an office or at home or a movable broadcasting receiver MS carried by an automobile or carried as a portable device receives the broadcasting signal transmitted from the geostationary satellite SAT1 to the S-band downlink transmission channel in the S band. In the S-band downlink transmission channel, a plurality of channels, a maximum of 900 channels having a transmission rate of 64 to 256 Kbps/channel are multiplexed. To transmit a video signal using a channel, MPEG4 (moving picture experts group 4) is used as a video coding method.

In the system of the 10th embodiment, a gap filler apparatus GFa is set on, e.g., the rooftop of a high-rise building. The gap filler apparatus GFa receives the broadcasting signal from the geostationary satellite SAT1, amplifies it, and then retransmits the received broadcasting signal to an area behind a building or the like where the broadcasting signal from the geostationary satellite SAT1 cannot be received while holding the same frequency. The gap filler apparatus GFa has the following arrangement.

FIG. 21 is a block diagram showing the arrangement of the gap filler apparatus GFa. A broadcasting signal transmitted from the geostationary satellite SAT1 is received by a reception antenna 311 and input to an signal synthesizer 213. After only a predetermined transmission band is selected by the input filter 312, the signal is amplified by a low-noise amplifier 313. The amplified broadcasting signal is amplified by a power amplifier 314, limited to a predetermined transmission band by an output filter 315, and then transmitted from a transmission antenna 316 to a dead area such as an area behind a building where the direct wave from the geostationary satellite SAT1 does not reach. As the output antenna 316, a directional antenna is used to limit the broadcasting signal transmission range to the dead area where the direct wave from the geostationary satellite SAT1 cannot be received.

With this arrangement, the broadcasting signal transmitted from each of the ground broadcasting stations BC1 and BC2 or feeder link stations is sent to the geostationary satellite SAT1 through the Ka- or Ku-band uplink transmission channel, and then transmitted from the geostationary satellite SAT1 to the service area through the S-band downlink transmission channel and received by a broadcasting receiver MS in the service area. Since the geostationary satellite SAT1 has a large-diameter S-band antenna of 15-m class, and the S-band can hardly be influenced by rain attenuation, each broadcasting receiver MS receives the broadcasting signal with a sufficiently high reception field strength. For this reason, the broadcasting receiver MS can receive the broadcasting signal using a compact rod antenna or planar antenna.

However, the broadcasting receiver MS in the dead area behind a building where the direct wave from the geostationary satellite SAT1 cannot be received cannot directly receive the broadcasting signal. The broadcasting signal transmitted from the geostationary satellite SAT1 is received by the gap filler apparatus GFa and then repeated and transmitted to the dead area behind the building. With this arrangement, the broadcasting receiver MS behind the building can also receive the broadcasting signal.

The broadcasting signal repeated and transmitted from the gap filler apparatus GFa is set at the same frequency as that of the broadcasting signal sent from the geostationary satellite SAT1. For this reason, the broadcasting receiver MS behind a building can receive the broadcasting signal from the gap filler apparatus GFa without using any special receiver as far as it has a receiver for receiving the broadcasting signal from the geostationary satellite SAT1.

The gap filler apparatus GFa transmits the broadcasting signal to the dead area behind a building while limiting the broadcasting range by using the directional antenna. Even when the signal transmitted from the gap filler apparatus GFa is set at the same frequency as that of the signal sent from the geostationary satellite SAT1, the transmission signal from the gap filler apparatus GFa is prevented from interfering with the signal from the geostationary satellite SAT1 around the dead area behind a building. Thus, the broadcasting receiver MS can receive the broadcasting signal at a high quality in any area.

(11th Embodiment)

Generally, when a radio signal is transmitted from a geostationary satellite arranged on the geostationary orbit above the equator, an obstacle such as a building on the ground shades the radio wave on the north side. Paying attention to this point, in the 11th embodiment of the present invention, in an area where a number of buildings stand, a gap filler apparatus repeats and transmits a broadcasting signal with directivity in the east-and-west direction.

Figure 22:
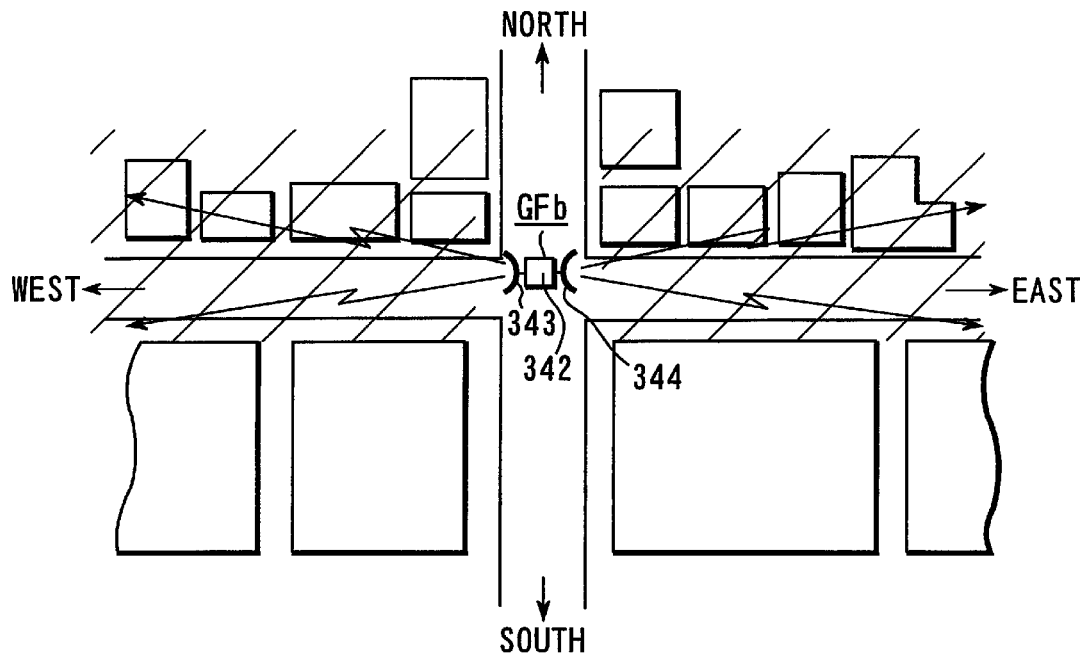
FIG. 22 is a plan view for explaining a satellite broadcasting system according to the 11th embodiment of the present invention.
Figure 23:
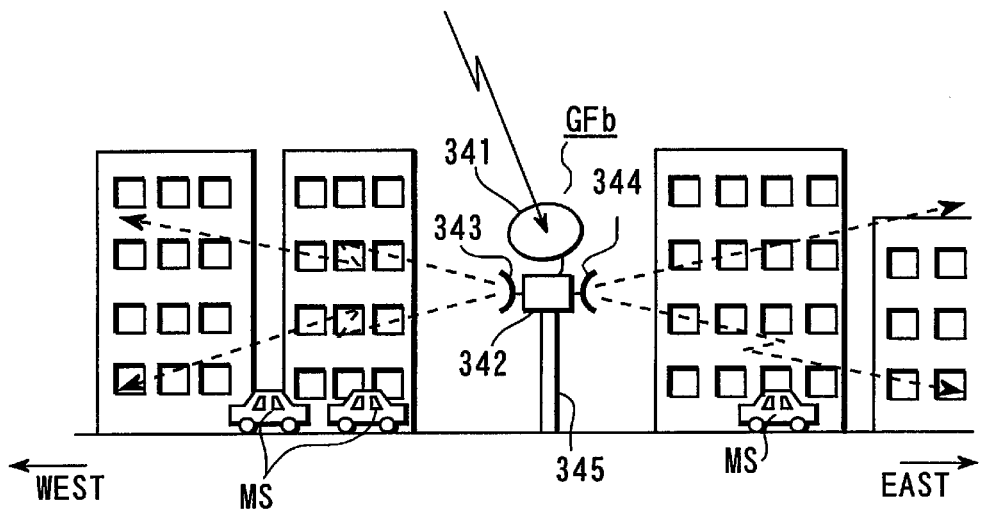
FIG. 23 is a front view for explaining the satellite broadcasting system according to the 11th embodiment.

FIGS. 22 and 23 are views for explaining this embodiment. In shopping or business quarters where buildings stand close together along a street, a band-shaped dead area where a radio signal from a geostationary satellite SAT1 cannot be directly received extends in the east-and-west direction on the north side of the buildings, as indicated by a hatched portion in FIG. 22.

In this embodiment, a gap filler apparatus GFb is set at, e.g., a large intersection where the broadcasting signal from the geostationary satellite SAT1 can be directly received. To set the gap filler apparatus GFb, for example, a post 345 is planted on a paved street, and the gap filler apparatus GFb is fixed on the post 345.

The gap filler apparatus GFb has a main body 342 accommodating transmission/reception circuit sections such as a low-noise amplifier and a power amplifier. An antenna 341 for receiving the broadcasting signal from the geostationary satellite SAT is attached to the upper portion of the main body 342. In addition, retransmission antennas 343 and 344 are attached to two side surface portions of the main body 342, which oppose each other. The retransmission antennas 343 and 344 are set such that a retransmission radio signal is transmitted in the east-and-west directions.

If an existing post such as a road sign post, a signal post, or a utility pole planted on a sidewalk or the like can be used, the gap filler apparatus GFb may be set on the existing post without providing the dedicated post 345.

In this embodiment, the broadcasting signal sent from the geostationary satellite SAT1 is received and amplified by the gap filler apparatus GFb, and then transmitted from the repeater antennas 343 and 344 with directivity in the east-and-west directions as shown in FIGS. 22 and 23. Therefore, with a small number of gap filler apparatuses, a gap area where the broadcasting signal from the geostationary satellite SAT1 cannot be directly received can be effectively covered.

The gap filler apparatus GFb is not limited to an arrangement in which the satellite reception antenna 341 and the retransmission antennas 343 and 344 are integrally attached to the main body 342. For example, the main body 342 having the satellite reception antenna 341 is set, e.g., on the rooftop of a building where the signal from the geostationary satellite SAT1 can be more reliably received. The repeater antennas 343 and 344 are attached to a road sign post, a signal post, or a utility pole planted in an intersection. The main body 342 and the retransmission antennas 343 and 344 are connected through a coaxial cable. With this arrangement, although connection between the main body 342 and the retransmission antennas 343 and 344 slightly becomes cumbersome, a gap filler apparatus having high reception performance can be provided. As the antennas 343 and 344, compact patch antennas can be used.

To cover a band-shaped dead area in a wide range, a gap filler apparatus GFc is set at a high position such as the rooftop of a building, as shown in FIG. 24, and the signal is transmitted from the rooftop to the dead area with directivity. FIG. 24 shows a case wherein a dead area several ten km to several km wide is covered with this arrangement.

Figure 25:
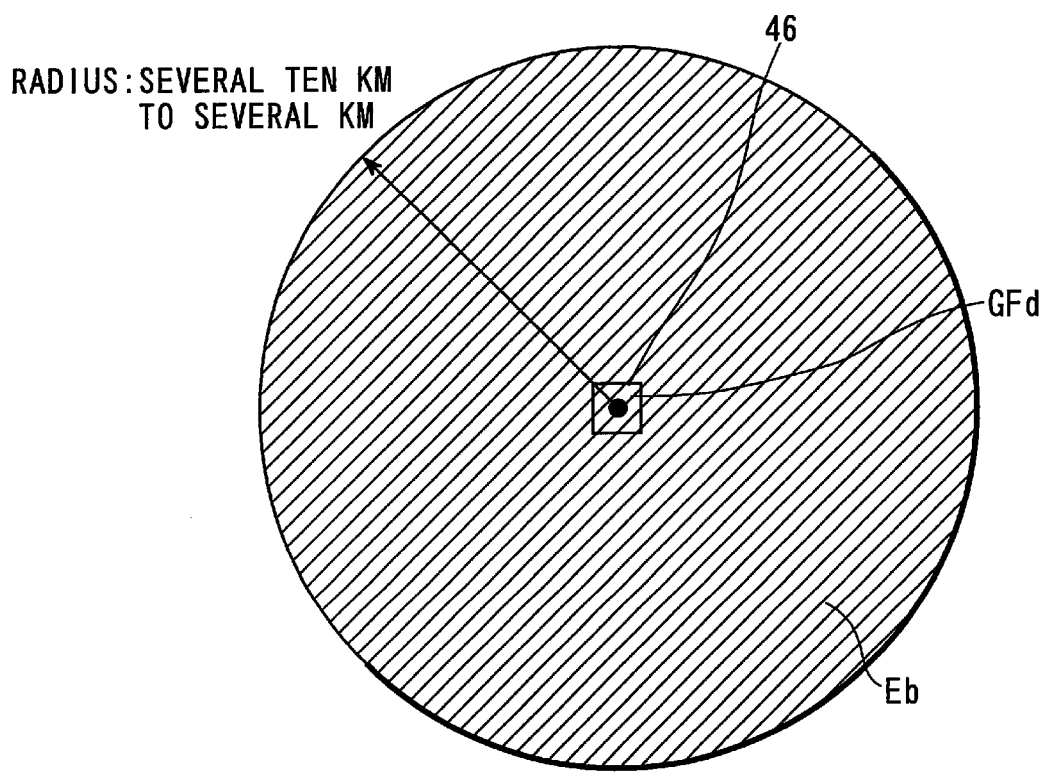
FIG. 25 is a view for explaining coverage of the dead area in the satellite broadcasting system according to the 11th embodiment.

Depending on the shape of the dead area, a gap filler apparatus GFd may be set on a pylon or the like, as shown in FIG. 25, and a broadcasting signal may be repeated and transmitted from the gap filler apparatus GFd using a non-directional antenna. With this arrangement, a wide, circular dead area can be covered.

(12th Embodiment)

In the 12th embodiment of the present invention, a plurality of channel signals to be transmitted from a ground broadcasting station to a satellite are multiplexed by CDM (Code Division Multiplex). A gap filler apparatus amplifies the multiplexed CDM broadcasting signal arriving via the satellite, and repeats and transmits it to a gap area behind a building or the like.

Figure 26:
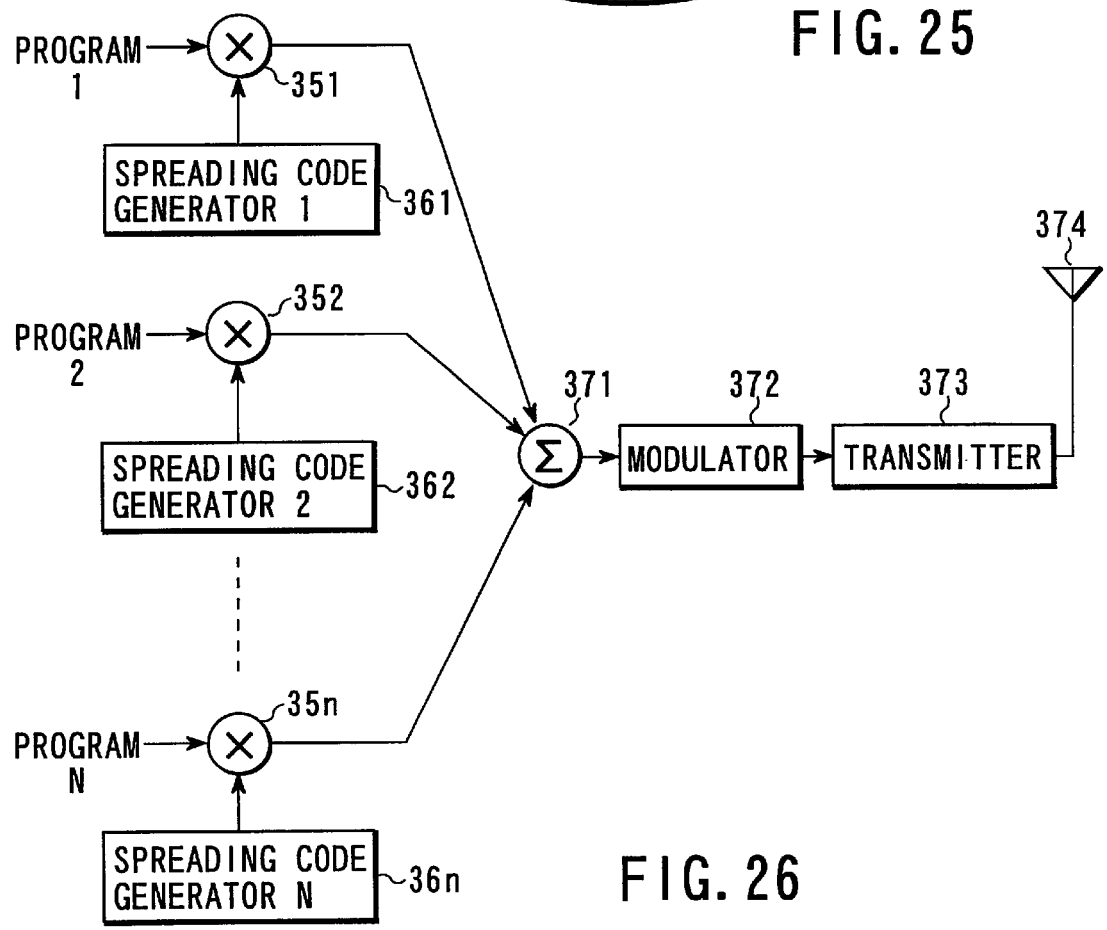
FIG. 26 is a block diagram showing the arrangement of a transmission section of a ground broadcasting station used in a satellite broadcasting system having a gap filler function according to the 12th embodiment of the present invention.

FIG. 26 is a block diagram showing the arrangement of a transmission section in a ground broadcasting station BC1 or BC2. Broadcasting signals of a plurality of programs (N programs in FIG. 26) edited by a circuit (not shown) are input to modulators 351 to 35n, respectively. The modulators 351 to 35n spread-spectrum-modulate the broadcasting signals using different spreading codes generated from spreading code generators 361 to 36n, respectively. The broadcasting signals spread-spectrum-modulated by the modulators 351 to 35n are synthesized into one multiplexed broadcasting signal by a synthesizer 371 and input to a modulator 372. The modulator 372 further modulates the multiplexed broadcasting signal by digital modulation such as QPSK or QAM. The modulated multiplexed broadcasting signal is frequency-converted into a Ka- or Ku-band radio signal by a transmitter 373. The radio signal is amplified to a predetermined transmission power level and then transmitted from an antenna 374 to the geostationary satellite.

The geostationary satellite frequency-converts the CDM-multiplexed broadcasting signal transmitted from the ground broadcasting station BC1 or BC2 or a feeder link station into an S-band signal, amplifies it to a predetermined power level, and then transmits it to a ground service area.

The gap filler apparatus receives the CDM-multiplexed broadcasting signal transmitted from the geostationary satellite, amplifies the reception signal to the transmission power level for gap filler, and transmits it to a dead area.

Figure 27:
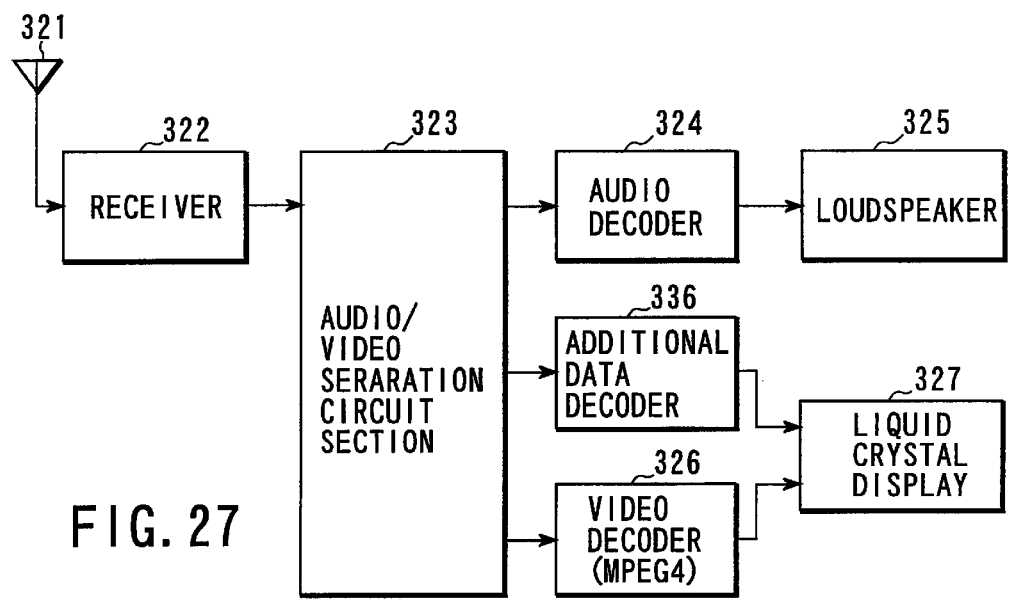
FIG. 27 is a block diagram showing the arrangement of a broadcasting receiver used in the satellite broadcasting system having a gap filler function according to the 12th embodiment.

A broadcasting receiver MS has the following arrangement. FIG. 27 is a block diagram showing the arrangement of the broadcasting receiver MS. In FIG. 27, the CDM-multiplexed broadcasting signal transmitted from the geostationary satellite and the gap filler apparatus is received by an antenna 321 and input to a receiver 322. The receiver 322 receives and reconstructs a broadcasting signal in the CDM-multiplexed broadcasting signal, which corresponds to a channel designated by the user, by RAKE reception, and the reconstructed reception signal is input to an audio/video separation circuit section 323.

The audio/video separation circuit 323 separates the reconstructed reception signal into audio data, video data, and additional data such as text data. The separated received audio data is input to an audio decoder 324. The received video signal is input to a video decoder 326. The additional data is input to an additional data decoder 328. The audio decoder 324 decodes the received audio data to reconstruct the audio signal, and the audio signal is amplified and output from a loudspeaker 325. The video decoder 326 decodes the received video data by, e.g., MPEG4 and supplies the decoded video signal to a liquid crystal display 327 and causes the liquid crystal display 327 to display the video signal. The additional data decoder 328 decodes the additional data such as text data and causes the liquid crystal display 327 to display the decoded data together with the video signal.

Figure 28:
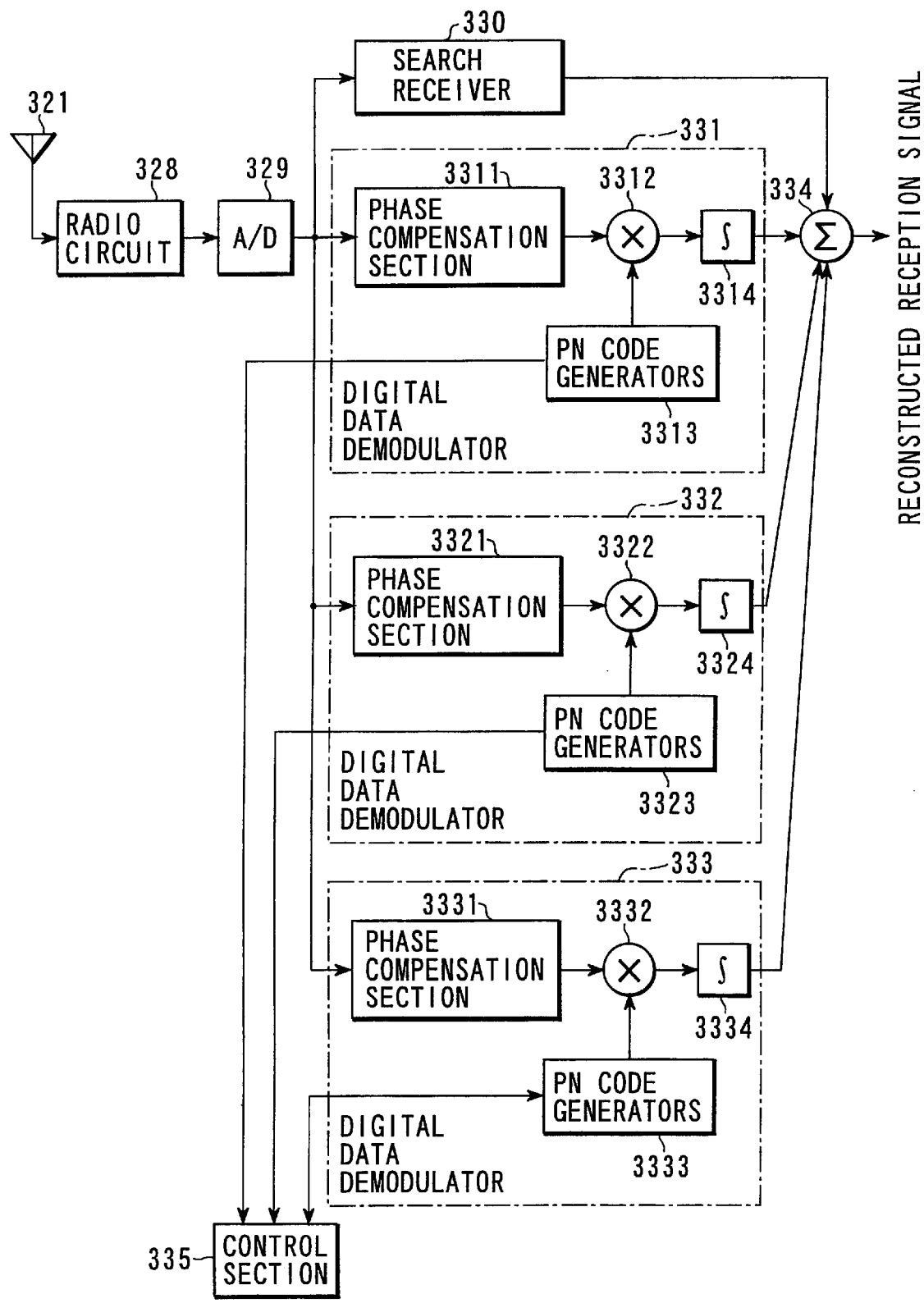
FIG. 28 is a block diagram showing the arrangement of the receiver of the broadcasting receiver shown in FIG. 27.

The receiver 322 has the following arrangement. FIG. 28 is a block diagram showing the arrangement of the receiver 322. The CDM-multiplexed broadcasting signal arriving from the geostationary satellite and the gap filler apparatus is down-converted from the radio frequency into a baseband frequency by a radio circuit 328. The received baseband signal is digitized by an analog/digital converter (A/D) 329 at a predetermined sampling period and then input to a search receiver 330 and three digital data demodulators 331, 332, and 333.

The search receiver 330 receives and demodulates a pilot signal transmitted from the ground broadcasting station BC1 or BC2 and basically has the same arrangement as that of each of the digital data demodulators 331, 332, and 333 to be described below.

Each of the digital data demodulators 331, 332, and 333 demodulates a broadcasting signal of the CDM-multiplexed broadcasting signal arriving from the geostationary satellite or the CDM-multiplexed broadcasting signal arriving from the gap filler apparatus, which corresponds to the channel designated by the user, by RAKE reception.

More specifically, the digital data demodulators 331, 332, and 333 generate unique clocks with reference to the sampling clock of the A/D converter 329 and independently operate on the basis of the unique clocks. Each digital data demodulator has an initial capture section, a clock tracking section, and a data demodulation section. The data demodulation sections respectively include phase compensation sections 3311, 3321, and 3331, multipliers 3312, 3322, and 3332, PN code generators 3313, 3323, and 3333, and an accumulators 3314, 3324, and 3334.

The phase compensation sections 3311, 3321, and 3331 perform phase compensation of the reception signal for path diversity. The multipliers 3312, 3322, and 3332 multiply the reception signals output from the phase compensation sections 3311, 3321, and 3331 by PN codes corresponding to the designated channel, which are generated from the PN code generators 3313, 3323, and 3333, respectively, to despread the spectra of the reception signals. The accumulators 3314, 3324, and 3334 integrate the reception signals despread and output from the multipliers 3312, 3322, and 3332, respectively. The integration outputs are input to a symbol synthesizer 334.

The symbol synthesizer 334 synthesizes the integration outputs of the reception signals, which are output from the digital data demodulators 331, 332, and 333, to reconstruct the data component, and supplies the reconstructed data component to the audio/video separation circuit section 323 shown in FIG. 27.

A control section 335 has a microcomputer as a main control section and has, as a control function associated with RAKE reception, a path position detection means and a PN code generation control means. The path position detection means detects, from the pilot signal received by the search receiver 32, the path position of the signal arriving from the geostationary satellite SAT and the path position of the signal arriving from the gap filler apparatus. The PN code generation control means calculates an optimum PN address value on the basis of the path position detection result and supplies the PN address value to the PN code generators 3313, 3323, and 3333 of the three digital data demodulators 331, 332, and 333. With this operation, the chip phases of the PN codes generated from the PN code generators 3313, 3323, and 3333 are variably controlled.

When the broadcasting receiver MS having the above arrangement is used, the CDM-multiplexed broadcasting signal sent from the geostationary satellite and the CDM-multiplexed broadcasting signal retransmitted from the gap filler apparatus can be received, reconstructed, and synthesized as if a multipath signal were received. That is, the CDM-multiplexed broadcasting signal sent from the geostationary satellite and the CDM-multiplexed broadcasting signal repeated and transmitted from the gap filler apparatus can be received by path diversity. For this reason, even when the broadcasting receiver MS is positioned in an area where both the CDM-multiplexed broadcasting signal from the geostationary satellite and the signal repeated and transmitted from the gap filler apparatus can be received, high-quality reception can be performed without causing interference between the two signals.

According to this embodiment, since interference between the CDM-multiplexed broadcasting signal from the geostationary satellite and the signal repeated and transmitted from the gap filler apparatus due to the same frequency need not be taken into consideration, the directivity of the signal to be retransmitted from the gap filler apparatus need not be strictly adjusted, so the gap filler apparatus can be easily set.

(13th Embodiment)

In the 13th embodiment of the present invention, two geostationary satellites, i.e., a main satellite and a spare satellite, are spaced apart by a predetermined distance in the same geostationary orbit. Identical broadcasting signals are transmitted from these geostationary satellites to a service area in synchronism with each other. This arrangement allows even a broadcasting receiver MS in an area where the broadcasting signal from the main satellite cannot be received to receive the broadcasting signal from the spare satellite.

Figure 29:
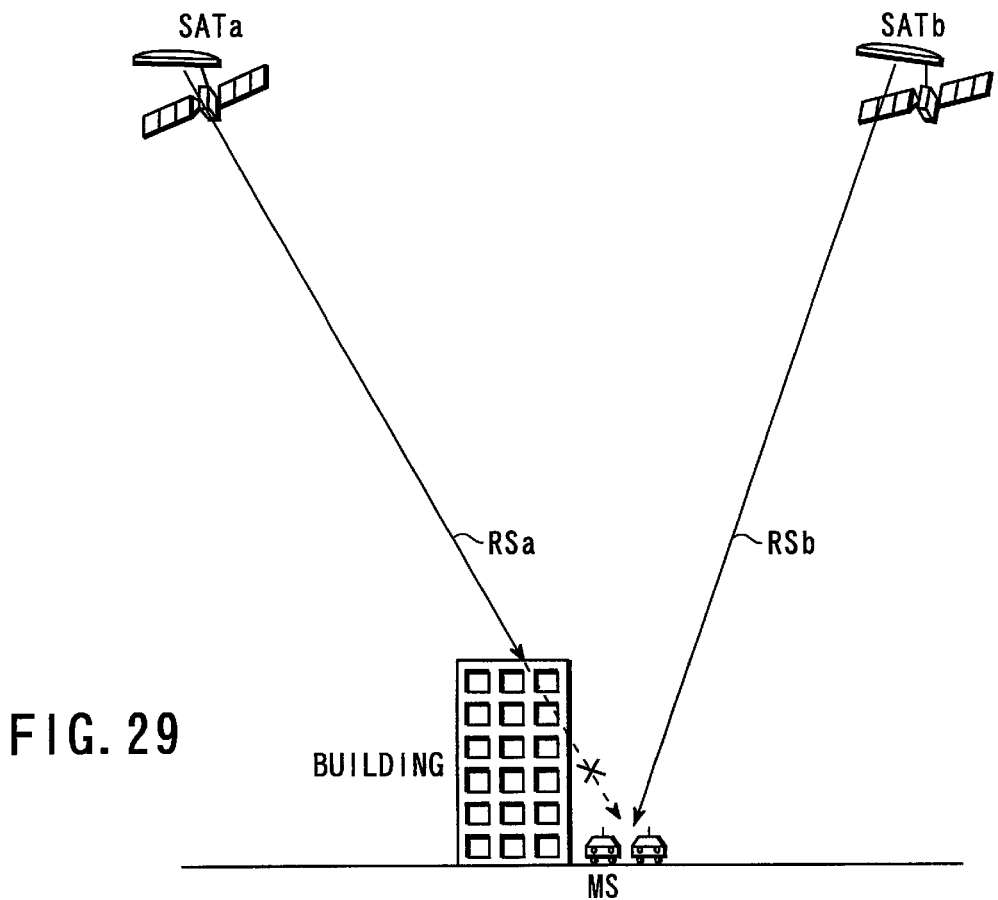
FIG. 29 is a schematic view showing a satellite broadcasting system having a gap filler function according to the 13th embodiment of the present invention.

FIG. 29 is a schematic view of a satellite broadcasting system according to this embodiment. In FIG. 29, two geostationary satellites SATa and SATb are placed in the geostationary orbit while being spaced apart by a predetermined distance. One of the geostationary satellites SATa and SATb functions as a main satellite, and the other functions as a spare satellite. The spare satellite does not stand by but transmits the same broadcasting signal as that from the main satellite even while the main satellite is normally functioning.

With this arrangement, the mobile station MS in an area where a broadcasting signal RSa from the main satellite SATa cannot be received because of a building, as shown in FIG. 26, can receive a broadcasting signal RSb from the spare satellite SATb. Conversely, the mobile station MS in an area where the broadcasting signal RSb from the spare satellite SATb cannot be received can receive the broadcasting signal RSa from the main satellite SATa. Therefore, according to this embodiment, the gap area can be eliminated without setting any gap filler apparatus on the ground. In addition, in this embodiment, the gap filler effect is realized by using an existing spare satellite. For this reason, no new satellite need be launched, and the system can be realized at low cost.

(14th Embodiment)

In the 14th embodiment of the present invention, a broadcasting signal transmitted from a ground broadcasting station or a feeder link station is frequency-converted, in a geostationary satellite, into a first broadcasting signal for a broadcasting receiver and a second broadcasting signal for a gap filler apparatus, which have different frequencies, and transmitted. The gap filler apparatus receives the second broadcasting signal, converts it into a broadcasting signal having the same frequency as that of the first broadcasting signal, and then repeats and transmits the broadcasting signal to a dead area.

Figure 30:
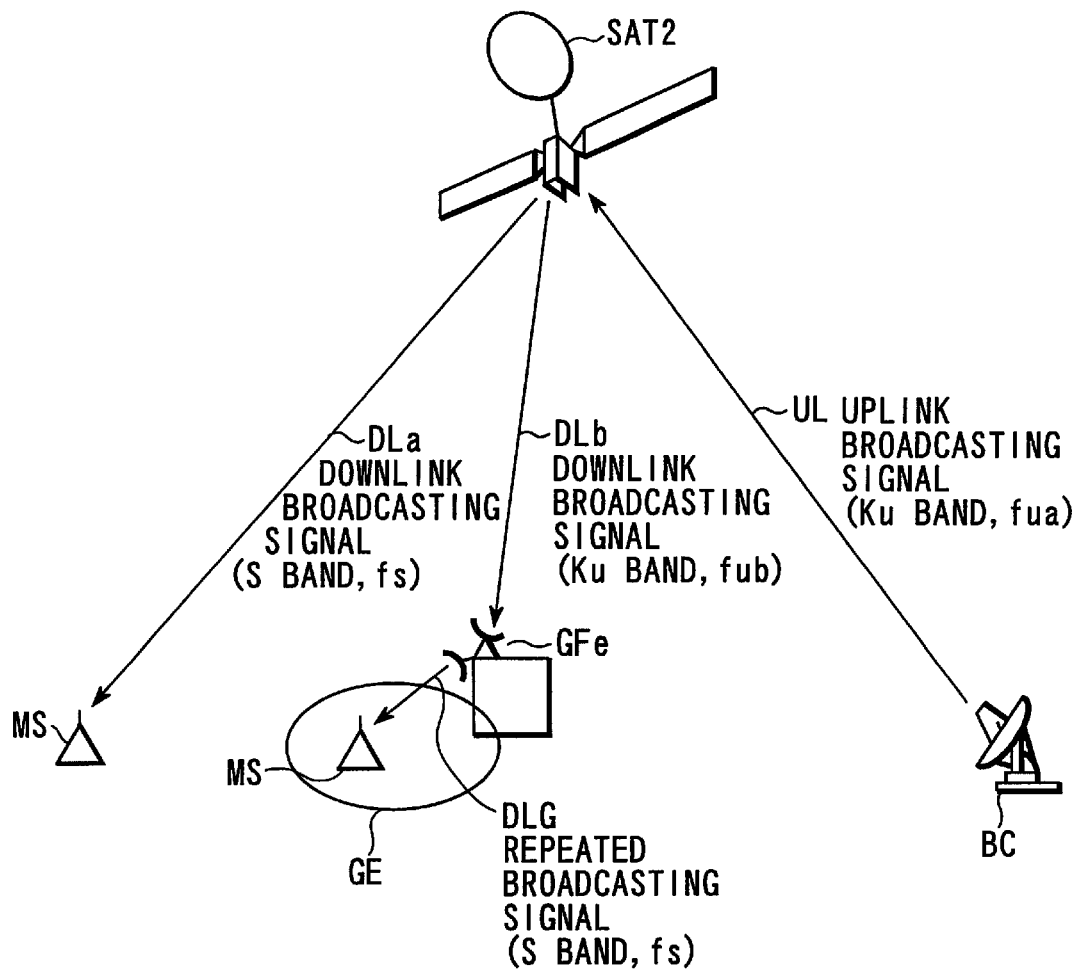
FIG. 30 is a schematic view showing a satellite broadcasting system having a gap filler function according to the 14th embodiment of the present invention.
Figure 31:
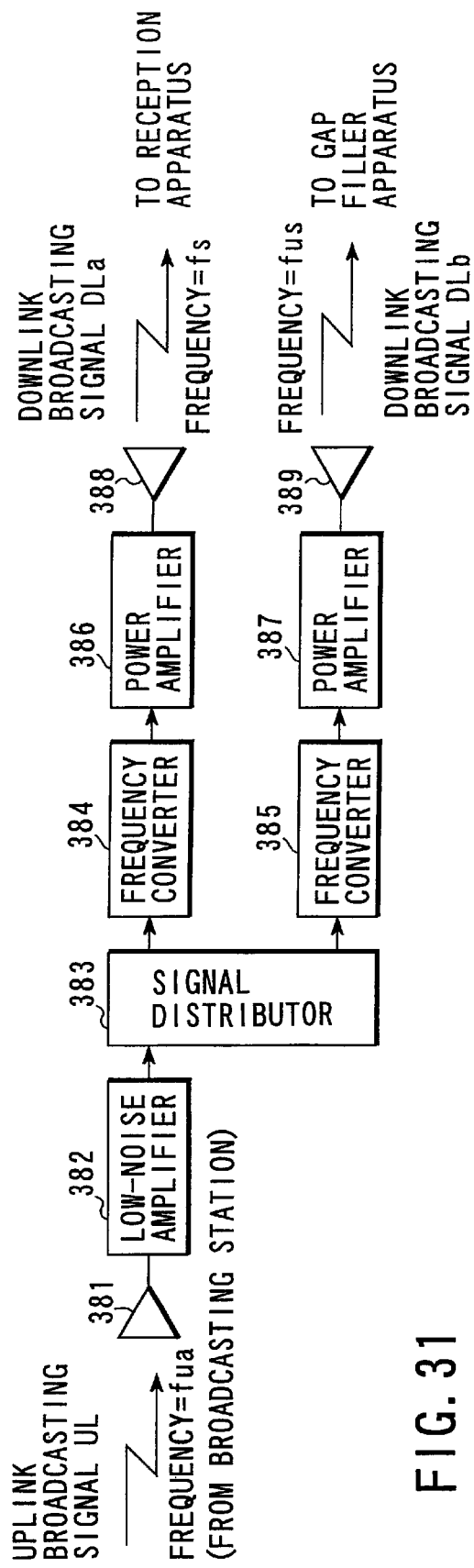
FIG. 31 is a block diagram showing the arrangement of a transponder of a geostationary satellite used in the system shown in FIG. 30.
Figure 32:
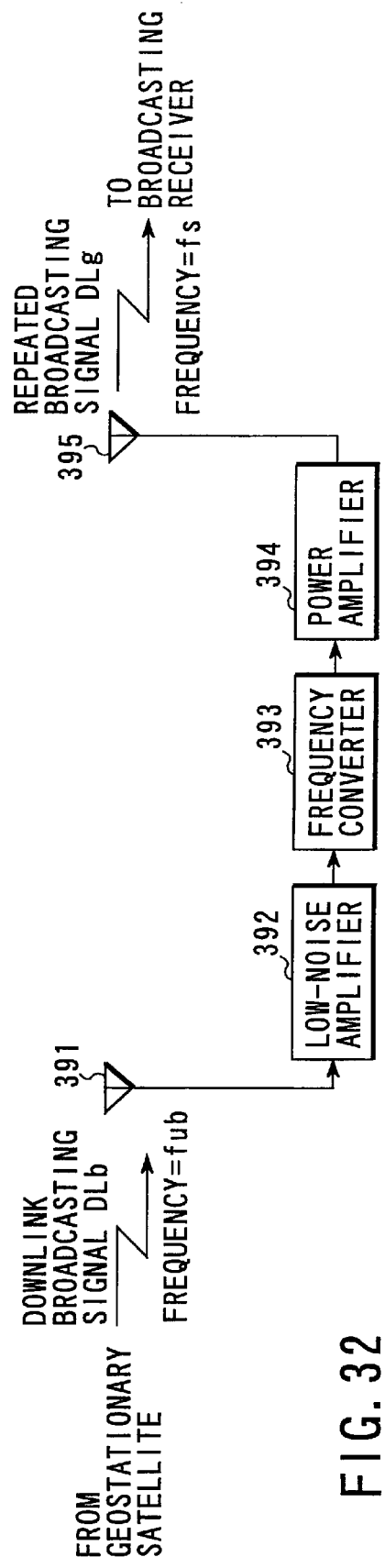

FIG. 30 is a schematic view of a satellite broadcasting system according to this embodiment. FIG. 31 shows the arrangement of a transponder of a geostationary satellite SAT2 of this system. FIG. 32 shows the arrangement of a gap filler apparatus.

On the transponder of the geostationary satellite SAT2, a Ku-band uplink broadcasting signal UL (frequency fua) transmitted from a ground broadcasting station BC is received by a reception antenna 381, amplified by a low-noise amplifier 382, and input to a signal distributor 383. The signal distributor 383 distributes the uplink broadcasting signal to two systems.

One of the broadcasting signals is frequency-converted into an S-band radio frequency signal (frequency fs) by a first frequency converter 384, amplified, by a first power amplifier 386, to a transmission power level necessary for reception by the broadcasting receiver of a fixed station or a mobile station MS, and then transmitted from an S-band transmission antenna 388 to a ground service area as a first downlink broadcasting signal DLa.

On the other hand, the other of the distributed broadcasting signals is frequency-converted into a Ku-band radio frequency signal (frequency fub) by a second frequency converter 388, amplified, by a second power amplifier 387, to a transmission power level necessary for reception by a gap filler apparatus GFe, and then transmitted from a Ku-band transmission antenna 389 as a second downlink broadcasting signal DLb. Although both the second downlink broadcasting signal DLb and the uplink broadcasting signal UL are transmitted in the Ku band, they have different frequencies. For example, the frequency fub of the second downlink broadcasting signal DLb is set at 14 GHz, and the frequency fua of the uplink broadcasting signal UL is set at 12 GHz.

In the gap filler apparatus GFe, the second broadcasting signal DLb transmitted from the geostationary satellite SAT2 is received by an antenna 391, amplified by a low-noise amplifier 392, and input to a frequency converter 393. The frequency converter 393 frequency-converts the received second downlink broadcasting signal into an S-band radio frequency signal (frequency fs), i.e., a radio frequency signal having the same frequency as that of the first downlink broadcasting signal DLa which is transmitted from the geostationary satellite SAT2 for a broadcasting receiver. The broadcasting signal frequency-converted into the S band is amplified to a transmission power level corresponding to the size of a gap filler cover area GE by a power amplifier 394, and then transmitted from a transmission antenna 395 to the gap filler cover area GE as a repeated broadcasting signal DLg.

With this arrangement, the frequency of the downlink broadcasting signal DLb arriving from the geostationary satellite SAT2 and that of the repeated broadcasting signal DLg transmitted to the gap filler cover area GE are different. Therefore, the gap filler apparatus GFe can easily prevent the transmitted repeated broadcasting signal DLg from reaching the reception antenna, thereby easily and properly realizing isolation between the input and the output.

(15th Embodiment)

In the 15th embodiment of the present invention, a second broadcasting signal having the same contents as those of an uplink broadcasting signal transmitted from a ground broadcasting station to a geostationary satellite is transmitted to a gap filler apparatus through a ground network. On the basis of the second broadcasting signal transmitted through the ground network, the gap filler apparatus generates a repeated broadcasting signal which is the same as a downlink broadcasting signal transmitted from the geostationary satellite to a broadcasting receiver, and transmits the repeated broadcasting signal to a dead area.

FIG. 33 is a block diagram showing the arrangement. A ground broadcasting station (not shown) generates a second broadcasting signal having the same contents as those of an uplink broadcasting signal transmitted from the self station to a geostationary satellite and a signal format for cable transmission, and transmits the second broadcasting signal to a gap filler apparatus GFf through a ground public network NW such as an ISDN network.

When the gap filler apparatus GFf receives the second broadcasting signal from the ground broadcasting station with a modem, a signal conversion device 3101 converts the signal format of the second broadcasting signal from the format for cable transmission to a signal format for satellite broadcasting. The broadcasting signal for satellite transmission is frequency-converted into an S-band radio frequency signal by a frequency converter 3102, amplified to a transmission power level corresponding to the size of the dead area by a power amplifier 3103, and transmitted from a transmission antenna 3104 to the dead area behind a building or the like as a repeated broadcasting signal.

With this arrangement, even when the gap filler apparatus cannot be set at a place where the downlink broadcasting signal from the geostationary satellite can be received, the broadcasting signal can be properly broadcasted to the dead area.

The gap filler apparatus GFf may have not only the circuit for receiving the broadcasting signal through the ground public network NW and generating the repeated broadcasting signal but also a circuit for receiving the downlink broadcasting signal from the geostationary satellite and converting it into the repeated broadcasting signal, as in FIG. 21 or 32. One of the broadcasting signals generated by the above circuits may be selected in accordance with the set condition of the gap filler apparatus and transmitted to the dead area.

More specifically, as shown in FIG. 34, a mode wherein a downlink broadcasting signal from a geostationary satellite SAT is received via an antenna 3105 and the receiver and a mode wherein the broadcasting signal is received through the ground public network NW is switched by a switching device SW.

A circuit for determining the reception quality of the downlink broadcasting signal from the geostationary satellite may be added. If this determination circuit determines that the downlink broadcasting signal has been received at a predetermined reception quality, the repeated broadcasting signal from the geostationary satellite is selected and transmitted to the dead area. If it is determined that the predetermined reception quality is not obtained, the repeated broadcasting signal generated on the basis of the second broadcasting signal transmitted through the ground public network NW is selected and transmitted to the dead area.

(16th Embodiment)

In the 16th embodiment of the present invention, a gap filler apparatus has a function of generating monitor information representing the operation state of the self apparatus and transmitting the monitor information to a monitor center, and the monitor center monitors the operation state of the gap filler apparatus on the basis of the monitor information.

FIG. 35 shows the first arrangement example of a system according to this embodiment. Referring to FIG. 35, a gap filler apparatus GFg detects a factor representing the operation state of the self apparatus, i.e., the reception level of a downlink broadcasting signal or the transmission level of a repeated broadcasting signal, at a predetermined time interval and stores it in a memory as monitor information.

A monitor center MCa generates a monitor information transmission request regularly or at an arbitrary timing and sends the transmission request to the gap filler apparatus GFg through a ground network NW. In response to this, the gap filler apparatus GFg reads out the monitor information from the memory and transmits it to the monitor center MCa through the ground network NW. At this time, only the latest monitor information is transmitted to the monitor center MCa. However, all pieces of monitor information stored from the preceding transmission timing to the current transmission timing may be transmitted.

The monitor center MCa collects pieces of monitor information from a plurality of gap filler apparatuses in a service area by polling and displays or prints the collected monitor information. The monitor center MCa also determines on the basis of the contents of monitor information whether the operation state of the gap filler apparatus is normal and displays the determination result.

With this arrangement, the operation state of each gap filler apparatus GFg can be concentrically managed by the monitor center MCa, so efficient maintenance is allowed. In addition, since the pieces of monitor information are collected by polling, the monitor information of a number of gap filler apparatuses can be efficiently collected.

FIG. 36 shows the second arrangement example of the system according to this embodiment. Referring to FIG. 36, each gap filler apparatus GFh and a monitor center MCb are connected through a satellite communication channel. Every time a monitor information transmission request arrives from the monitor center MCb through the satellite communication channel, the gap filler apparatus GFh reads out monitor information from the memory, converts the monitor information into a signal format for satellite communication, and transmits it to the monitor center MCb through the satellite communication channel.

With this arrangement, since the pieces of monitor information can be collected from the gap filler apparatuses using the satellite communication channel of an existing geostationary satellite, the communication line using the ground network NW is unnecessary.

In the above-described examples, the monitor information of the gap filler apparatus GFg or GFh is collected by polling from the monitor center MCa or MCb. In addition to the collection function by polling, the gap filler apparatus GFg or GFh may have an operation state self determination function. If an operation error is detected, the gap filler apparatus GFg or GFh may call the monitor center MCa or MCb and notify the monitor center MCa or MCb of the monitor information associated with the error.

In this case, when an operation error occurs in the gap filler apparatus, the monitor center can immediately detect it, so quick restoration is possible.

If the gap filler apparatus GFg or GFh detects a reception error of the broadcasting signal from the satellite, or an operation error of the gap filler apparatus GFg or GFh itself occurs, the gap filler apparatus may send a message to notify the monitor center MCa or MCb of it and simultaneously transmit the message to each broadcasting receiver in the dead area. As the message to be sent to each broadcasting receiver, a text message or a voice message, "reception condition from the satellite is poor at the moment; please wait for restoration", is used.

FIG. 37 shows the third arrangement example of the system according to this embodiment. Referring to FIG. 37, in generating a repeated broadcasting signal on the basis of the downlink broadcasting signal arriving from the geostationary satellite and transmitting it, a gap filler apparatus GFi multiplexes monitor information representing the operation state of the self apparatus to the repeated broadcasting signal and transmits it to the dead area. As a multiplex scheme, FDM or CDM can be used.

A monitor receiver MR is located at an arbitrary position in the dead area, e.g., at a position corresponding to the edge of the area. The monitor receiver MR may be of a handy type carried by maintenance personnel or an automobile carried type or may be stationarily set. The monitor receiver MR receives the repeated broadcasting signal transmitted from the gap filler apparatus GFi and separates and extracts monitor information and also detects the reception level of the repeated broadcasting signal. The reception level detection data is inserted into the monitor information, and this monitor information is transmitted to a monitor center MCc through a mobile communication network INW such as a cellular radio telephone system or a PHS.

With this arrangement, the reception level detection data actually measured by the monitor receiver MR can be transmitted to the monitor center MCc together with the monitor information generated by the gap filler apparatus. For this reason, the monitor center MCc can determine not only the operation state of the gap filler apparatus itself but also the conformity between the transmission level and the actual reception level in the dead area.

The present invention is not limited to the above embodiments. For example, both the scheme of setting a gap filler apparatus on the ground to cover the dead area and the scheme of using two geostationary satellites to cover the dead area may be simultaneously exploited, thereby covering an area which is not covered with either scheme.

In each of the above embodiments, a satellite broadcasting system using a geostationary satellite has been exemplified, and a broadcasting signal sent from the geostationary satellite is received by a gap filler apparatus and retransmitted to the broadcasting receiver MS. However, the present invention is not limited to this arrangement. In, e.g., an interactive satellite broadcasting system, a signal transmitted from the broadcasting receiver MS to a satellite may be repeated by a gap filler apparatus and transmitted to the satellite.

In the above embodiments, a dead area behind a building is covered. However, the present invention can also be applied to cover a gap area formed due to another construction such as a pylon or a natural object such as a mountain or a cliff.

The present invention can also be applied to cover an indoor dead area. For example, a compact indoor gap filler apparatus (repeater) is set at a position, e.g., at a window where a downlink broadcasting signal from a satellite can be directly received. A repeated broadcasting signal is transmitted indoors from this repeater and received by a receiver. In this case, the receiver may be connected to the repeater through a coaxial cable or the like, and the received downlink broadcasting signal may be transmitted to the receiver through the coaxial cable. The repeater may be set on the rooftop or roof of a building or a house.

In addition, for the arrangement or set place of the gap filler apparatus, the type or arrangement of the broadcasting receiver MS, the type of satellite, or the type or transmission scheme of signal to be transmitted from the satellite as well, various changes and modifications can be made within the spirit and scope of the present invention.

As has been described above in the 10th to 16th embodiments, according to the third aspect of the present invention, a gap filler apparatus is used. A broadcasting signal repeated by a satellite is received by the gap filler apparatus. In the service area, the received broadcasting signal is radio-transmitted to an area where the broadcasting signal from the satellite cannot be received, at the same frequency as that of the broadcasting signal transmitted from the satellite. With this arrangement, in the dead area behind a building or the like, where the radio signal cannot be directly received, not only a fixed station but also the mobile station MS can properly receive the signal. Consequently, a satellite broadcasting system capable of realizing effective gap filler at low cost and a gap filler apparatus therefor can be provided.

The fourth aspect of the present invention will be described next throughout the 17th embodiment.

(17th Embodiment)

Figure 38:
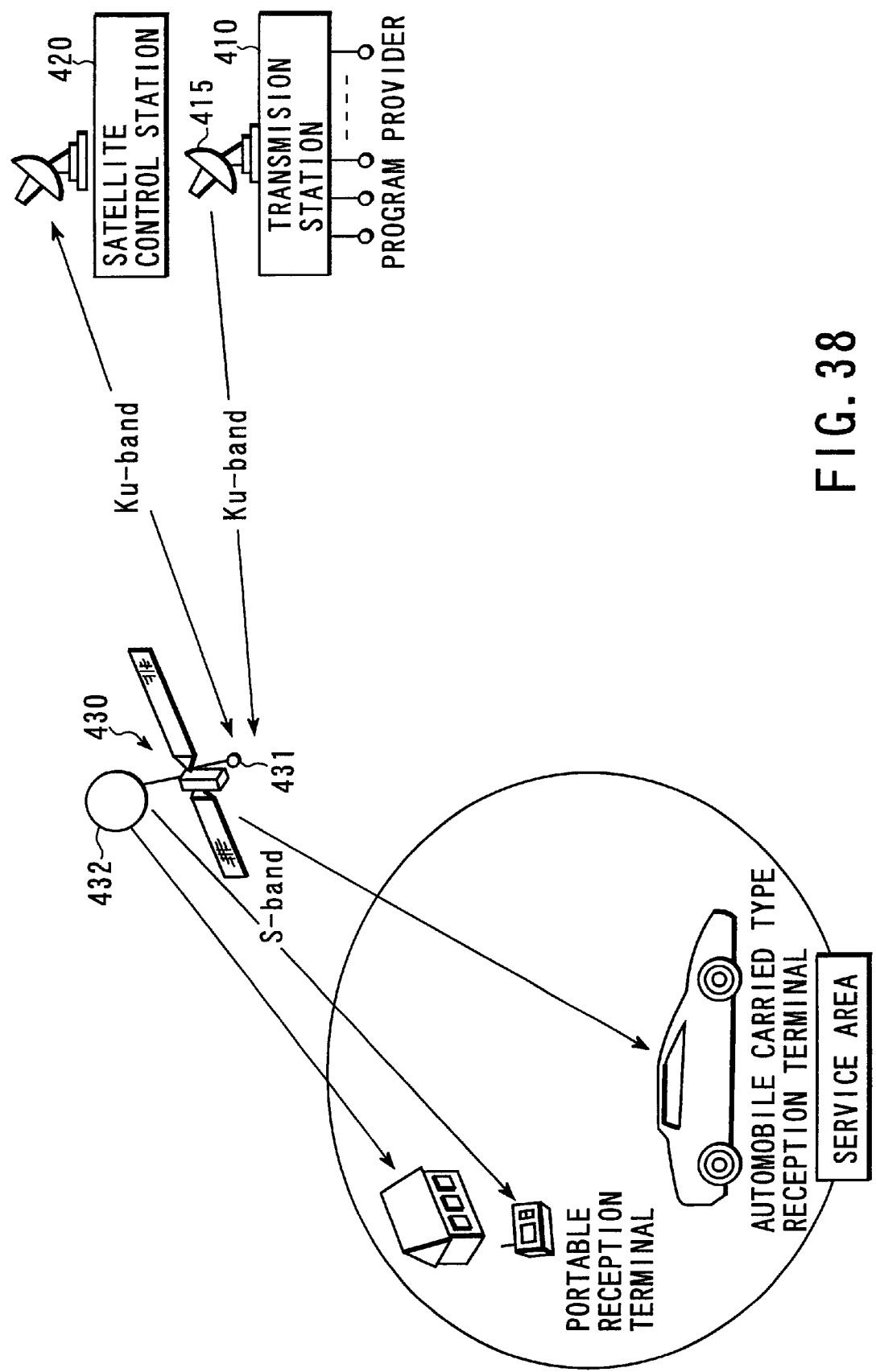
FIG. 38 is a view showing the schematic arrangement of a satellite broadcasting system according to the 17th embodiment of the present invention.

FIG. 38 shows the schematic arrangement of a satellite broadcasting system according to the 17th embodiment of the present invention. The satellite broadcasting system includes a transmission station 410 situated on the ground and a geostationary satellite 430 placed in the geostationary orbit above the equator while being attitude-controlled on the basis of an instruction signal from a satellite control station 420.

FIG. 38 illustrates only one station as the transmission station 410. However, a plurality of stations may be used.

The satellite control station 420 receives, with a reception antenna 431, a channel signal such as a Ku-band broadcasting signal transmitted from the transmission station 410 through an uplink transmission channel, frequency-converts the channel signal into the S band, and transmits the signal from a transmission antenna 432 having a diameter of, e.g., 8 m to a predetermined service area on the ground through a downlink transmission channel. In the service area, the channel signal transmitted from the geostationary satellite 430 is received by a reception terminal 450 (FIG. 41) (to be described later) such as a mobile reception terminal carried by a mobile, a portable reception terminal, or a fixed reception terminal set on a ground construction.

Figure 39:
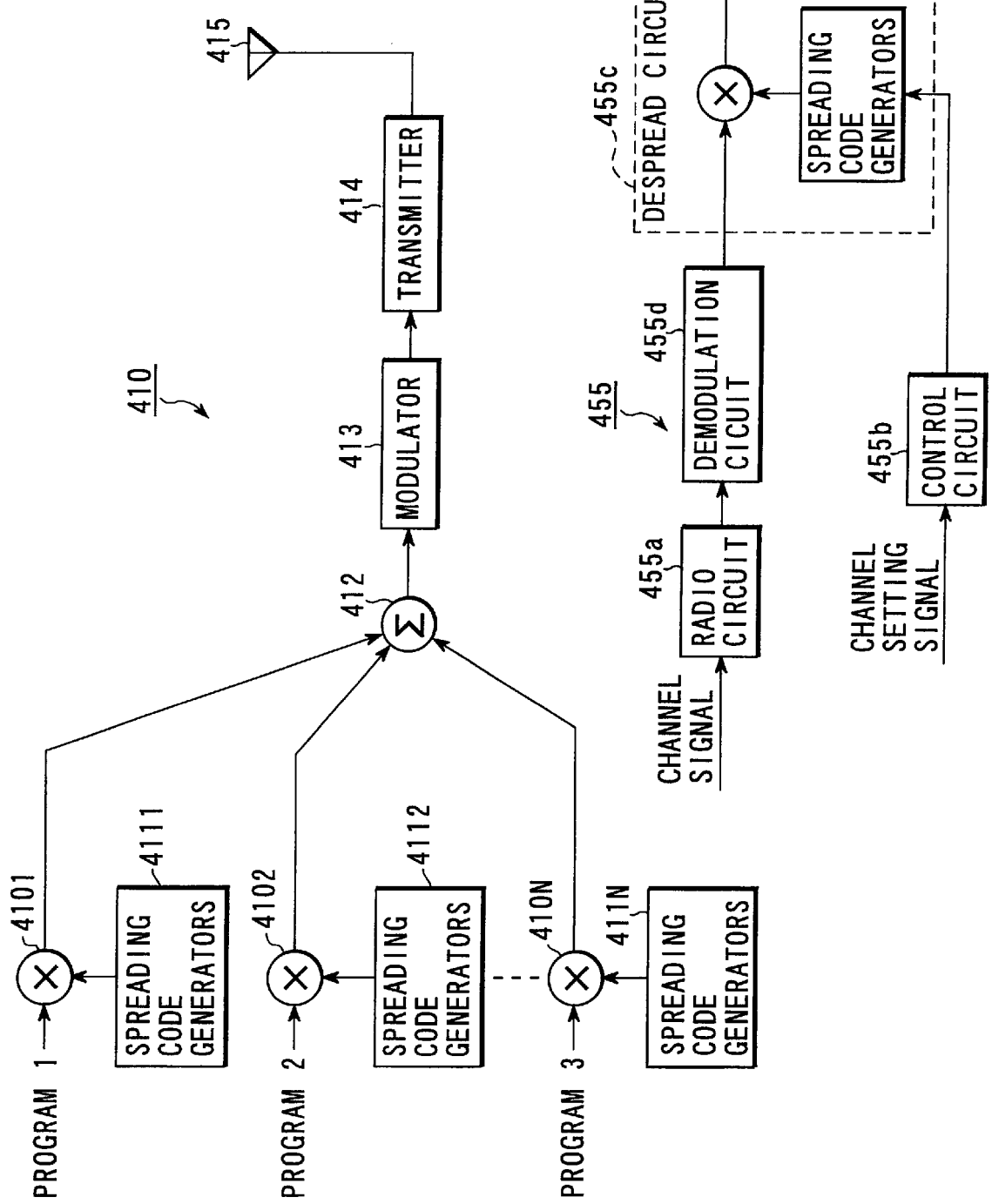
FIG. 39 is a view showing the arrangement of a transmission station shown in FIG. 38.

In the transmission station 410, for example, when programs 1 to N are input, programs 1 to N are input to multipliers 4101 to 410N, respectively, as shown in FIG. 39. Spreading codes corresponding to selection numbers (so-called channel numbers) for selecting the signals on the reception terminals are input from spreading code generators 4111 to 411N to the multipliers 4101 to 410N, so the multipliers 4101 to 410N multiply programs 1 to N by the spreading codes, respectively, and output the results to a synthesizer 412.

The synthesizer 412 generates channel signals multiplexed by known CDM (Code division multiplex) and outputs the signals to a modulator 413. The modulator 413 performs, e.g., spread spectrum modulation for the input channel signals and outputs the modulated signals to a transmitter 414. The transmitter 414 frequency-converts the input channel signals to the Ku band such that the central frequencies are set at F1 and F2 and transmits the channel signals from an antenna 415 to the geostationary satellite 430 through the uplink transmission channel.

Figure 40:
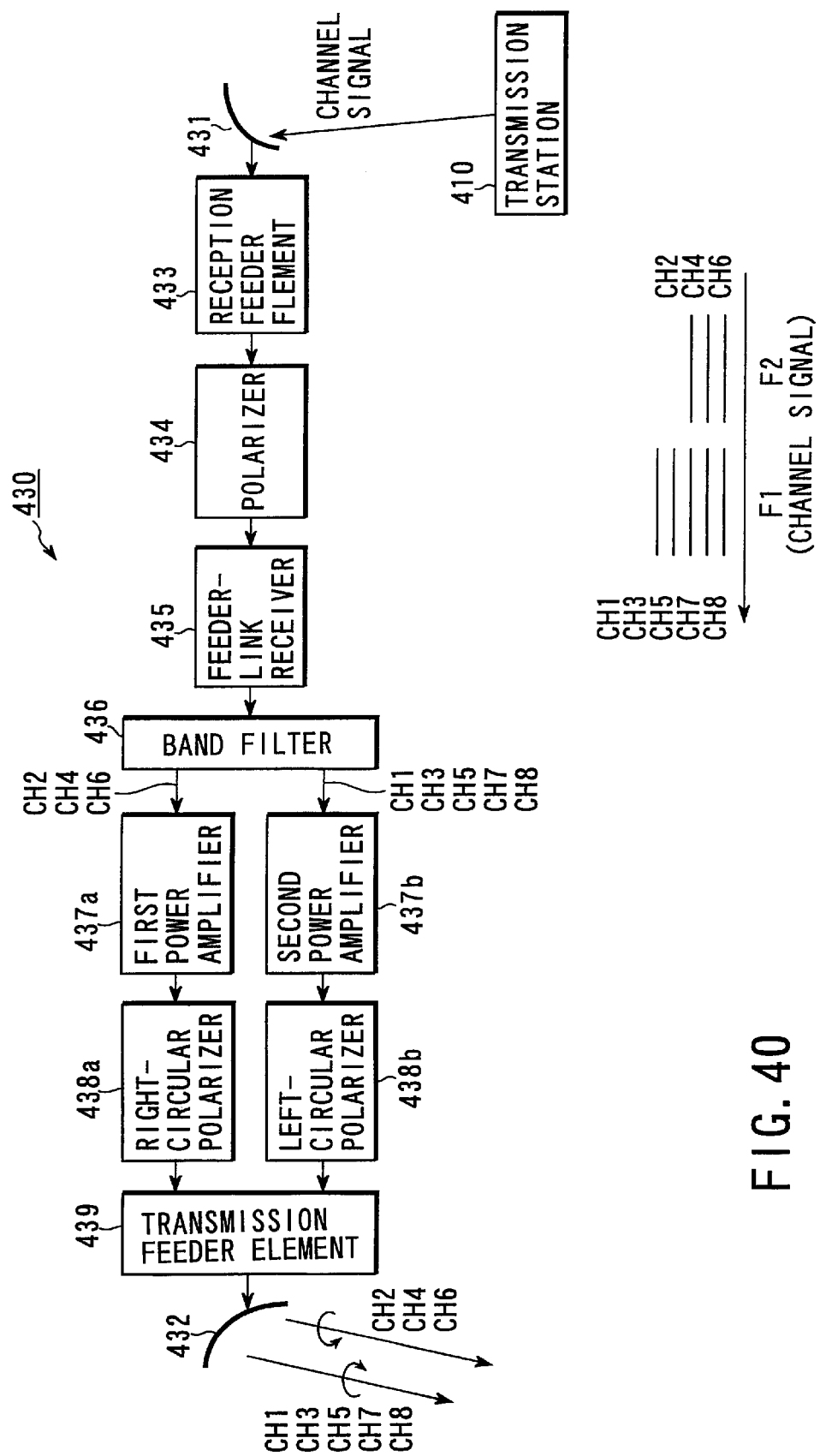
FIG. 40 is a view showing the arrangement of a geostationary satellite shown in FIG. 38.

For example, when channel signals (CH1 to CH8) are to be transmitted, the channel signals (CH1, CH3, CH5, CH7, and CH8) are set at the center frequency F1 while the channel signals (CH2, CH4, and CH6) are set at the center frequency F2, as shown in FIG. 40.

The reception antenna 431 of the geostationary satellite 430 is connected to a reception feeder element 433 to output the received channel signals to the reception feeder element 433. The reception feeder element 433 is connected to, e.g., a polarizer 434, so the input channel signals (CH1 to CH8) are frequency-converted and output to the polarizer 434. The polarizer 434 is connected to a feeder link receiver 435, so the input channel signals are set to be, e.g., circularly polarized waves and output to the feeder link receiver 435.

The feeder link receiver 435 is connected to a band filter 436, so the input channel signals as circularly polarized waves are frequency-converted into, e.g, the S band and output to the band filter 436. The band filter 436 is connected to the input terminals of first and second power amplifiers 437a and 437b. Of the input channel signals, the channel signals having the center frequency F1 (CH1, CH3, CH5, CH7, and CH8) are output to the first power amplifier 437a, and the channel signals having the center frequency F2 (CH2, CH4, and CH6) are output to the second power amplifier 437b.

The first power amplifier 437a is connected to a right-circular polarizer 438a, so the input channel signals (CH1, CH3, CH5, CH7, and CH8) are power-amplified and output to the right-circular polarizer 438a. The right-circular polarizer 438a is connected to a transmission feeder element 439, so the input channel signals (CH1, CH3, CH5, CH7, and CH8) are converted into right-circularly polarized waves and output to the transmission feeder element 439.

The second power amplifier 437b is connected to a left-circular polarizer 428b, so the input channel signals (CH2, CH4, and CH6) are power-amplified and output to the right-circular polarizer 438b. The right-circular polarizer 438b is connected to the transmission feeder element 439, so the input channel signals (CH2, CH4, and CH6) are converted into left-circularly polarized waves and output to the transmission feeder element 439.

The transmission feeder element 439 is connected to the transmission antenna 432 to transmit the input channel signals (CH1, CH3, CH5, CH7, and CH8) and channel signals (CH2, CH4, and CH6) to a predetermined service area through the downlink transmission channel.

Figure 41:
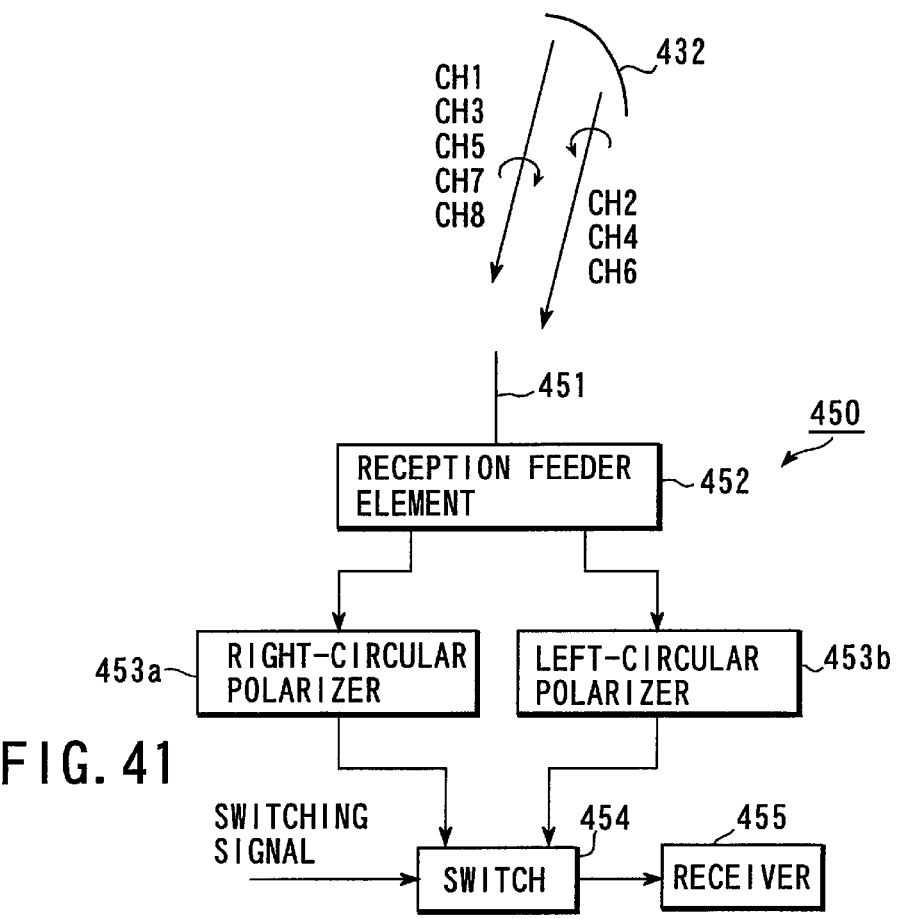
FIG. 41 is a view showing a reception terminal according to the 17th embodiment.

On the other hand, the reception terminal 450 for receiving the channel signals (CH1 to CH8) from the geostationary satellite 430 has a reception antenna 451 corresponding to the transmission antenna 432 of the geostationary satellite 430, as shown in FIG. 41. The received channel signals (CH1 to CH8) are output to a reception feeder element 452. The reception feeder element 452 is connected to a right-circular polarizer 453a and a left-circular polarizer 453b. The output terminals of the right-circular polarizer 453a and the left-circular polarizer 453b are connected to a receiver 455 through a switch 454.

A switching operation device (not shown) is connected to the switch 454. When the user operates the switching operation device (not shown) to select one of the right-circular polarizer 453a and the left-circular polarizer 453b, a switching signal is input. The switch 454 selects one of the right-circular polarizer 453a and the left-circular polarizer 453b in accordance with the switching signal to output the channel signals (CH1, CH3, CH5, CH7, and CH8) input to the right-circular polarizer 453a or the channel signals (CH2, CH4, and CH6) input to the left-circular polarizer 453b to the receiver 455.

As shown in FIG. 42, the receiver 455 has a radio circuit 455a corresponding to the switch 454. The radio circuit 455a is connected to a despread circuit 455c through a demodulator 455b. With this arrangement, when the channel signals (CH1, CH3, CH5, CH7, and CH8) or the channel signals (CH2, CH4, and CH6) are input, the radio circuit 455a frequency-converts the channel signals and outputs them to the demodulator 455b.

The demodulator 455b demodulates the input channel signals (CH1, CH3, CH5, CH7, and CH8) or channel signals (CH2, CH4, and CH6) and outputs them to the despread circuit 455c. The despread circuit 455c is connected to a control circuit 455d for selecting a channel, so the input channel signals (CH1, CH3, CH5, CH7, and CH8) or channel signals (CH2, CH4, and CH6) are subjected to despreading processing, separated on the basis of a channel set signal input to the control circuit 455d, and output to, e.g., a display section (not shown) on the output side.

The channel set signal is set by the user by switching, e.g., a channel set operation device (not shown).

As described above, in the satellite broadcasting system, a plurality of channel signals having different central frequencies are transmitted in the Ku band from the transmission station 410 to the geostationary satellite 430, classified in units of central frequencies in the geostationary satellite 430, converted into right- or left-circularly polarized waves, and transmitted to the service area as S-band channel signals. By selecting a channel on the reception terminal 450, a desired channel signal is received.

The signal processing section of the geostationary satellite 430 is divided into a right-circularly polarized wave system and a left-circularly polarized wave system, i.e., constructed using a plurality of signal processing systems with low power efficiency. Since the number of channels can be increased using the signal processing systems with low power efficiency, the arrangement can easily meet the requirement for increasing the number of channels.

The channel signals (CH1 to CH8) are separated into right-circularly polarized wave signals and left-circularly polarized wave signals and transmitted. Only signals of waves circularly polarized in the same direction act as signal interference sources. The interference noise power can be reduced relative to the number of channels. From this viewpoint as well, the number of channels can be made as large as possible.

When channel signals (CH1 to CH8) multiplexed by CDM are reversely polarized, channel signals other than channel signals circularly polarized in the same direction (e.g., when channel signals are right-circularly polarized, left-circularly polarized channel signals) act as interference noise power. For this reason, as the number of channel signals to be transmitted from the geostationary satellite increases, the interference noise power increases, so a necessary power ratio C/N can hardly be ensured. However, as the characteristic feature of the present invention, when the transmitted channel signals are reversely polarized, the interference noise power can be reduced, as described above, so the number of channels can be increased.

More specifically, when the antenna axial ratio of the geostationary satellite 430 to the reception terminal is about 2 dB/3 dB, isolation of 10 dB or more can be ensured to the reversely polarized waves. When both polarized waves are used, the interference noise power can be reduced by 55%, as compared to use of only one polarized wave. When a desired transmission power can be ensured, the channel capacity can be set to be larger by about 1.8 times.

In the 17th embodiment, the channel signals are circularly polarized to right- or left-circularly polarized waves. However, the present invention is not limited to this. The channel signals can be linearly polarized to vertically polarized waves or horizontally polarized waves. With this arrangement, almost the same effect as described above can be expected.

In the 17th embodiment, as the modulation method, the signals are modulated using spreading codes and multiplexed by CDM. However, the present invention is not limited to this, and various modulation methods or multiplex methods can be applied.

As has been described above in the 17th embodiment, according to the fourth aspect of the present invention, a satellite broadcasting system capable of easily increasing the number of channels and a reception terminal therefor can be provided.

The fifth aspect of the present invention will be described next throughout the 18th embodiment.

(18th Embodiment)

Figure 43:
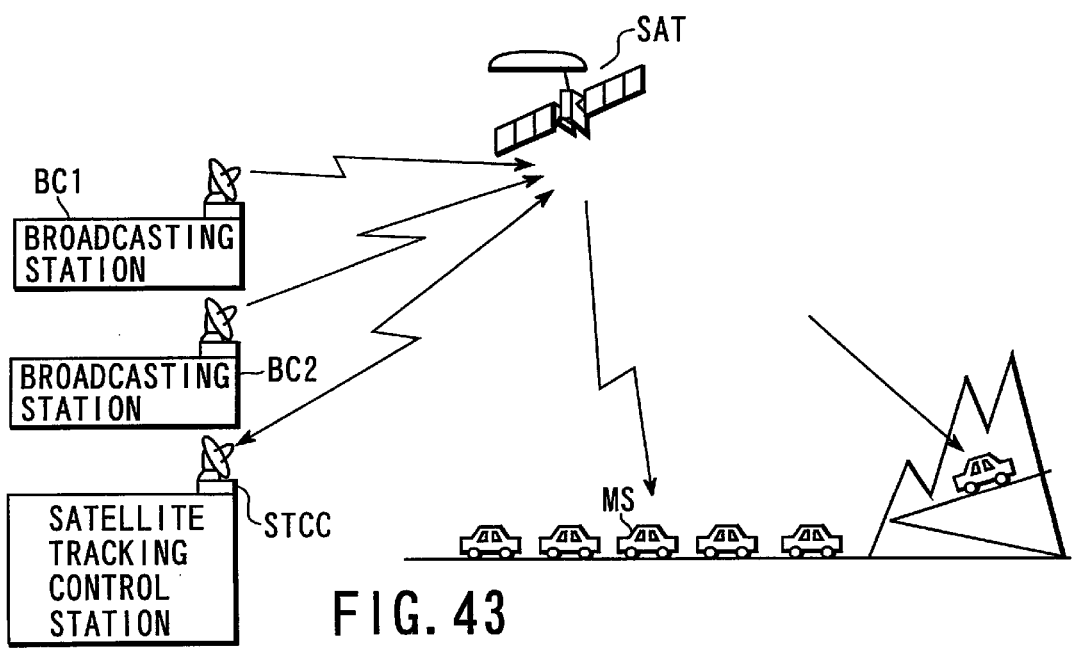
FIG. 43 is a schematic view showing a satellite broadcasting system according to the 18th embodiment of the present invention.

FIG. 43 shows the schematic arrangement of a satellite broadcasting system according to the 18th embodiment of the present invention. This satellite broadcasting system includes a plurality of broadcasting stations BC1 and BC2 (including feeder link stations), a geostationary satellite SAT, and a satellite tracking control station STCC. Each of the broadcasting stations BC1 and BC2 transmits program information prepared and edited by a broadcaster to the geostationary satellite SAT through an uplink transmission channel in the Ka band (26.5 to 40 GHz) or Ku band (12.5 to 18 GHz). The geostationary satellite SAT is managed by the satellite tracking control station STCC to keep a predetermined position on the geostationary orbit above the equator.

Figure 44:
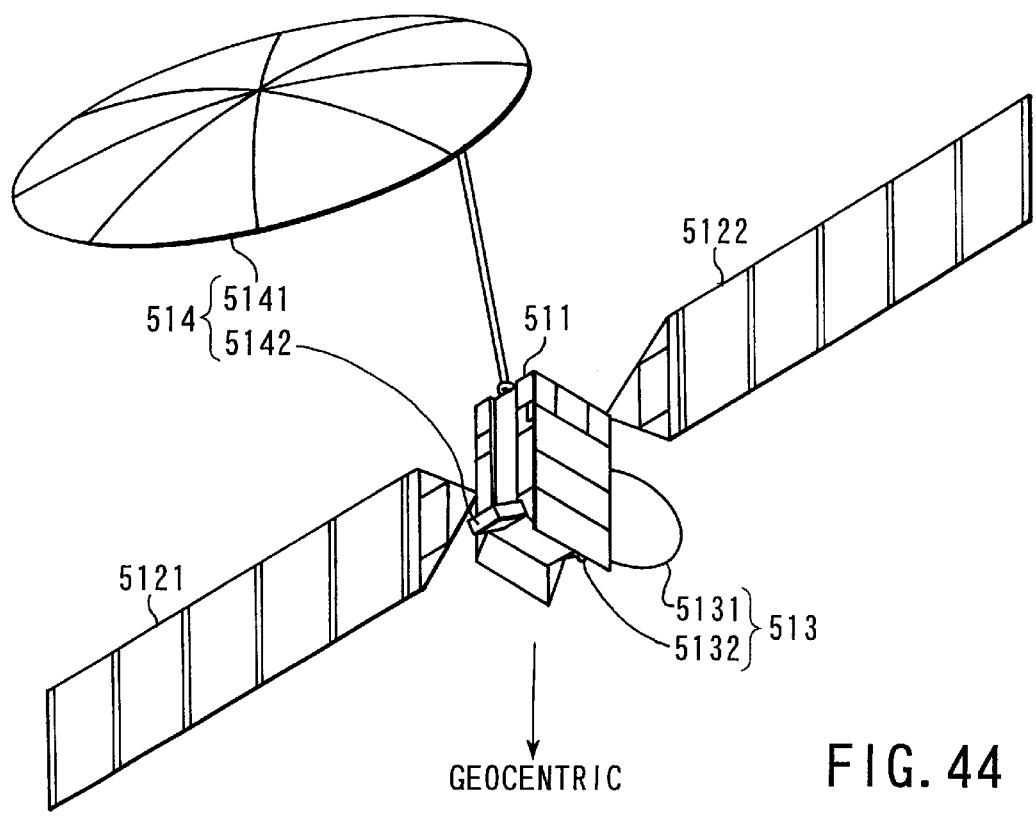
FIG. 44 is a perspective view showing the specific outer appearances of a geostationary satellite used in the system of the 18th embodiment and an antenna carried by the satellite.

The geostationary satellite SAT has an arrangement shown in FIG. 44. In FIG. 44, reference numeral 511 denotes a satellite main body. The satellite main body 511 has solar cell panels 5121 and 5122 serving as power sources, a Ka- or Ku-band antenna 513 including a reflecting mirror 5131 having a diameter of 2.5-m class (or smaller) and a primary radiator 5132, and an S-band (e.g., 2.6 GHz) antenna 514 having a reflecting mirror 5141 having a diameter of 8- to 15-m class and a primary radiator 5142.

A broadcasting signal multiplexed and transmitted from the ground broadcasting station BC1 or BC2 is received by the Ka- or Ku-band antenna 513, demodulated and amplified by a signal processing unit (not shown) in the satellite main body 511, and converted into an S-band signal. The converted broadcasting signal is transmitted from the S-band antenna 514 to a service area through an S-band downlink transmission channel.

In the service area, a fixed station set, e.g., in an office or at home or a mobile station MS such as an automobile-carried-type receiver or a portable terminal device receives the broadcasting signal transmitted from the geostationary satellite SAT.

In the S-band downlink transmission channel, a plurality of channels, a maximum of 900 channels having a transmission rate of 64 to 256 Kbps/channel are multiplexed. To transmit a video signal using a channel, MPEG4 (moving picture expert group 4) is used as a video coding method.

As a technique of attaching the large antenna 514 of 8- to 15-m class to the satellite main body 511 and arranging it in the space, e.g., an "extended antenna structure" in Japanese Patent Application No. 1-245707, an "extended antenna" in Japanese Patent Application No. 1-195704, an "antenna reflecting mirror" in Japanese Patent Application No. 63-242004, or an "extended annular body" in Japanese Patent Application No. 2-261204 can be used.

Figure 45:
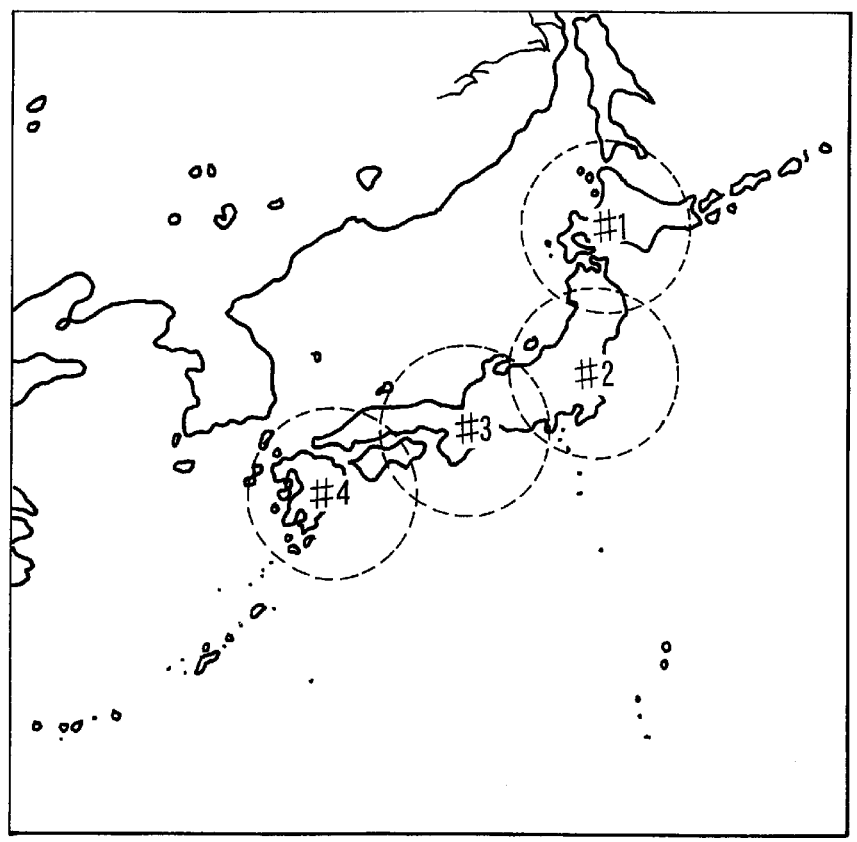
FIG. 45 is a view showing an example of division of service areas when a multibeam scheme is employed in the system of the 18th embodiment.

When a multibeam formation type radiator is used as the primary radiator 5142 of the S-band antenna 514, the service area can be divided into a plurality of areas, and transmission beams can be independently formed. FIG. 45 shows a beam arrangement when the service area is divided into four areas. In FIG. 45, #1 to #4 represent reception areas covered by different transmission beams.

When the transmission antenna 514 has the multibeam function, all channels of the satellite broadcasting can be made available to the entire service area, and additionally, an arbitrary channel can be assigned to an arbitrary transmission beam by a signal processing unit in the satellite and broadcasted to only a necessary area. This allows a flexible service.

Figure 46:
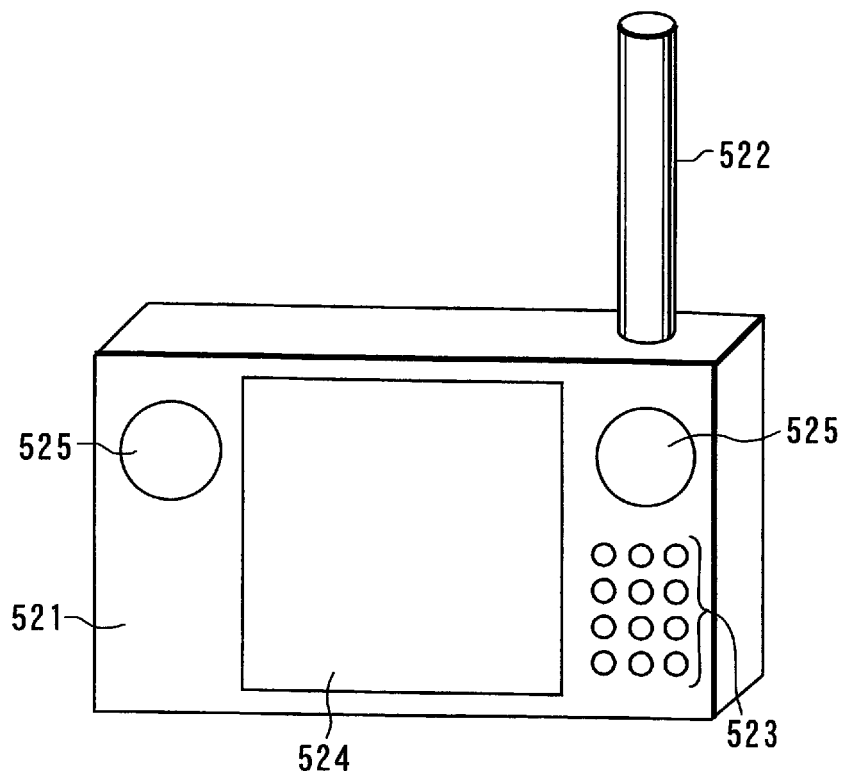
FIG. 46 is a perspective view showing the outer appearance of a receiver for receiving a satellite broadcasting wave of the system of the 18th embodiment.
Figure 47:
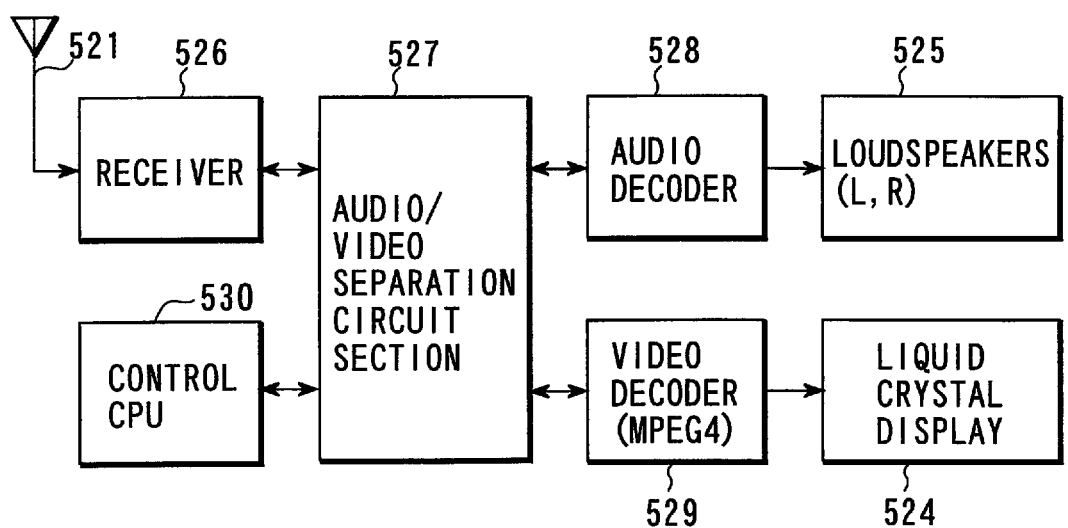
FIG. 47 is a block diagram showing the internal circuit arrangement of the receiver for receiving a satellite broadcasting wave of the system of the 18th embodiment.

FIGS. 46 and 47 show the arrangement of a portable receiver usable in the satellite broadcasting system with the above arrangement. FIG. 46 shows the outer appearance, and FIG. 47 shows the internal circuit arrangement.

In FIG. 46, reference numeral 521 denotes a case. The case 521 has a rod antenna 522 for receiving an S-band satellite broadcasting wave, an operation button 523 for performing receiving or tuning, a liquid crystal display 524 for displaying the received video signal, and a pair of loudspeakers (L and R) 525 for amplifying the received audio signal.

In FIG. 47, a satellite broadcasting signal from the geostationary satellite SAT, which is captured by the rod antenna 522, is tuned to and detected by a receiver 526 and supplied to an audio/video separation circuit section 527. The audio/video separation circuit section 527 separates the reception signal into audio data and video data. The audio data is supplied to an audio decoder 528, and the video data is supplied to a video decoder 529.

Figure 48A:
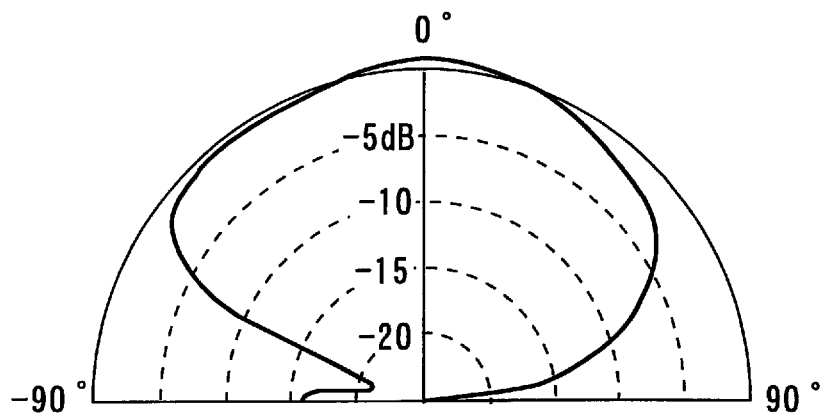
FIGS. 48A and 48B are views showing the directivity characteristics of an antenna used in the receiver for receiving a satellite broadcasting wave of the system of the 18th embodiment.
Figure 48B:
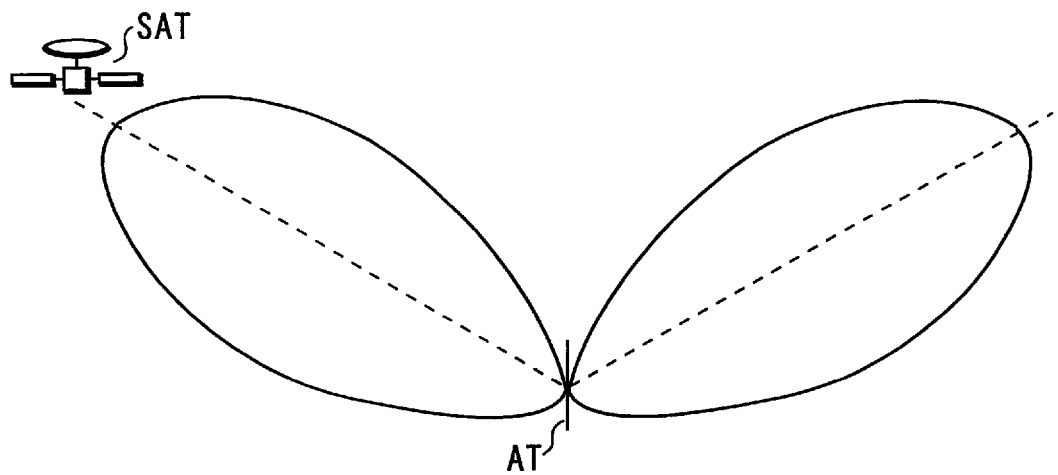

The rod antenna 522 generally has directivity in all-around directions, as shown in FIG. 48A. In Japan, even a satellite broadcasting wave from a direction of about 45° can be received at a sufficient gain. When an antenna AT whose reception beam pattern has a tilt angle of about 30° to 60° is used, as shown in FIG. 48B, the broadcasting wave from the satellite SAT can be received at almost the maximum gain.

If the reception beam pattern of the antenna AT can be directed in an arbitrary direction, and the antenna direction is controlled to obtain the maximum reception level, an automobile-carried-type antenna, e.g., can always receive the broadcasting wave from the satellite SAT at the maximum gain even when the automobile has a tilt.

The audio decoder 528 decodes the received audio data to reconstruct the audio signal. The reconstructed audio signal is amplified and output from the loudspeakers 525. The video decoder 529 decodes the received video data by, e.g., MPEG4 to reconstruct the video signal. The video signal is displayed on the liquid crystal display 524.

Tuning control of the receiver 526 and separation control of the audio/video separation circuit section 527 are performed by a control CPU circuit section 530 on the basis of a predetermined control program.

With the above arrangement, the broadcasting signals transmitted from the plurality of broadcasting stations BC1 and BC2 are sent to the geostationary satellite SAT through the Ka- or Ku-band uplink transmission channel, transmitted from the geostationary satellite SAT to the service area through the S-band downlink transmission channel, and received by the fixed station and the mobile stations MS in the service area.

Since the frequency bands of the uplink transmission channel and the downlink transmission channel are different, fading does not occur.

Since the geostationary satellite SAT has the S-band antenna 514 having a large diameter of 8- to 15-m class, each fixed station or the mobile station MS can receive the broadcasting signal at a sufficiently large field strength. For this reason, each fixed station or the mobile station MS can easily receive the broadcasting signal with a compact rod antenna or planar antenna.

When a communication channel is inserted as one of channels of the broadcasting signal to be transmitted from the broadcasting station BC1 or BC2, control of signal processing contents in the satellite and individual control of each receiver can be performed.

In the 18th embodiment, a portable receiver has been exemplified. An indoor or automobile-carried-type receiver can also be realized by the same circuit arrangement. Especially, as the portable or automobile-carried-type antenna, a rod antenna or a planar antenna having non-directional characteristics in at least all-around directions is used. In this case, since the receiver itself need not be directed to the arrival direction of the satellite broadcasting wave, handling of the receiver is greatly facilitated.

The conventional digital broadcasting image complies with the NTSC system as the ground analog image scheme for current televisions or an HDTV system having a higher quality, so it requires a very high transmission rate, i.e., a wide band. For example, the number of horizontal pixels× the number of vertical lines×frame frequency falls within the range of 720×576×30 to 1920×1152×60. Even an MPEG2 video compression standard for a satisfactory transmission environment corresponding to these scheme requires a rate of 15 to 100 Mbps.

As the data rate increases, a larger broadcasting power is required, and the transmission band per channel also broadens. This decreases the number of broadcasting channels available in a given band. For mobile broadcasting in a poor transmission environment, the broadcasting power must be further increased.

In this system, to decrease the broadcasting power necessary to broadcast image broadcasting to a mobile such as an automobile and increase the number of broadcasting channels, MPEG4 as a high-compression scheme is used. Since the coding scheme itself is highly robust against transmission errors, MPEG4 has received a great deal of attention as a compression scheme for mobile communication (radio communication).

Figure 49:
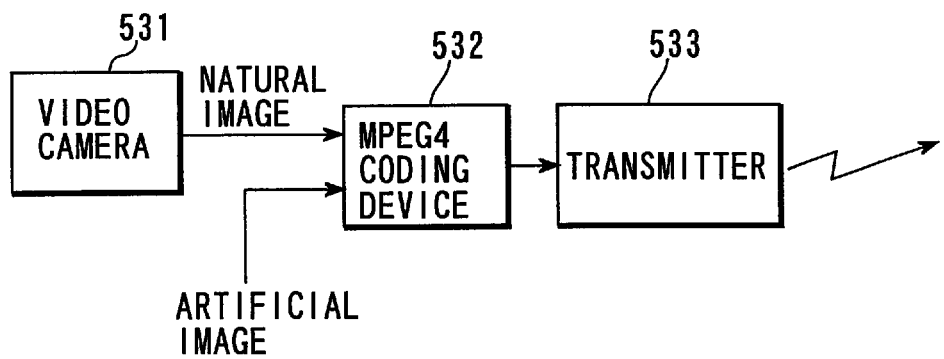
FIG. 49 is a block diagram showing the arrangement of an MPEG4 image transmission apparatus applicable to the system of the 18th embodiment.

FIG. 49 shows the arrangement of an MPEG4 image transmission apparatus applicable to the 18th embodiment. A natural image signal photographed with a video camera 531 or an artificial image signal formed by computer graphic is coded and compressed by an MPEG4 coding device 532 and transmitted from a transmitter 533 to the geostationary satellite SAT. The transmission output is broadcasted to a predetermined area via the geostationary satellite SAT and received by the receiver having the arrangement shown in FIG. 47.

The transmission wave from the geostationary satellite SAT is directly broadcasted to the receiver, repeated by a ground repeating station, or repeated by another communication satellite or broadcasting satellite.

Figure 50:
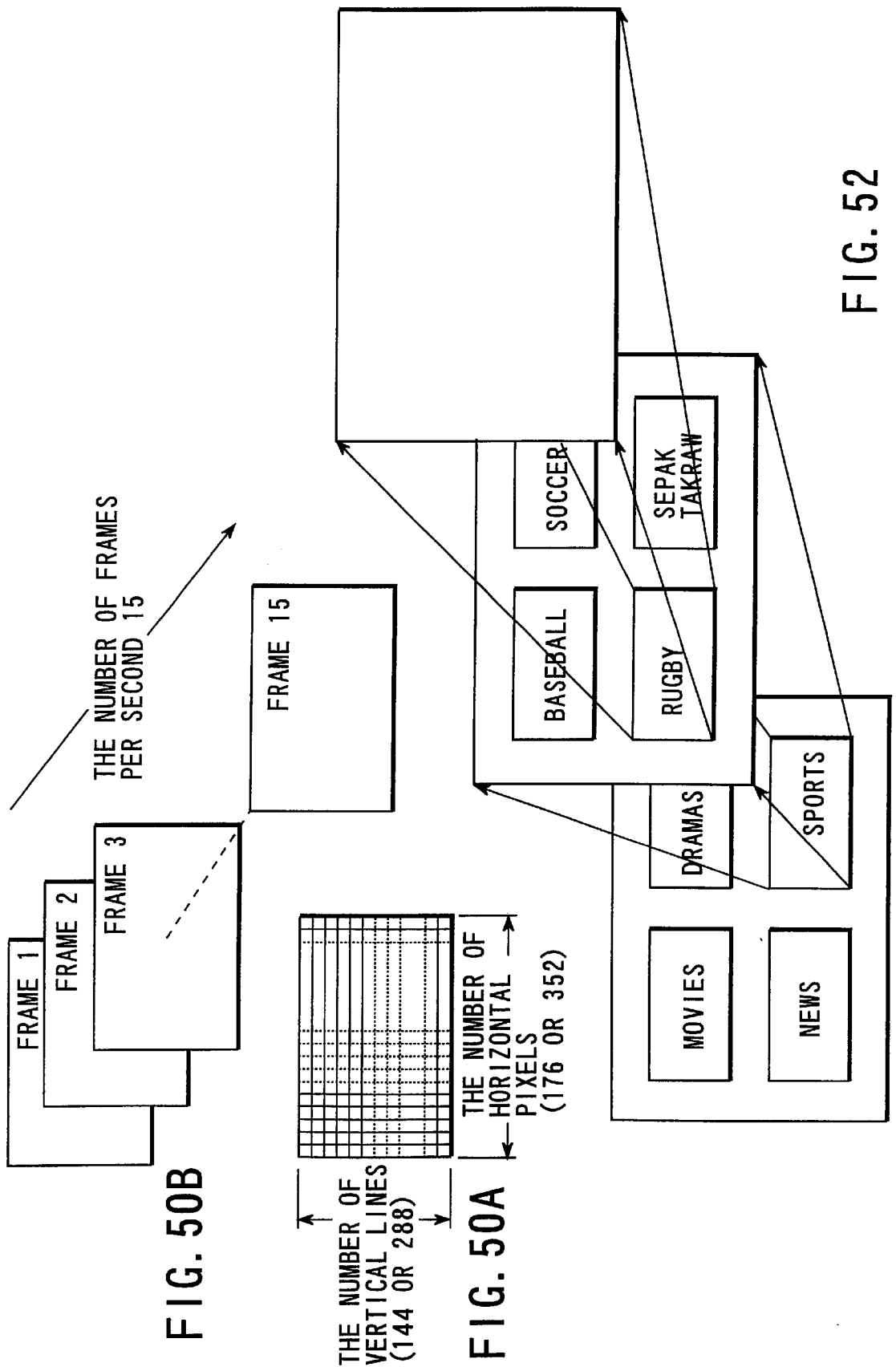
FIGS. 50A and 50B are views showing an example of the broadcasting screen layout in the system of the 18th embodiment.

FIGS. 50A and 50B show an example of a broadcasting screen of this system. In correspondence with the 3- to 12-inch display screen size of a portable or automobile-carried-type mobile terminal, the number of horizontal pixels×the number of vertical lines of an image is set at 176×144 or 352×288, as shown in FIG. 50A, the frame frequency per second is set at 15, as shown in FIG. 50B, and the transmission rate is set at about 64 to 256 kbps.

When the screen size, the number of horizontal pixels and the number of vertical lines of an image, and the frame frequency are appropriately set for the portable or automobile-carried-type mobile terminal, the broadcasting power necessary to broadcast image broadcasting to a mobile such as an automobile is decreased, and the number of broadcasting channels can be increased.

When MPEG4 is used to compress and code a video signal to be used for satellite broadcasting, the video signal can be reconstructed in accordance with the radio wave reception condition at the reception site, the pay broadcasting subscription condition of the receiver, or the function of the incorporated video decoder.

The above-described satellite broadcasting system of the present invention can meet the following requirements.

National broadcasting and local broadcasting can be selected.

Even a handheld reception terminal (with mobility) can sufficiently receive the broadcasting signal.

A transmission station can be realized with simple equipment and have an interactive function.

By increasing not only the image quality but also the number of channels, information services can be provided using dedicated channels. For example, various auctions, lectures of private schools or preparatory schools, music programs with CD quality, news, weather forecasts, stock information, leisure information, religious information, local programs, private broadcasting, real estate/housing information, bargain information, TV shopping, various hobbies, data broadcasting, and the like can be realized.

As has been described above in the 18th embodiment, according to the fifth aspect of the present invention, a satellite broadcasting system allowing reception by a receiver equipped with a simple antenna system meeting requirements for not only indoor use but also use on a mobile or use as a portable device, and a satellite broadcasting receiver therefor can be provided.

The sixth aspect of the present invention will be described next throughout the 19th embodiment.

(19th Embodiment)

Figure 51:
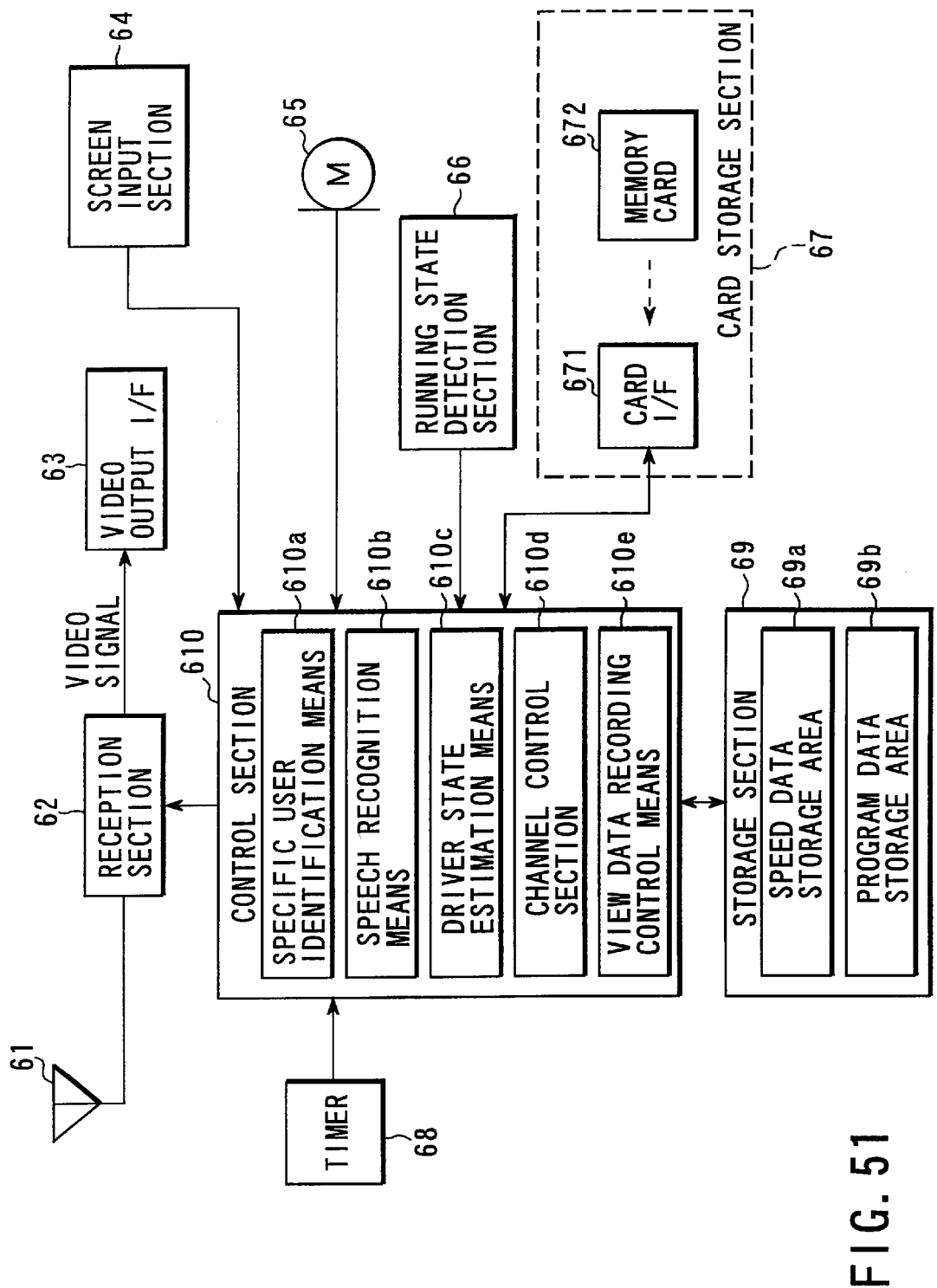
FIG. 51 is a block diagram showing the arrangement of a satellite broadcasting receiver according to the 19th embodiment of the present invention.

FIG. 51 shows the arrangement of a satellite broadcasting receiver according to the 19th embodiment of the present invention.

The satellite broadcasting receiver includes an antenna 61, a reception section 62, a video output interface 63, a screen input section 64, a microphone (M) 65, a running state detection section 66, a card storage section 67, a timer 68, a storage section 69, and a control section 610.

A broadcasting signal in which a plurality of channels are multiplexed by the geostationary satellite is received by the antenna 61 and input to the reception section 62. The reception section 62 demodulates, in the multiplexed broadcasting signal, the broadcasting signal of a channel designated from the control section 610 (to be described later), reconstructs it as a video signal (video signal) and an audio signal (not shown), and inputs them to the video output interface 63.

The video output interface 63 is a video output terminal which can be connected to an automobile-carried-type liquid crystal monitor or the like.

The screen input section 64 is a touch screen panel mounted on the display screen of a monitor connected to the video output interface 63 and is composed of a video-transmission-type piezoelectric device. The user touches this input device with a finger or the like to designate a display area on the monitor and designate a reception channel for the satellite broadcasting receiver. Information input from the screen input section 64 is input to the control section 610.

The microphone 65 is mounted on, e.g., the sun visor or dashboard in the car. The microphone 65 receives speech of the driver, converts the received speech into an electrical signal, and inputs the signal to the control section 610.

The running state detection section 66 is a sensor for detecting the opening ratio of the accelerator, the steering wheel position, and the braking force of the car. The running state detection section 66 inputs the pieces of detected information to the control section 610 and input a velocity pulse obtained from the control section of the car to the control section 610 as running speed information.

The card storage section 67 includes a card interface 671 and a memory card 672.

The card interface 671 is a card slot to which the memory card 672 is electrically connected. The control section 610 and the memory card 672 are connected through the card interface 671.

The memory card 672 is a card type storage medium incorporating a semiconductor memory such as a flash memory. Information of channels whose reception is authorized by the satellite broadcaster, information of channels viewed by the user, and the reception times are recorded on this storage medium. The memory card 672 can be removed from the card interface 671, as needed.

The timer 68 counts time and notifies the control section 610 of the current time.

The storage section 69 is a semiconductor storage medium such as a RAM or a ROM and has a speech data storage area 69a and a program data storage area 69b as well as an area for storing various control programs of the control section 610, the ID number of the self apparatus, and program data preset by the user.

The speech data storage area 69a is an area for storing speech data (voiceprint data) for identifying a specific user, or speech data and predetermined instruction data in correspondence with each other to recognize user's speech data input from the microphone 65 as the instruction data such as a reception channel switching instruction. The speech data storage area 69a also stores speech data input by the user in advance in correspondence with the instruction data to improve the speech recognition accuracy of the speech data.

The program data storage area 69b stores information of channels which can be received by the satellite broadcasting receiver in the form of a hierarchy for each category or genre, as shown in FIG. 52.

Also, program information (reception channels) corresponding to the estimation result of the fatigue state of the driver (to be described later) is stored in the program data storage area 69b. For example, a program for awakening the user, e.g., a program which broadcasts cheerful music is set in advance assuming a case wherein the user is estimated to be tired and sleepy.

The control section 610 systematically controls the respective portions of the satellite broadcasting receiver and has a control function of controlling the reception section 62 in response to information input from the screen input section 64 or time information from the timer 68 to switch the reception channel. The control section 610 also has a specific user identification means 610a, a speech recognition means 610b, a driver state estimation means 610c, a channel control section 610d, and a view data recording control means 610e.

The specific user identification means 610a controls to receive the voiceprint data of a specific user from the microphone 65 in advance and record the data in the speech data storage area 69a. When the user is to execute a specific function (reception of a specific channel, change of contents stored in the storage section 69, or the like) of the satellite broadcasting receiver, verification processing of comparing the user's speech data input from the microphone 65 with the voiceprint data stored in the speech data storage area 69a to determine whether the user is a specific user is performed.

The speech recognition means 610b recognizes the user's speech data input from the microphone 65 as predetermined instruction data using the data stored in the speech data storage area 69a.

The driver state estimation means 610c analyzes the driving time or degradation in driving capability on the basis of various data detected by the running state detection section 66 and estimates the fatigue state of the driver.

The channel control section 610d controls reception channel switching in response to an instruction which is speech-recognized by the speech recognition means 610b, or controls reception channel switching to receive a program stored in the program data storage area 69b when the driver state estimation means 610c has estimated that the driver is fatigued.

Channels which can be received under this channel control are reception channels stored on the memory card 672. For reception channels whose reception is authorized to a specific user, verification processing by the specific user identification means 610a is performed prior to reception.

The view data recording control means 610e obtains data of a channel received by the satellite broadcasting receiver and the reception time on the basis of the time information from the timer 68 and controls to record these data on the memory card 672.

In the satellite broadcasting receiver having the above arrangement, when the driver pronounces a desired channel number to switch the reception channel, this speech is input from the microphone 65 to the control section 610.

The speech recognition means 610*b* recognizes the speech. In response to this recognition result, the channel control section 610*d* controls the reception section 62 to switch the reception channel. In designating a reception channel, reception channels are visually and hierarchically presented on the monitor in units of categories or genres.

According to the satellite broadcasting receiver with the above arrangement, the driver can easily switch the reception channel by speech on the basis of the hierarchically presented reception channel group. That is, the driver can switch the reception channel without being distracted from driving.

In the satellite broadcasting receiver having the above arrangement, the fatigue state of the driver is estimated by the driver state estimation means 610*c* on the basis of information detected by the running state detection section 66. The channel control section 610*d* controls the reception section 62 on the basis of the estimation result to switch the channel to a reception channel which broadcasts, e.g., cheerful music.

According to the satellite broadcasting receiver with the above arrangement, the fatigue state of the driver is estimated by various sensors. If it is estimated that the driver is fatigued, the channel is switched to a reception channel which contributes to prevent driving asleep (awakens the driver) to awaken the driver, thereby preventing a traffic accident.

In the satellite broadcasting receiver having the above arrangement, the view data recording control means 610*e* records the information of the received channel and the view time information on the memory card 672 usable to charge for reception. For this reason, the user can easily pay the reception fee, and the broadcaster can collect audience rating data in collecting the reception fee.

As has been described above in the 19th embodiment, according to the sixth aspect of the present invention, when the user wants to switch the reception channel, he/she designates the channel by speech through the microphone. The speech recognition means recognizes it, and the reception means receives the channel speech-input by the user. Since the reception channel can be easily switched by speech input, a satellite broadcasting receiver capable of switching the reception channel without distracting the driver from driving can be provided.

In the sixth aspect, the fatigue state of the driver is detected on the basis of the moving state of the mobile, and a channel according to the detection result is received. According to the present invention, setting is made such that a channel for preventing the driver from driving asleep is received when it is estimated that the driver is fatigued. Therefore, a satellite broadcasting receiver capable of awakening the driver to prevent a traffic accident can be provided.

The present invention is not limited to the above embodiments, and various changes and modifications can be made within the spirit and scope of the present invention.

Industrial Applicability

As has been described above, according to the satellite broadcasting system of the present invention, the broadcasting receiver can quickly switch the channels of received multiplexed broadcasting signals at a high response speed, thereby improving the convenience for a viewer.

According to the radio receiver, a radio broadcasting system, and a radio broadcasting apparatus of the present invention, the influence of hits due to obstacles can be minimized, and a satisfactory reception quality can be obtained.

According to the satellite broadcasting system of the present invention and the gap filler apparatus therefor, not only a fixed station but also a mobile station in an area behind buildings, where a radio signal from the satellite cannot be directly received, can properly receive the radio signal without preparing large-scale equipment, thereby realizing an inexpensive and effective gap filler.

According to the satellite broadcasting system and the reception terminal of the present invention, the number of channels can be easily increased with a simple arrangement.

According to the satellite broadcasting system and the satellite broadcasting receiver of the present invention, a signal can be received by a receiver using a simple antenna system meeting requirements for not only indoor use but also use on a mobile or use as a portable device.

According to the satellite broadcasting receiver of the present invention, the reception channel can be switched without distracting the driver of a mobile from driving. In addition, reception channel switching is controlled in accordance with the fatigue state of the driver to prevent a traffic accident.

What is claimed is:

1. A satellite broadcasting system for transmitting a plurality of broadcasting signals of a plurality of channels from a ground broadcasting station (BC1 or BC2), repeating the broadcasting signals with a geostationary satellite (SAT), and broadcasting the broadcasting signals to a broadcasting receiver (MS) in a predetermined service area on the ground, said ground broadcasting station (BC1 or BC2) comprising multiplex means (111–11n, 121–12n, 131) for spreading spectra of the broadcasting signals using different spreading codes in units of channels and synthesizing the broadcasting channels to code-division-multiplex the broadcasting signals of the plurality of channels, and transmitting the broadcasting signals; and transmission synchronization means (140) for setting a phase relationship of the spreading codes between the broadcasting signals of the channels code-division-multiplexed by said multiplex means in a predetermined synchronization state.

2. A satellite broadcasting system for transmitting a plurality of broadcasting signals of a plurality of channels from a ground broadcasting station (BC1 or BC2), repeating the broadcasting signals with a geostationary satellite (SAT), and broadcasting the broadcasting signals to a broadcasting receiver (MS) in a predetermined service area on the ground, said ground broadcasting station (BC1 or BC2) comprising multiplex means (111–11n, 121–12n, 131) for spreading spectra of the broadcasting signals using different spreading codes in units of channels and synthesizing the broadcasting channels to code-division-multiplex the broadcasting signals of the plurality of channels, and transmitting the broadcasting signals; and said geostationary satellite comprising phase difference detection means (161–16k, 180) for receiving the code-division-multiplexed broadcasting signals transmitted from the ground broadcasting station and detecting a phase difference of the spreading codes between the channels of the code-division-multiplexed broadcasting signals, and transmission synchronization means (180, 171–17k) for setting a phase relationship of the spreading codes between the channels of the received code-division-multiplexed broadcasting signals in a predetermined synchronization state on the basis of a detection result from said phase difference detection means and transmitting the broadcasting signals to the predetermined service area.

3. A satellite broadcasting system for transmitting a plurality of broadcasting signals of a plurality of channels from a ground broadcasting station (BC1 or BC2), repeating the broadcasting signals with a geostationary satellite (SAT), and broadcasting the broadcasting signals to a broadcasting receiver (MS) in a predetermined service area on the ground, said ground broadcasting station (BC1 or BC2) comprising multiplex means (111–11n, 121–12n, 135) for spreading spectra of the broadcasting signals using different spreading codes in units of channels and synthesizing the broadcasting channels to code-division-multiplex the broadcasting signals of the plurality of channels, and transmitting the broadcasting signals, and phase difference information transmission means (141) for transmitting information representing a phase difference of the spreading codes between the broadcasting signals of the channels, which are multiplexed by said multiplex means, to notify the geostationary satellite of the information; and said geostationary satellite (SAT) comprising phase difference information reception means (157, 181) for receiving the information representing the phase difference, and transmission synchronization means (181, 171–17k) for setting a phase relationship of the spreading codes between the channels of the received code-division-multiplexed broadcasting signals in a predetermined synchronization state on the basis of the information representing the phase difference, which is received by said phase difference information reception means, and transmitting the broadcasting signals to the predetermined service area.

4. A satellite broadcasting system for transmitting a plurality of broadcasting signals of a plurality of channels from a ground broadcasting station (BC1 or BC2), repeating the broadcasting signals with a geostationary satellite (SAT), and broadcasting the broadcasting signals to a broadcasting receiver (MS) in a predetermined service area on the ground, said ground broadcasting station (BC1 or BC2) comprising multiplex means (111–11n, 121–12n, 135) for spreading spectra of the broadcasting signals using different spreading codes in units of channels and synthesizing the broadcasting channels to code-division-multiplex the broadcasting signals of the plurality of channels, and transmitting the broadcasting signals, and phase difference information transmission means (141) for transmitting information representing a phase difference of the spreading codes between the broadcasting signals of the channels, which are multiplexed by said multiplex means, to notify the broadcasting receiver of the information; and the broadcasting receiver comprising phase difference information reception means (194, 196, 190) for receiving the information representing the phase difference, and reception synchronization means (190) for establishing spreading code synchronization for the channels of the code-division-multiplexed broadcasting signals received via the geostationary satellite, on the basis of the information representing the phase difference, which is received by said phase difference information reception means.

5. A satellite broadcasting system for transmitting a plurality of broadcasting signals of a plurality of channels from a ground broadcasting station (BC1 or BC2), repeating the broadcasting signals with a geostationary satellite (SAT), and broadcasting the broadcasting signals to a broadcasting receiver (MS) in a predetermined service area on the ground, said ground broadcasting station (BC1 or BC2) comprising multiplex means (111–11n, 121–12n, 131) for spreading spectra of the broadcasting signals using different spreading codes in units of channels and synthesizing the broadcasting channels to code-division-multiplex the broadcasting signals of the plurality of channels, and transmitting the broadcasting signals;

said geostationary satellite (SAT) comprising phase difference detection means (161–16k, 182) for receiving the code-division-multiplexed broadcasting signals transmitted from the ground broadcasting station and detecting a phase difference of the spreading codes between the channels of the code-division-multiplexed broadcasting signals, and phase difference information transmission means (182, 158) for transmitting information representing the phase difference of the spreading codes between the broadcasting signals of the channels, which is detected by said phase difference detection means, to notify the broadcasting receiver of the information; and said broadcasting receiver (MS) comprising phase difference information reception means (194, 196, 190) for receiving the information representing the phase difference, and reception synchronization means (190) for establishing spreading code synchronization for the channels of the code-division-multiplexed broadcasting signals received via the geostationary satellite, on the basis of the information representing the phase difference, which is received by said phase difference information reception means.

6. A satellite broadcasting system for transmitting a broadcasting signal of at least one channel from each of a plurality of ground broadcasting stations (BC1, BC2), repeating the broadcasting signals with a geostationary satellite (SAT), and broadcasting the broadcasting signals to a broadcasting receiver (MS) in a predetermined service area on the ground, each of said plurality of ground broadcasting stations (BC1, BC2) comprising transmission means (111–11n, 121–12n, 131) for spreading spectra of broadcasting signals to be transmitted from a self station using different spreading codes in units of channels and transmitting the broadcasting signals; and said geostationary satellite (SAT) comprising phase difference detection means (161–16k, 182) for receiving the broadcasting signals of the channels, which are transmitted from the plurality of ground broadcasting stations, and detecting a phase difference of the spreading codes between the broadcasting signals of the channels, and repeat transmission synchronization means (182, 158) for setting a phase relationship of the spreading codes between the channels of the broadcasting signals received from the plurality of ground broadcasting stations in a predetermined synchronization state on the basis of a detection result from said phase difference detection means and transmitting the broadcasting signals to the predetermined service area.

7. A satellite broadcasting system for transmitting a broadcasting signal of at least one channel from each of a plurality of ground broadcasting stations (BC1, BC2), repeating the broadcasting signals with a geostationary satellite (SAT), and broadcasting the broadcasting signals to a broadcasting receiver (MS) in a predetermined service area on the ground, each of said plurality of ground broadcasting stations (BC1, BC2) comprising transmission means (111–11n,

121–12n, 131) for spreading spectra of broadcasting signals to be transmitted from a self station using different spreading codes in units of channels and transmitting the broadcasting signals, and transmission timing control means (148) for variably controlling a transmission timing of the broadcasting signals to be transmitted by said transmission means in units of channels; and said geostationary satellite (SAT) comprising phase difference detection means (1131–113k, 1122) for receiving the broadcasting signals of the channels, which are transmitted from the plurality of ground broadcasting stations, and detecting a phase difference of the spreading codes between the broadcasting signals of the channels, and phase difference information notification means (1141–114k, 1123–1125) for supplying information representing the phase difference detected by said phase difference detection means to each of the ground broadcasting stations as sources, thereby causing said transmission timing control means to variably control the transmission timing such that the phase difference of the spreading codes between the broadcasting signals of the channels transmitted from the ground broadcasting stations is made zero.

8. A satellite broadcasting system comprising:

a satellite (SAT1) for repeating a broadcasting signal transmitted from a ground broadcasting station (BC1 or BC2) and transmitting the broadcasting signal to a predetermined service area on the ground;

a plurality of broadcasting receivers (MS) each having a function of receiving and reconstructing the broadcasting signal repeated by said satellite (SAT1) in the service area; and a gap filler apparatus (GFa–GFi) for receiving the broadcasting signal repeated by said satellite (SAT1) and transmitting the received broadcasting signal to an area in the service area, where the broadcasting signal from said satellite (SAT1) cannot be received, wherein said satellite (SAT1) comprises means for repeating a first broadcasting signal transmitted from the ground broadcasting station (BC1 or BC2) and a second broadcasting signal having the same contents as those of the first broadcasting signal, and said gap filler apparatus (GFa–GFi) comprises means for receiving the second broadcasting signal transmitted from said satellite (SAT1) and converting the second broadcasting signal into a third broadcasting signal having the same frequency as that of the first broadcasting signal, and means for radio-transmitting the third broadcasting signal to the area in the service area, where the first broadcasting signal from the satellite (SAT1) cannot be received.

9. A satellite broadcasting system for repeating a broadcasting signal transmitted from a ground broadcasting station (BC1 or BC2) with a satellite (SAT1) and transmitting the broadcasting signal to a predetermined service area on the ground, comprising:

ground network transmission means for transmitting, through a ground network (NM), a second broadcasting signal having the same contents as those of a first broadcasting signal transmitted from the ground broadcasting station (BC1 or BC2) to the satellite (SAT1); and a gap filler apparatus (GFa–GFi) for receiving the second broadcasting signal transmitted by said ground network transmission means, converting the received second broadcasting signal into a third broadcasting signal in the same frequency band as that of the broadcasting signal transmitted from the satellite (SAT1), and radio-transmitting the third broadcasting signal to an area in the service area, where the broadcasting signal from the satellite (SAT1) cannot be received.

10. A satellite broadcasting system for repeating a broadcasting signal transmitted from a ground broadcasting station (BC1 or BC2) with a satellite (SAT1) and transmitting the broadcasting signal to a predetermined service area on the ground, said system comprising:

another satellite (SAT') for repeating a second broadcasting signal having the same contents as those of a first broadcasting signal transmitted from the ground broadcasting station (BC1 or BC2) to the satellite (SAT1); and a gap filler apparatus (GFa–GFi) for receiving the second broadcasting signal repeated by said other satellite (SAT'), converting the received second broadcasting signal into a third broadcasting signal in the same frequency band as that of the broadcasting signal transmitted from the satellite (SAT1), and radio-transmitting the third broadcasting signal to an area in the service area, where the broadcasting signal from the satellite (SAT1) cannot be received.

11. A satellite broadcasting system for repeating a broadcasting signal transmitted from a ground broadcasting station (BC1 or BC2) with a satellite (SAT1) and transmitting the broadcasting signal to a predetermined service area on the ground, said system comprising:

ground network transmission means for transmitting, through a ground network (NM), a second broadcasting signal having the same contents as those of a first broadcasting signal transmitted from the ground broadcasting station (BC1 or BC2) to the satellite (SAT1);

another satellite (SAT') for repeating a second broadcasting signal having the same contents as those of a first broadcasting signal transmitted from the ground broadcasting station (BC1 or BC2) to the satellite (SAT1); and a gap filler apparatus (GFa–GFi) for selectively receiving one of the second broadcasting signal transmitted by said ground network transmission means and the second broadcasting signal repeated by said other satellite (SAT'), converting the received second broadcasting signal into a third broadcasting signal in the same frequency band as that of the broadcasting signal transmitted from the satellite (SAT1), and radio-transmitting the third broadcasting signal to an area in the service area, where the broadcasting signal from the satellite (SAT1) cannot be received.

12. A satellite broadcasting system according to claim 11, wherein said gap filler apparatus (GFa–GFi) comprises switching means (SW) for switching to receive one of the second broadcasting signal transmitted by said ground network transmission means and the second broadcasting signal repeated by said other satellite (SAT').

13. A gap filler apparatus (GFa–GFi) used in a satellite broadcasting system for repeating a broadcasting signal transmitted from a ground broadcasting station (BC1 or BC2) with a satellite (SAT1) and transmitting the broadcasting signal to a predetermined service area on the ground, said apparatus (GFa–GFi) comprising:

ground network reception means for receiving, from the ground broadcasting station (BC1 or BC2) through a ground network, a second broadcasting signal having the same contents as those of the broadcasting signal transmitted from the ground broadcasting station (BC1 or BC2) to the satellite (SAT1);

conversion means for converting the second broadcasting signal received by said ground network reception means into a third broadcasting signal in the same frequency band as that of the broadcasting signal transmitted from the satellite (SAT1); and transmission means for radio-transmitting the third broadcasting signal obtained by said conversion means to an area in the service area, where the broadcasting signal from the satellite (SAT1) cannot be received.

14. A gap filler apparatus (GFa–GFi) used in a satellite broadcasting system for repeating a broadcasting signal transmitted from a ground broadcasting station (BC1 or BC2) with a satellite (SAT1) and transmitting the broadcasting signal to a predetermined service area on the ground, said apparatus (GFa–GFi) comprising:

satellite reception means for receiving the broadcasting signal transmitted from the satellite (SAT1);

ground network reception means for receiving, through a ground network, a second broadcasting signal having the same contents as those of the broadcasting signal transmitted from the ground broadcasting station (BC1 or BC2) to the satellite (SAT1);

conversion means for converting the second broadcasting signal received by said ground network reception means into a third broadcasting signal in the same frequency band as that of the broadcasting signal transmitted from the satellite (SAT1); and selective transmission means for selecting one of the broadcasting signal received by said satellite reception means and the third broadcasting signal obtained by said conversion means and radio-transmitting the selected signal to an area in the service area, where the broadcasting signal from the satellite (SAT1) cannot be received.

15. A gap filler apparatus (GFa–GFi) according to claim 14, wherein said selective transmission means determines whether said satellite reception means receives a broadcasting signal of not less than a predetermined level, selects the broadcasting signal received by said satellite reception means and radio-transmits the broadcasting signal to the reception disabled area when it is determined that the broadcasting signal of not less than the predetermined level is received, or radio-transmits the third broadcasting signal obtained by said conversion means to the reception disabled area when it is determined that the broadcasting signal of not less than the predetermined level is not received.

16. A satellite broadcasting system for repeating a broadcasting signal with a satellite (SAT1) and broadcasting the broadcasting signal to a predetermined service area on the ground, said system comprising:

a gap filler apparatus (GFa–GFi) for receiving the broadcasting signal repeated by the satellite (SAT1) and radio-transmitting the received broadcasting signal to an area in the service area, wherein the broadcasting signal from the satellite (SAT1) cannot be received; and a monitor apparatus (MCa–MCc) connected to said gap filler apparatus (GFa–GFi) through a communication line (NW), wherein said gap filler apparatus (GFa–GFi) comprises monitor information transmission means for generating monitor information representing an operation state of a self apparatus and transmitting the monitor information to said monitor apparatus (MCa–MCc) through the communication line (NW), and said monitor apparatus (MCa–MCc) comprises means for receiving the monitor information transmitted from said gap filler apparatus (GFa–GFi) through the communication line (NW) and performing predetermined processing of monitoring the operation state of said gap filler apparatus (GFa–GFi) on the basis of the received monitor information.

17. A satellite broadcasting system according to claim 16, wherein:

said monitor apparatus (MCa–MCc) comprises means for transmitting a monitor information transmission request to said gap filler apparatus (GFa–GFi) through the communication line (NW) regularly or as needed, and said monitor information transmission means of said gap filler apparatus (GFa–GFi) comprises means for storing the monitor information, and means for reading the monitor information and transmitting the monitor information to said monitor apparatus (MCa–MCc) every time the transmission request arrives from said monitor apparatus (MCa–MCc).

18. A satellite broadcasting system according to claim 16, wherein said monitor information transmission means of said gap filler apparatus (GFa–GFi) comprises means for monitoring the operation state of the self apparatus, and means for, when said means detects an error in the operation state of the self apparatus, transmitting monitor information representing contents of the error to said monitor apparatus (MCa–MCc) through the communication line (NW).

19. A satellite broadcasting system according to claim 15, wherein said monitor information transmission means of said gap filler apparatus (GFa–GFi) comprises means for monitoring the operation state of the self apparatus, and means for, when said monitor means detects an error in the operation state of the self apparatus, generating message information and transmitting the message information to a broadcasting receiver (MS) in an area covered by the self apparatus.

20. A satellite broadcasting system for repeating a broadcasting signal with a satellite (SAT1) and broadcasting the broadcasting signal to a predetermined service area on the ground, said system comprising:

a gap filler apparatus (GFa–GFi) for receiving the broadcasting signal repeated by the satellite (SAT1) and radio-transmitting the received broadcasting signal to an area in the service area, wherein the broadcasting signal from the satellite (SAT1) cannot be received;

a monitor receiver (MR) set in the reception disabled area and having a function of receiving the received broadcasting signal transmitted from said gap filler apparatus (GFa–GFi); and a monitor apparatus (MCa–MCc) connected to said monitor receiver (MR) through a communication line (INW), wherein said gap filler apparatus (GFa–GFi) comprises means for generating monitor information representing an operation state of a self apparatus, inserting the monitor information into the received broadcasting signal, and radio-transmitting the broadcasting signal, said monitor receiver (MR) comprises means for receiving the received broadcasting signal transmitted from said gap filler apparatus (GFa–GFi) and extracting the monitor information from the received broadcasting signal, means for detecting a reception state of the received broadcasting signal, and means for transmitting the extracted monitor information and detection information of the reception state to said monitor apparatus (MCa–MCc) through the communication line (INW), and said monitor apparatus (MCa–MCc) comprises means for receiving the monitor information and the detection information, which are transmitted from said monitor receiver (MR) through the communication line (INW), and performing predetermined processing of monitoring the operation state of said gap filler apparatus (GFa–GFi) on the basis of the received monitor information and detection information.

21. A satellite broadcasting system in which a plurality of channel signals having different central frequencies are transmitted from a transmission station (410) to a satellite (430) placed in a geostationary orbit, and the channel signals are transmitted from the satellite (430) to a service area and received by a reception terminal (450), said satellite (430) comprising signal reception means for receiving the plurality of channel signals transmitted from the transmission station (410), classification means for frequency-converting the channel signals received by said reception means and classifying the signals in accordance with frequency positions, polarization setting means for amplifying the channel signals classified by said classification means and then setting, for each channel signal, right circular polarization or left circular polarization in accordance with classification, and signal transmission means for transmitting the channel signals for which polarization is set by said polarization setting means; and said reception terminal (450) comprising reception means for receiving the channel signals transmitted from said signal transmission means, polarization processing means for selecting circular polarization corresponding to selected channels of the channel signals received by said reception means, and channel selection means for selecting a desired channel signal from the channel signals for which circular polarization is selected by said polarization processing means.

22. A satellite broadcasting system according to claim 21, wherein the channel signals are multiplexed by code division multiplex in units of channels.

23. A satellite broadcasting system in which a plurality of channel signals having different central frequencies are transmitted from a transmission station (410) to a satellite (430) placed in a geostationary orbit, and the channel signals are transmitted from the satellite (430) to a service area and received by a reception terminal (450), said satellite (430) comprising signal reception means for receiving the plurality of channel signals transmitted from the transmission station (410), classification means for frequency-converting the channel signals received by said reception means and classifying the signals in accordance with frequency positions, polarization setting means for amplifying the channel signals classified by said classification means and then setting, for each channel signal, vertical polarization or horizontal polarization in accordance with classification, and signal transmission means for transmitting the channel signals for which polarization is set by said polarization setting means; and said reception terminal (450) comprising reception means for receiving the channel signals transmitted from said signal transmission means, polarization processing means for selecting linear polarization corresponding to selected channels of the channel signals received by said reception means, and channel selection means for selecting a desired channel signal from the channel signals for which linear polarization is selected by said polarization processing means.

24. A satellite broadcasting system according to claim 23, wherein the channel signals are multiplexed by code division multiplex in units of channels.

25. A satellite broadcasting receiver for receiving digital broadcasting using a geostationary satellite placed in a geostationary orbit above the equator, said apparatus comprising:

fatigue state estimation means (610c) for detecting a fatigue state of a driver of a mobile on the basis of a moving state of the mobile carrying said satellite broadcasting receiver; and reception means (62) for receiving, from broadcasting signals transmitted from the geostationary satellite, a channel corresponding to the fatigue state detected by said fatigue state estimation means (610c).

26. A broadcasting system using a satellite, comprising:

a ground transmission apparatus which assigns a plurality of broadcasting signals to a plurality of channels, respectively, spreads spectra of the broadcasting signals of the respective channels using spreading codes which are different for the respective channels and have a phase relationship set in a synchronization state, produces a CDM (Code Division Multiplex) broadcasting signal by synthesizing the spread signals, and sends the CDM broadcasting signal to the satellite;

a satellite repeat apparatus which is arranged in the satellite to receive the CDM broadcasting signal sent from the ground transmission apparatus and send the CDM broadcasting signal to a service area on the ground; and a reception terminal apparatus which receives the CDM broadcasting signal sent to the service area, selectively generates a spreading code corresponding to a designated channel, and separates a broadcasting signal of the designated channel from the CDM broadcasting signal by despreading the spectrum of the CDM broadcasting signal using the spreading code.

27. A ground transmission apparatus included in the system according to claim 26, which comprises:

a generation unit which generates the spreading codes for said plurality of channels;

a control unit which controls to set the phase relationship between the spreading codes in a predetermined synchronization state between the channels;

a multiplex unit which spreads spectra of the broadcasting signals of said plurality of channels using the spreading codes synchronization-controlled by the control unit and produces the CDM broadcasting signal by synthesizing the spread signals; and a sending unit which sends the CDM broadcasting signal output from the multiplex unit to the satellite.

28. A satellite repeat apparatus included in the system according to claim 26, which comprises:

a reception unit which receives the CDM broadcasting signal sent from the ground transmission apparatus; and a sending unit which sends the CDM broadcasting signal received by the reception unit to the service area on the ground.

29. A reception terminal apparatus included in the system according to claim 26, which comprises:

a reception unit which receives the CDM broadcasting signal sent from the satellite repeat apparatus to the service area on the ground;

a generation unit which selectively generates the spreading code corresponding to the designated channel from the spreading codes for said plurality of channels; and a separation unit which separates the broadcasting signal of the designated channel from the CDM broadcasting signal by despreading the spectrum of the CDM broadcasting signal received by the reception unit using the spreading code generated by the generation unit.

30. A broadcasting method using a satellite, comprising:

causing a ground transmission apparatus to assign a plurality of broadcasting signals to a plurality of channels, respectively, spread the spectra of the broadcasting signals of the respective channels using spreading codes which are different for the respective channels and have a phase relationship set in a synchronization state, produce a CDM (Code Division Multiplex) broadcasting signal by synthesizing the spread signals, and send the CDM broadcasting signal to the satellite; and causing the satellite to receive the CDM broadcasting signal sent from the ground transmission apparatus and send the CDM broadcasting signal to a service area on the ground.

31. A broadcasting system using a satellite, comprising:

a ground transmission apparatus which spreads spectra of a plurality of broadcasting signals using spreading codes which are different for channels, produces a CDM (Code Division Multiplex) broadcasting signal by synthesizing the spread signals, and sends the CDM broadcasting signal to the satellite;

a satellite repeat apparatus which is arranged in the satellite to receive the CDM broadcasting signal sent from the ground transmission apparatus, control to set a phase relationship between the spreading codes in the CDM broadcasting signal in a predetermined synchronization state between the channels, and send the CDM broadcasting signal that has undergone synchronization control of the spreading codes to a service area on the ground; and a reception terminal apparatus which receives the CDM broadcasting signal sent to the service area, selectively generates a spreading code corresponding to a designated channel, and separates a broadcasting signal of the designated channel from the CDM broadcasting signal by despreading the spectrum of the CDM broadcasting signal using the spreading code.

32. A ground transmission apparatus included in the system according to claim 31, which comprises:

a generation unit which generates the spreading codes for said plurality of channels;

a multiplex unit which spreads spectra of the broadcasting signals of said plurality of channels using the spreading codes generated by the generation unit and produces the CDM broadcasting signal by synthesizing the spread signals; and a sending unit which sends the CDM broadcasting signal output from the multiplex unit to the satellite.

33. A satellite repeat apparatus included in the system according to claim 31, which comprises:

a reception unit which receives the CDM broadcasting signal sent from the ground transmission apparatus;

a control unit which controls to set, in a predetermined synchronization state between the channels, the phase relationship between the spreading codes in the CDM broadcasting signal received by the reception unit; and a sending unit which sends the CDM broadcasting signal that has undergone synchronization control of the spreading codes by the control unit to the service area on the ground.

34. A reception terminal apparatus included in the system according to claim 31, which comprises:

a reception unit which receives the CDM broadcasting signal sent from the satellite repeat apparatus to the service area on the ground;

a generation unit which selectively generates the spreading code corresponding to the designated channel from the spreading codes for said plurality of channels; and a separation unit which separates the broadcasting signal of the designated channel from the CDM broadcasting signal by despreading the spectrum of the CDM broadcasting signal received by the reception unit using the spreading code generated by the generation unit.

35. A broadcasting method using a satellite, comprising:

causing a ground transmission apparatus to spread the spectra of a plurality of broadcasting signals using spreading codes which are different for channels, produce a CDM (Code Division Multiplex) broadcasting signal by synthesizing the spread signals, and send the CDM broadcasting signal to the satellite; and causing the satellite to receive the CDM broadcasting signal sent from the ground transmission apparatus, control to set a phase relationship between the spreading codes in the CDM broadcasting signal in a predetermined synchronization state between the channels, and send the CDM broadcasting signal that has undergone synchronization control of the spreading codes to a service area on the ground.

36. A broadcasting system using a satellite, comprising:

a ground transmission apparatus which spreads spectra of a plurality of broadcasting signals using spreading codes which are different for channels, produces a CDM (Code Division Multiplex) broadcasting signal by synthesizing the spread signals, obtains a phase difference information signal between the channels of the spreading codes, and sends the CDM broadcasting signal and the phase difference information signal to the satellite;

a satellite repeat apparatus which is arranged in the satellite to receive the CDM broadcasting signal and the phase difference information signal sent from the ground transmission apparatus, control to set a phase relationship between the spreading codes in the CDM broadcasting signal in a predetermined synchronization state between the channels on the basis of the phase difference information signal, and send the CDM broadcasting signal that has undergone synchronization control of the spreading codes to a service area on the ground; and a reception terminal apparatus which receives the CDM broadcasting signal sent to the service area, selectively generates a spreading code corresponding to a designated channel, and separates a broadcasting signal of the designated channel from the CDM broadcasting signal by despreading the spectrum of the CDM broadcasting signal using the spreading code.

37. A ground transmission apparatus included in the system according to claim 36, which comprises:

a generation unit which generates the spreading codes for said plurality of channels;

a multiplex unit which spreads spectra of the broadcasting signals of said plurality of channels using the spreading codes generated by the generation unit and produces the CDM broadcasting signal by synthesizing the spread signals;

a production unit which produces the phase difference information signal by detecting a phase difference between the channels of the spreading codes; and a sending unit which sends the CDM broadcasting signal and the phase difference information signal to the satellite.

38. A satellite repeat apparatus included in the system according to claim 36, which comprises:

a reception unit which receives the CDM broadcasting signal and the phase difference information signal sent from the ground transmission apparatus;

a control unit which controls to set the phase relationship between the spreading codes in the CDM broadcasting signal in a predetermined synchronization state between the channels on the basis of the phase difference information signal; and a sending unit which sends the CDM broadcasting signal that has undergone synchronization control of the spreading codes by the control unit to the service area on the ground.

39. A reception terminal apparatus included in the system according to claim 36, which comprises:

a reception unit which receives the CDM broadcasting signal sent from the satellite repeat apparatus to the service area on the ground;

a generation unit which selectively generates the spreading code corresponding to the designated channel from the spreading codes for said plurality of channels; and a separation unit which separates the broadcasting signal of the designated channel from the CDM broadcasting signal by despreading the spectrum of the CDM broadcasting signal received by the reception unit using the spreading code generated by the generation unit.

40. A broadcasting method using a satellite, comprising:

causing a ground transmission apparatus to spread the spectra of a plurality of broadcasting signals using spreading codes which are different for channels, produce a CDM (Code Division Multiplex) broadcasting signal by synthesizing the spread signals, produce a phase difference information signal representing a phase difference between the channels of the spreading codes, and send the CDM broadcasting signal and the phase difference information signal to the satellite; and causing the satellite to receive the CDM broadcasting signal and the phase difference information signal, control to set a phase relationship between the spreading codes in the CDM broadcasting signal in a predetermined synchronization state between the channels on the basis of the phase difference information signal, and broadcast the CDM broadcasting signal that has undergone synchronization control of the spreading codes to a service area on the ground.

41. A broadcasting system using a satellite, comprising:

a ground transmission apparatus which spreads spectra of a plurality of broadcasting signals using spreading codes which are different for channels, produces a CDM (Code Division Multiplex) broadcasting signal by synthesizing the spread signals, obtains a phase difference information signal representing a phase difference between the channels of the spreading codes, and sends the CDM broadcasting signal and the phase difference information signal to the satellite;

a satellite repeat apparatus which is arranged in the satellite to receive the CDM broadcasting signal and the phase difference information signal sent from the ground transmission apparatus and send the CDM broadcasting signal and the phase difference information signal to a service area on the ground; and a reception terminal apparatus which receives the CDM broadcasting signal and the phase difference information signal sent to the service area, selectively generates a spreading code corresponding to a designated channel, synchronizes a phase of the spreading code with a spreading code of the designated channel on the basis of the phase difference information signal, and separates a broadcasting signal of the designated channel from the CDM broadcasting signal by despreading the spectrum of the CDM broadcasting signal using the spreading code that has undergone synchronization processing.

42. A ground transmission apparatus included in the system according to claim 41, which comprises:

a generation unit which generates the spreading codes for said plurality of channels;

a multiplex unit which spreads spectra of the broadcasting signals of said plurality of channels using the spreading codes generated by the generation unit and produces the CDM broadcasting signal by synthesizing the spread signals;

a production unit which produces the phase difference information signal by detecting a phase difference between the channels of the spreading codes; and a sending unit which sends the CDM broadcasting signal and the phase difference information signal to the satellite.

43. A satellite repeat apparatus included in the system according to claim 41, which comprises:

a reception unit which receives the CDM broadcasting signal and the phase difference information signal sent from the ground transmission apparatus; and a sending unit which sends the CDM broadcasting signal and the phase difference information signal received by the reception unit to the service area on the ground.

44. A reception terminal apparatus included in the system according to claim 41, which comprises:

a reception unit which receives the CDM broadcasting signal and the phase difference information signal sent from the satellite repeat apparatus to the service area on the ground;

a generation unit which selectively generates the spreading code corresponding to the designated channel from the spreading codes for said plurality of channels;

a synchronization unit which synchronizes the phase of the spreading code generated by the generation unit with the spreading code of the designated channel on the basis of the phase difference information signal received by the reception unit; and a separation unit which separates the broadcasting signal of the designated channel from the CDM broadcasting signal by despreading the spectrum of the CDM broadcasting signal received by the reception unit using the spreading code synchronized by the synchronization unit.

45. A broadcasting method of providing a broadcasting signal to a reception terminal apparatus using a satellite, comprising:

causing a ground transmission apparatus to spread the spectra of a plurality of broadcasting signals using spreading codes which are different for channels, produce a CDM (Code Division Multiplex) broadcasting signal by synthesizing the spread signals, produce a phase difference information signal representing a phase difference between the channels of the spreading codes, and send the CDM broadcasting signal and the phase difference information signal to the satellite;

causing the satellite to receive the CDM broadcasting signal and the phase difference information signal and broadcast the CDM broadcasting signal and the phase difference information signal to a service area on the ground; and causing the reception terminal apparatus to receive the CDM broadcasting signal and the phase difference information signal sent to the service area, selectively generate a spreading code corresponding to a designated channel, synchronize a phase of the spreading code with a spreading code of the designated channel on the basis of the phase difference information signal, and separates a broadcasting signal of the designated channel from the CDM broadcasting signal by despreading the spectrum of the CDM broadcasting signal using the spreading code that has undergone synchronization processing.

46. A broadcasting system using a satellite, comprising:
a ground transmission apparatus which spreads spectra of a plurality of broadcasting signals using spreading codes which are different for channels, produces a CDM (Code Division Multiplex) broadcasting signal by synthesizing the spread signals, and sends the CDM broadcasting signal to the satellite;

a satellite repeat apparatus which is arranged in the satellite to receive the CDM broadcasting signal sent from the ground transmission apparatus, produce a phase difference information signal by detecting a phase difference in the spreading codes between the channels of the CDM broadcasting signal, and send the CDM broadcasting signal and the phase difference information signal to a service area on the ground; and a reception terminal apparatus which receives the CDM broadcasting signal and the phase difference information signal sent to the service area, selectively generates a spreading code corresponding to a designated channel, synchronizes a phase of the spreading code with a spreading code of the designated channel on the basis of the phase difference information signal, and separates a broadcasting signal of the designated channel from the CDM broadcasting signal by despreading the spectrum of the CDM broadcasting signal using the spreading code that has undergone synchronization processing.

47. A ground transmission apparatus included in the system according to claim 46, which comprises:
a generation unit which generates the spreading codes for said plurality of channels;
a multiplex unit which spreads spectra of the broadcasting signals of said plurality of channels using the spreading codes generated by the generation unit and produces the CDM broadcasting signal by synthesizing the spread signals; and
a sending unit which sends the CDM broadcasting signal to the satellite.

48. A satellite repeat apparatus included in the system according to claim 46, which comprises:
a reception unit which receives the CDM broadcasting signal sent from the ground transmission apparatus;

production means for producing the phase difference information signal by detecting the phase difference in the spreading codes between the channels in the CDM broadcasting signal; and
a sending unit which sends the CDM broadcasting signal and the phase difference information signal to the service area on the ground.

49. A reception terminal apparatus included in the system according to claim 46, which comprises:
a reception unit which receives the CDM broadcasting signal and the phase difference information signal sent from the satellite repeat apparatus to the service area on the ground;
a generation unit which selectively generates the spreading code corresponding to the designated channel from the spreading codes for said plurality of channels;
a synchronization unit which synchronizes the phase of the spreading code generated by the generation unit with the spreading code of the designated channel on the basis of the phase difference information signal received by the reception unit; and
a separation unit which separates the broadcasting signal of the designated channel from the CDM broadcasting signal by despreading the spectrum of the CDM broadcasting signal received by the reception unit using the spreading code synchronized by the synchronization unit.

50. A broadcasting method of providing a broadcasting signal to a reception terminal apparatus using a satellite, comprising:
causing a ground transmission apparatus to spread the spectra of a plurality of broadcasting signals using spreading codes which are different for channels, produce a CDM (Code Division Multiplex) broadcasting signal by synthesizing the spread signals, and send the CDM broadcasting signal to the satellite;
causing the satellite to receive the CDM broadcasting signal, produce a phase difference information signal by detecting a phase difference in the spreading codes between the channels in the CDM broadcasting signal, and broadcast the CDM broadcasting signal and the phase difference information signal to a service area on the ground; and
causing the reception terminal apparatus to receive the CDM broadcasting signal and the phase difference information signal sent to the service area, selectively generate a spreading code corresponding to a designated channel, synchronize a phase of the spreading code with a spreading code of the designated channel on the basis of the phase difference information signal, and separate a broadcasting signal of the designated channel from the CDM broadcasting signal by despreading the spectrum of the CDM broadcasting signal using the spreading code that has undergone synchronization processing.

51. A broadcasting system using a satellite, comprising:
a plurality of ground transmission apparatuses each of which spreads spectra of a plurality of broadcasting signals using spreading codes which are different for channels, produces a CDM (Code Division Multiplex) broadcasting signal by synthesizing the spread signals, and sends the CDM broadcasting signal to the satellite;
a satellite repeat apparatus which is arranged in the satellite to simultaneously receive said plurality of CDM broadcasting signals sent from said plurality of ground transmission apparatuses, control to set a phase relationship of the spreading codes between the channels in each of the CDM broadcasting signals in a predetermined synchronization state, and send said plurality of CDM broadcasting signals that have undergone synchronization control of the spreading codes to a service area on the ground; and a reception terminal apparatus which receives the CDM broadcasting signals multiplexed and sent to the service area, selectively generates a spreading code corresponding to a designated channel, and separates a broadcasting signal of the designated channel from said plurality of CDM broadcasting signals by despreading the spectrum of the CDM broadcasting signals using the spreading code.

52. A ground transmission apparatus included in the system according to claim 51, which comprises:

a generation unit which generates the spreading codes for said plurality of channels;

a multiplex unit which spreads spectra of the broadcasting signals of said plurality of channels using the spreading codes generated by the generation unit and produces the CDM broadcasting signal by synthesizing the spread signals; and a sending unit which sends the CDM broadcasting signal to the satellite.

53. A satellite repeat apparatus included in the system according to claim 51, which comprises:

a reception unit which simultaneously receives the CDM (Code Division Multiplex) broadcasting signals sent from said plurality of ground transmission stations;

a control unit which controls to set, in a predetermined synchronization state, the phase relationship of the spreading codes between the channels in each of said plurality of CDM broadcasting signals simultaneously received by the reception unit;

a multiplex unit which multiplexes said plurality of CDM broadcasting signals that have undergone synchronization control of the spreading codes; and a sending unit which sends said plurality of CDM broadcasting signals multiplexed by the multiplex unit to the service area on the ground.

54. A reception terminal apparatus included in the system according to claim 51, which comprises:

a reception unit which receives said plurality of CDM broadcasting signals multiplexed and sent from the satellite repeat apparatus to the service area on the ground;

a generation unit which selectively generates the spreading code corresponding to the designated channel from the spreading codes for said plurality of channels in each of said plurality of CDM broadcasting signals; and a separation unit which separates the broadcasting signal of the designated channel from said plurality of CDM broadcasting signals by despreading the spectra of said plurality of CDM broadcasting signals received by the reception unit using the spreading code generated by the generation unit.

55. A broadcasting method using a satellite, comprising:

causing each of a plurality of ground transmission apparatuses to spread the spectra of a plurality of broadcasting signals using spreading codes which are different for channels, produce a CDM (Code Division Multiplex) broadcasting signal by synthesizing the spread signals, and send the CDM broadcasting signal to the satellite; and causing the satellite to simultaneously receive said plurality of CDM broadcasting signals sent from said plurality of ground transmission apparatuses, control to set a phase relationship of the spreading codes between the channels in each of said plurality of CDM broadcasting signals in a predetermined synchronization state, multiplex said plurality of CDM broadcasting signals that have undergone synchronization control of the spreading codes, and send the CDM broadcasting signals to a service area on the ground.

56. A broadcasting system using a satellite, comprising:

a plurality of ground transmission apparatuses each of which spreads spectra of a plurality of broadcasting signals using spreading codes which are different for channels, produces a CDM (Code Division Multiplex) broadcasting signal by synthesizing the spread signals, sends the CDM broadcasting signal to the satellite, and controls to set a phase relationship between the spreading codes in a predetermined synchronization state between the channels on the basis of a phase difference information signal transmitted from the satellite;

a satellite repeat apparatus which is arranged in the satellite to simultaneously receive and multiplex said plurality of CDM broadcasting signals sent from said plurality of ground transmission apparatuses, send the multiplexed CDM broadcasting signals to a service area on the ground, produce the phase difference information signal by detecting a phase difference between the channels of the spreading codes in each of said plurality of CDM broadcasting signals, and transmit the phase difference information signal to said plurality of ground transmission apparatuses; and a reception terminal apparatus which receives said plurality of CDM broadcasting signals multiplexed and sent to the service area, selectively generates a spreading code corresponding to a designated channel, and separates a broadcasting signal of the designated channel from said plurality of CDM broadcasting signals by despreading the spectra of the CDM broadcasting signals using the spreading code.

57. A ground transmission apparatus included in the system according to claim 55, which comprises:

a generation unit which generates the spreading codes for said plurality of channels;

a multiplex unit which spreads spectra of the broadcasting signals of said plurality of channels using the spreading codes generated by the generation unit and produces the CDM broadcasting signal by synthesizing the spread signals;

a sending unit which sends the CDM broadcasting signal to the satellite;

a reception unit which receives the phase difference information signal transmitted from the satellite; and a control unit which controls to set the phase relationship between the spreading codes in a predetermined synchronization state between the channels on the basis of the phase difference information signal.

58. A satellite repeat apparatus included in the system according to claim 55, which comprises:

a reception unit which simultaneously receives the CDM (Code Division Multiplex) broadcasting signals sent from said plurality of ground transmission stations;

a multiplex unit which multiplexes said plurality of CDM broadcasting signals simultaneously received by the reception unit;

a first sending unit which sends said plurality of CDM broadcasting signals multiplexed by the multiplex unit to the service area on the ground;

production unit which produces the phase difference information signal by detecting the phase difference between the channels of the spreading codes in each of said plurality of CDM broadcasting signals; and a second sending unit which sends the phase difference information signal produced by the production unit to said plurality of ground transmission apparatuses.

59. A reception terminal apparatus included in the system according to claim 55, which comprises:

a reception unit which receives said plurality of CDM broadcasting signals sent from the satellite repeat apparatus to the service area on the ground;

a generation unit which selectively generates the spreading code corresponding to the designated channel from the spreading codes for said plurality of channels in each of said plurality of CDM broadcasting signals; and a separation unit which separates the broadcasting signal of the designated channel from said plurality of CDM broadcasting signals by despreading the spectra of said plurality of CDM broadcasting signals received by the reception unit using the spreading code generated by the generation unit.

60. A broadcasting method of providing a broadcasting signal to a reception terminal apparatus using a satellite, comprising:

causing each of a plurality of ground transmission apparatuses to spread the spectra of a plurality of broadcasting signals using spreading codes which are different for channels, produce a CDM (Code Division Multiplex) broadcasting signal by synthesizing the spread signals, send the CDM broadcasting signal to the satellite, and control to set a phase relationship between the spreading codes in a predetermined synchronization state between the channels on the basis of a phase difference information signal transmitted from the satellite;

causing the satellite to simultaneously receive and multiplex said plurality of CDM broadcasting signals sent from said plurality of ground transmission apparatuses, send the multiplexed CDM broadcasting signals to a service area on the ground, produce the phase difference information signal by detecting a phase difference between the channels of the spreading codes in each of said plurality of CDM broadcasting signals, and transmit the phase difference information signal to said plurality of ground transmission apparatuses; and causing a reception terminal apparatus to receive said plurality of CDM broadcasting signals multiplexed and sent to the service area, selectively generate a spreading code corresponding to a designated channel, and separate a broadcasting signal of the designated channel from said plurality of CDM broadcasting signals by despreading the spectra of the CDM broadcasting signals using the spreading code.

61. A satellite broadcasting method comprising:

arranging a pair of satellites on a single orbit while being separated by a predetermined distance and sending identical broadcasting signals synchronized with each other to a single service area.

62. A broadcasting system using a satellite, comprising:

a ground transmission apparatus which sends a broadcasting signal to the satellite;

a satellite repeat apparatus which is arranged in the satellite to receive the broadcasting signal sent from the ground transmission apparatus, produce broadcasting signals in first and second frequency bands different from each other from the received broadcasting signal, and send the broadcasting signals to a single service area;

a gap filler apparatus which is arranged in the service area to receive the broadcasting signal sent from the satellite in the second frequency band, convert the received broadcasting signal into a broadcasting signal in the first frequency band, and radio-transmit the broadcasting signal to an arbitrary area in the service area; and a reception terminal apparatus which receives the broadcasting signal in the first frequency band in the service area.

63. A system according to claim 62, wherein when both the broadcasting signals in the first frequency band, which are sent from the satellite and the gap filler apparatus, are receivable, the reception terminal apparatus receives and synthesizes the signals.

64. A system according to claim 62, wherein the first frequency band is an S band, and the second frequency band is a frequency band higher than the S band.

65. A satellite repeat apparatus included in the system according to claim 62, which comprises:

a reception unit which receives the broadcasting signal sent from the ground transmission apparatus;

a production unit which produces the broadcasting signals in the first and second frequency bands different from each other from the received broadcasting signal; and a transmission unit which sends the broadcasting signals in the first and second frequency bands to the single service area.

66. An apparatus according to claim 65, wherein the first frequency band is an S band, and the second frequency band is a frequency band higher than the S band.

67. A gap filler apparatus included in the system according to claim 62, which comprises:

a reception unit which receives the broadcasting signal sent from the satellite in the second frequency band;

a conversion unit which converts the received broadcasting signal into the broadcasting signal in the first frequency band; and a transmission unit which radio-transmits the broadcasting signal in the first frequency band to the arbitrary area in the service area.

68. An apparatus according to claim 67, wherein the first frequency band is an S band, and the second frequency band is a frequency band higher than the S band.

69. A reception terminal apparatus included in the system according to claim 62, which comprises:

an antenna which receives the signal in the first frequency band in the service area; and a signal processing unit which extracts and plays back the broadcasting signal from the reception signal of the antenna.

70. An apparatus according to claim 69, wherein when both the broadcasting signals in the first frequency band, which are sent from the satellite and the gap filler apparatus, are receivable, the signal processing unit synthesizes the signals.

71. A broadcasting method using a satellite, comprising:

causing a ground transmission apparatus to send a broadcasting signal to the satellite;

causing the satellite to receive the broadcasting signal sent from the ground transmission apparatus, produce broadcasting signals in first and second frequency bands different from each other from the received broadcasting signal, and send the broadcasting signals to a single service area;

causing a gap filler apparatus in the service area to receive the broadcasting signal sent from the satellite in the second frequency band, convert the received broadcasting signal into a broadcasting signal in the first frequency band, and radio-transmit the broadcasting signal to an arbitrary area in the service area; and causing a reception terminal apparatus in the service area to receive the broadcasting signal in the first frequency band in the service area.

72. A broadcasting system using a satellite, comprising:

a ground transmission apparatus which produces first and second broadcasting signals having the same contents and sends the first and second broadcasting signals to the satellite;

a satellite repeat apparatus which is arranged in the satellite to receive the first and second broadcasting signals sent from the ground transmission apparatus, convert the first and second broadcasting signals into broadcasting signals in first and second frequency bands different from each other, and send the broadcasting signals to a single service area;

a gap filler apparatus which is arranged in the service area to receive the broadcasting signal sent from the satellite in the second frequency band, convert the received broadcasting signal into a broadcasting signal in the first frequency band, and radio-transmit the broadcasting signal to an arbitrary area in the service area; and a reception terminal apparatus which receives the broadcasting signal in the first frequency band in the service area.

73. A system according to claim 72, wherein when both the broadcasting signals in the first frequency band, which are sent from the satellite and the gap filler apparatus, are receivable, the reception terminal apparatus receives and synthesizes the signals.

74. A system according to claim 72, wherein the first frequency band is an S band, and the second frequency band is a frequency band higher than the S band.

75. A ground transmission apparatus included in the system according to claim 72, which comprises:

a production unit which produces the first and second broadcasting signals having the same contents; and a transmission unit which discriminatively sends the first and second broadcasting signals to the satellite.

76. A satellite repeat apparatus included in the system according to claim 72, which comprises:

a reception unit which receives the first and second broadcasting signals sent from the ground transmission apparatus;

a conversion unit which converts the received first and second broadcasting signals into the broadcasting signals in the first and second frequency bands different from each other; and a transmission unit which sends the broadcasting signals in the first and second frequency bands to the single service area.

77. An apparatus according to claim 76, wherein the first frequency band is an S band, and the second frequency band is a frequency band higher than the S band.

78. A gap filler apparatus included in the system according to claim 72, which comprises:

a reception unit which receives the broadcasting signal sent from the satellite in the second frequency band;

a conversion unit which converts the received broadcasting signal into the broadcasting signal in the first frequency band; and a transmission unit which radio-transmits the broadcasting signal in the first frequency band to the arbitrary area in the service area.

79. An apparatus according to claim 78, wherein the first frequency band is an S band, and the second frequency band is a frequency band higher than the S band.

80. A reception terminal apparatus included in the system according to claim 72, which comprises:

an antenna which receives the signal in the first frequency band in the service area; and a signal processing unit which extracts and plays back the broadcasting signal from the reception signal of the antenna.

81. An apparatus according to claim 80, wherein when both the broadcasting signals in the first frequency band, which are sent from the satellite and the gap filler apparatus, are receivable, the signal processing unit synthesizes the signals.

82. A broadcasting method using a satellite, comprising:

causing a ground transmission apparatus to produce first and second broadcasting signals having the same contents and send the signals to the satellite;

causing the satellite to receive the first and second broadcasting signals sent from the ground transmission apparatus, convert the first and second broadcasting signals into broadcasting signals in first and second frequency bands different from each other, and send the broadcasting signals to a single service area;

causing a gap filler apparatus arranged in the service area to receive the broadcasting signal sent from the satellite in the second frequency band, convert the received broadcasting signal into a broadcasting signal in the first frequency band, and radio-transmit the broadcasting signal to an arbitrary area in the service area; and causing a reception terminal apparatus to receive the broadcasting signal in the first frequency band in the service area.

83. A broadcasting system using a satellite, comprising:

a ground transmission apparatus which produces first and second broadcasting signals having the same contents, sends the first broadcasting signal to the satellite, and sends the second broadcasting signal to a ground communication line;

a satellite repeat apparatus which is arranged in the satellite to receive the first broadcasting signal sent from the ground transmission apparatus, convert the received first broadcasting signal into a predetermined frequency band, and send the signal to a service area;

a gap filler apparatus which is arranged in the service area to receive the second broadcasting signal from the ground transmission apparatus through the ground communication line, convert the second broadcasting signal into a broadcasting signal in the predetermined frequency band, and radio-transmit the broadcasting signal to an arbitrary area in the service area; and a reception terminal apparatus which receives the broadcasting signal in the predetermined frequency band in the service area.

84. A ground transmission apparatus included in the system according to claim 83, which comprises:

a production unit which produces the first and second broadcasting signals having the same contents;

a first transmission unit which sends the first broadcasting signal to the satellite; and a second transmission unit which sends the second broadcasting signal to the ground communication line.

85. A gap filler apparatus included in the system according to claim 83, which comprises:

a reception unit which receives the second broadcasting signal from the ground transmission apparatus through the ground communication line;

a conversion unit which converts the received second broadcasting signal into the broadcasting signal in the predetermined frequency band; and a transmission unit which radio-transmits the second broadcasting signal converted to the predetermined frequency band to the arbitrary area in the service area.

86. A reception terminal apparatus included in the system according to claim 83, which comprises:

an antenna which receives the signal in the predetermined frequency band in the service area; and a signal processing unit which extracts and plays back the broadcasting signal from the reception signal of the antenna.

87. A broadcasting method using a satellite, comprising:

causing a ground transmission apparatus to produce first and second broadcasting signals having the same contents, send the first broadcasting signal to the satellite, and send the second broadcasting signal to a ground communication line;

causing the satellite to receive the first broadcasting signal sent from the ground transmission apparatus, convert the received first broadcasting signal into a broadcasting signal in a predetermined frequency band, and send the broadcasting signal to a service area;

causing a gap filler apparatus arranged in the service area to receive the second broadcasting signal from the ground transmission apparatus through the ground communication line, convert the second broadcasting signal into a broadcasting signal in the predetermined frequency band, and radio-transmit the broadcasting signal to an arbitrary area in the service area; and causing a reception terminal apparatus to receive, in the service area, the broadcasting signal in the predetermined frequency band.

88. A broadcasting system using a satellite, comprising:

a ground transmission apparatus which produces first and second broadcasting signals having the same contents, sends the first broadcasting signal to a first satellite, and sends the second broadcasting signal to a second satellite different from the first satellite;

a first satellite repeat apparatus which is arranged in the first satellite to receive the first broadcasting signal sent from the ground transmission apparatus, convert the received first broadcasting signal into a broadcasting signal in a first frequency band, and send the broadcasting signal to a service area;

a second satellite repeat apparatus which is arranged in the second satellite to receive the second broadcasting signal sent from the ground transmission apparatus, convert the received second broadcasting signal into a broadcasting signal in a second frequency band different from the first frequency band, and send the broadcasting signal to the service area;

a gap filler apparatus which is arranged in the service area to receive the second broadcasting signal in the second frequency band, convert the second broadcasting signal into a broadcasting signal in the first frequency band, and radio-transmit the broadcasting signal to an arbitrary area in the service area; and a reception terminal apparatus which receives the broadcasting signal in the first frequency band in the service area.

89. A ground transmission apparatus included in the system according to claim 88, which comprises:

a production unit which produces the first and second broadcasting signals having the same contents;

a first transmission unit which sends the first broadcasting signal to the first satellite; and a second transmission unit which sends the second broadcasting signal to the second satellite different from the first satellite.

90. A first satellite repeat apparatus included in the system according to claim 88, which comprises:

a reception unit which receives the first broadcasting signal sent from the ground transmission apparatus;

a conversion unit which converts the received first broadcasting signal into the broadcasting signal in the first frequency band; and a transmission unit which sends the broadcasting signal in the first frequency band to the service area.

91. A second satellite repeat apparatus included in the system according to claim 88, which comprises:

a reception unit which receives the second broadcasting signal sent from the ground transmission apparatus;

a conversion unit which converts the received second broadcasting signal into the broadcasting signal in the second frequency band; and a transmission unit which sends the broadcasting signal in the second frequency band to the service area.

92. A gap filler apparatus included in the system according to claim 88, which comprises:

a reception unit which receives the second broadcasting signal in the second frequency band;

a conversion unit which converts the received second broadcasting signal into the broadcasting signal in the first frequency band; and a transmission unit which radio-transmits the second broadcasting signal converted to the first frequency band to the arbitrary area in the service area.

93. A reception terminal apparatus included in the system according to claim 88, which comprises:

an antenna which receives the signal in the first frequency band; and a signal processing unit which extracts and plays back the broadcasting signal from the reception signal of the antenna.

94. A broadcasting method using a satellite, comprising:

causing a ground transmission apparatus to produce first and second broadcasting signals having the same contents, send the first broadcasting signal to a first satellite, and send the second broadcasting signal to a second satellite different from the first satellite;

causing the first satellite to receive the first broadcasting signal sent from the ground transmission apparatus, convert the received first broadcasting signal into a broadcasting signal in a first frequency band, and send the broadcasting signal to a service area;

causing the second satellite to receive the second broadcasting signal sent from the ground transmission apparatus, convert the received second broadcasting signal into a broadcasting signal in a second frequency band different from the first frequency band, and send the broadcasting signal to the service area;

causing a gap filler apparatus arranged in the service area to receive the second broadcasting signal in the second frequency band, convert the second broadcasting signal into a broadcasting signal in the first frequency band, and radio-transmit the broadcasting signal to an arbitrary area in the service area; and causing a reception terminal apparatus in the service area to receive the broadcasting signal in the first frequency band.

95. A broadcasting system using a satellite, comprising:

a ground transmission apparatus which produces first and second broadcasting signals having the same contents, sends the first broadcasting signal and the second broadcasting signal to the satellite, and sends the second broadcasting signal to a ground communication line;

a satellite repeat apparatus which is arranged in the satellite to receive the first and second broadcasting signals sent from the ground transmission apparatus, convert the received first broadcasting signal into a first frequency band, convert the second broadcasting signal into a second frequency band different from the first frequency band, and send the broadcasting signals to a service area;

a gap filler apparatus which is arranged in the service area to receive the second broadcasting signal in the second frequency band sent from the satellite, receive the second broadcasting signal from the ground transmission apparatus through the ground communication line, select one of the second broadcasting signals, convert the selected second broadcasting signal into a broadcasting signal in the first frequency band, and radio-transmit the broadcasting signal to an arbitrary area in the service area; and a reception terminal apparatus which receives the broadcasting signal in the first frequency band in the service area.

96. A ground transmission apparatus included in the system according to claim 95, which comprises:

a production unit which produces the first and second broadcasting signals having the same contents;

a first transmission unit which sends the first and second broadcasting signals to the satellite; and a second transmission unit which sends the second broadcasting signal to the ground communication line.

97. A satellite repeat apparatus included in the system according to claim 95, which comprises:

a reception unit which receives the first and second broadcasting signals sent from the ground transmission apparatus;

a conversion unit which converts the received first broadcasting signal into the first frequency band and converts the second broadcasting signal into the second frequency band different from the first frequency band; and a transmission unit which sends the first broadcasting signal in the first frequency band and the second broadcasting signal in the second frequency band to the service area.

98. A gap filler apparatus included in the system according to claim 95, which comprises:

a first reception unit which receives the second broadcasting signal in the second frequency band sent from the satellite;

a second reception unit which receives the second broadcasting signal from the ground transmission apparatus through the ground communication line;

a selection unit which selects one of the second broadcasting signal received by the first reception unit and the second broadcasting signal received by the second reception unit;

a conversion unit which converts the second broadcasting signal selected by the selection unit into the broadcasting signal in the first frequency band; and a transmission unit which radio-transmits the second broadcasting signal converted to the first frequency band to the arbitrary area in the service area.

99. An apparatus according to claim 98, wherein the selection unit selects the reception signal of the first reception unit when a reception level of the first reception unit equals an allowable level and selects the reception signal of the second reception unit when the reception level is lower than the allowable level.

100. A reception terminal apparatus included in the system according to claim 95, which comprises:

an antenna which receives the signal in the first frequency band in the service area; and a signal processing unit which extracts and plays back the broadcasting signal from the reception signal of the antenna.

101. A broadcasting method using a satellite, comprising:

causing a ground transmission apparatus to produce first and second broadcasting signals having the same contents, send the first broadcasting signal and the second broadcasting signal to the satellite, and send the second broadcasting signal to a ground communication line;

causing the satellite to receive the first broadcasting signal and the second broadcasting signal sent from the ground transmission apparatus, convert the received first broadcasting signal into a broadcasting signal in a first frequency band, convert the second broadcasting signal into a broadcasting signal in the second frequency band, and send the broadcasting signals to a service area;

causing a gap filler apparatus arranged in the service area to receive the second broadcasting signal in the second frequency band sent from the satellite, receive the second broadcasting signal from the ground transmission apparatus through the ground communication line, select one of a reception signal on the satellite side and a reception signal on the ground communication line side, convert the selected second broadcasting signal into a broadcasting signal in the first frequency band, and radio-transmit the broadcasting signal to an arbitrary area in the service area; and causing a reception terminal apparatus to receive the broadcasting signal in the first frequency band in the service area.

102. A broadcasting system using a satellite, comprising:

a ground transmission apparatus which sends a broadcasting signal to the satellite;

a satellite repeat apparatus which is arranged in the satellite to receive the broadcasting signal sent from the ground transmission apparatus and send the received broadcasting signal to a service area;

a gap filler apparatus which is arranged in the service area to transmit the broadcasting signal sent from the satellite to an arbitrary area in the service area, produce monitor information representing an operation state of the gap filler apparatus, and send the monitor information to a communication line;

a monitor apparatus which is connected to the gap filler apparatus through the communication line to receive the monitor information sent from the gap filler apparatus, monitor the operation state of the gap filler apparatus on the basis of the monitor information, and execute predetermined processing; and a reception terminal apparatus which receives the broadcasting signal in the service area.

103. A gap filler apparatus included in the system according to claim 102, which comprises:

a reception unit which receives the broadcasting signal sent from the satellite;

a first transmission unit which transmits the received broadcasting signal to the arbitrary area;

a production unit which produces the monitor information; and a second transmission unit which sends the monitor information to the monitor apparatus periodically or in accordance with a request.

104. An apparatus according to claim 103, further comprising:

abnormality detection means for detecting an abnormality of the gap filler apparatus, wherein the production unit produces the monitor information on the basis of a detection result of the abnormality detection means, and the second transmission unit sends the monitor information to the monitor apparatus when the abnormality is detected by the abnormality detection means.

105. An apparatus according to claim 103, further comprising:

abnormality detection means for detecting an abnormality of the gap filler apparatus; and generation means for generating abnormality detection message information when the abnormality is detected by the abnormality detection means, wherein the first transmission unit transmits, to the area, the abnormality detection message information independently or multiplexed with the received broadcasting signal.

106. A reception terminal apparatus included in the system according to claim 102, wherein when the abnormality detection message information is transmitted independently or multiplexed with the broadcasting signal from the gap filler apparatus, the reception terminal apparatus receives the abnormality detection message information and shows the abnormality detection message of the received information.

107. A monitor apparatus included in the system according to claim 102, which comprises:

a reception unit which receives the monitor information transmitted from the gap filler apparatus through the communication line; and a processing unit which monitors the operation state of the gap filler apparatus on the basis of the monitor information and executes the predetermined processing.

108. An apparatus according to claim 107, further comprising request means for requesting the monitor information of the gap filler apparatus through the communication line.

109. A broadcasting method using a satellite, comprising:

causing a ground transmission apparatus to send a broadcasting signal to the satellite;

causing the satellite to receive the broadcasting signal sent from the ground transmission apparatus and send the received broadcasting signal to a service area;

causing a gap filler apparatus arranged in the service area to transmit the broadcasting signal sent from the satellite to an arbitrary area in the service area, produce monitor information representing an operation state of the gap filler apparatus, and send the monitor information to a communication line; and causing a monitor apparatus connected to the gap filler apparatus through the communication line to receive the monitor information sent from the gap filler apparatus, monitor the operation state of the gap filler apparatus on the basis of the monitor information, and execute predetermined processing.

110. A broadcasting system using a satellite, comprising:

a ground transmission apparatus which sends a broadcasting signal to the satellite;

a satellite repeat apparatus which is arranged in the satellite to receive the broadcasting signal sent from the ground transmission apparatus and send the received broadcasting signal to a service area;

a gap filler apparatus which is arranged in the service area to transmit the broadcasting signal sent from the satellite to an arbitrary area in the service area, produce monitor information representing an operation state of the gap filler apparatus, and send the monitor information to the arbitrary area;

an auxiliary apparatus which is arranged in the arbitrary area to receive the monitor information sent from the gap filler apparatus and send the monitor information to a communication line;

a monitor apparatus which is connected to the auxiliary apparatus through the communication line to receive the monitor information sent from the auxiliary apparatus, monitor the operation state of the gap filler apparatus on the basis of the monitor information, and execute predetermined processing; and a reception terminal apparatus which receives the broadcasting signal in the service area.

111. A gap filler apparatus included in the system according to claim 110, which comprises:

a reception unit which receives the broadcasting signal sent from the satellite;

a production unit which produces the monitor information; and a transmission unit which transmits the received broadcasting signal and the monitor information to the arbitrary area.

112. An apparatus according to claim 111, further comprising:

abnormality detection means for detecting an abnormality of the gap filler apparatus, wherein the production unit produces the monitor information on the basis of a detection result of the abnormality detection means, and the transmission unit sends the monitor information periodically or when the abnormality is detected by the abnormality detection means.

113. An apparatus according to claim 111, further comprising:
abnormality detection means for detecting an abnormality of the gap filler apparatus; and
generation means for generating abnormality detection message information when the abnormality is detected by the abnormality detection means,
wherein the transmission unit transmits, to the area, the abnormality detection message information multiplexed with the received broadcasting signal.

114. A reception terminal apparatus included in the system according to claim 110, wherein
when the abnormality detection message information is transmitted independently or multiplexed with the broadcasting signal from the gap filler apparatus, the reception terminal apparatus receives the abnormality detection message information and shows the abnormality detection message of the received information.

115. An auxiliary apparatus included in the system according to claim 110, which comprises:
a reception unit which receives the monitor information sent from the gap filler apparatus; and
a transmission unit which sends the monitor information to the monitor apparatus.

116. An apparatus according to claim 115, wherein the transmission unit sends the monitor information when the monitor information is received, periodically, of in accordance with a request from the monitor apparatus.

117. A monitor apparatus included in the system according to claim 110, which comprises:
a reception unit which receives the monitor information sent from the auxiliary apparatus through the communication line; and
a processing unit which monitors the operation state of the gap filler apparatus on the basis of the monitor information and executes the predetermined processing.

118. An apparatus according to claim 117, further comprising
request means for requesting the monitor information of the auxiliary apparatus through the communication line.

119. A broadcasting method using a satellite, comprising:
causing a ground transmission apparatus to send a broadcasting signal to the satellite;
causing the satellite to receive the broadcasting signal sent from the ground transmission apparatus and send the received broadcasting signal to a service area;
causing a gap filler apparatus arranged in the service area to transmit the broadcasting signal sent from the satellite to an arbitrary area in the service area, produce monitor information representing an operation state of the gap filler apparatus, and send the monitor information to the arbitrary area;
causing an auxiliary apparatus arranged in the arbitrary area to receive the monitor information sent from the gap filler apparatus and send the monitor information to a communication line; and
causing a monitor apparatus connected to the auxiliary apparatus through the communication line to receive the monitor information sent from the auxiliary apparatus, monitor the operation state of the gap filler apparatus on the basis of the monitor information, and execute predetermined processing.

120. A broadcasting system using a satellite, comprising:
a ground transmission apparatus which sends broadcasting signals of a plurality of channels having different frequencies to the satellite;
a satellite repeat apparatus which is arranged in the satellite to receive the broadcasting signals of said plurality of channels sent from the ground transmission apparatus, classify the broadcasting signals into right-circularly polarized waves and left-circularly polarized waves in accordance with the frequency of each channel, and send the broadcasting signal of each channel to a predetermined service area in accordance with the classified circularly polarized wave; and
a reception terminal apparatus which selectively receives, in the service area, one of the broadcasting signal of the right-circularly polarized wave and the broadcasting signal of the left-circularly polarized wave sent from the satellite.

121. A system according to claim 120, wherein the satellite repeat apparatus code-division-multiplexes the classified broadcasting signals and sends the broadcasting signals, and
the reception terminal apparatus receives the code-division-multiplexed broadcasting signals.

122. A ground transmission apparatus included in the system according to claim 120, which comprises:
a production unit which produces classification information to be used to classify the broadcasting signals of said plurality of channels into the right-circularly polarized waves and the left-circularly polarized waves; and
a transmission unit which sends the classification information to the satellite together with the broadcasting signals of said plurality of channels.

123. A satellite repeat apparatus included in the system according to claim 120, which comprises:
a reception unit which receives the broadcasting signals of said plurality of channels sent from the ground transmission apparatus;
a classification unit which classifies the broadcasting signals into the right-circularly polarized waves and the left-circularly polarized waves in accordance with the frequency of each channel; and
a transmission unit which sends the broadcasting signal of each channel to the predetermined service area in accordance with the classified circularly polarized wave.

124. An apparatus according to claim 123, wherein the transmission unit code-division-multiplexes the classified broadcasting signals of the respective channels and sends the broadcasting signals.

125. A reception terminal apparatus included in the system according to claim 120, which comprises:
an antenna to receive, in the service area, the broadcasting signals of said plurality of channels by one of the right-circularly polarized wave and the left-circularly polarized wave sent from the satellite;
a reception unit which receives a broadcasting signal of an arbitrary channel from the broadcasting signals of said plurality of channels received by the antenna; and
a playback unit which plays back the broadcasting signal of the received channel.

126. An apparatus according to claim 125, wherein the broadcasting signals of said plurality of channels are signals multiplexed by code division multiplex.

127. An apparatus according to claim 125, further comprising a selection unit which selects a type of circularly polarized wave to be received by the antenna.

128. An apparatus according to claim 125, further comprising:
- a microphone which converts voice of a user into a speech signal;
- a speech recognition unit which recognizes, from the speech signal, operation contents designated by the user; and
- a control unit which controls the reception unit and the playback unit in accordance with the recognized operation contents.

129. An apparatus according to claim 128, further comprising:
- a storage unit which stores voiceprint data of a specific user;
- a voiceprint data extraction unit which extracts the voiceprint data from a speech signal obtained from the microphone; and
- an identification unit which compares the extracted voiceprint data with the voiceprint data stored in the storage unit and identifies on the basis of a comparison result whether the user is the specific user,
- wherein when the identification unit identifies that the user is not the specific user, the control unit limits control of specific operation.

130. An apparatus according to claim 125, wherein the playback unit hierarchically visually displays contents of the received channel.

131. An apparatus according to claim 125, further comprising:
- a date/time acquisition unit which acquires date/time data;
- a viewing data production unit which discriminates the channel received by the reception unit, receives date/time data of the reception from the date/time acquisition unit, and produces viewing data from a discrimination result of the channel and the date/time data; and
- a recording unit which records the viewing data on a data recording medium.

132. A broadcasting method using a satellite, comprising:
- causing a ground transmission apparatus to send broadcasting signals of a plurality of channels having different frequencies to the satellite;
- causing the satellite to receive the broadcasting signals of said plurality of channels sent from the ground transmission apparatus, classify the broadcasting signals into right-circularly polarized waves and left-circularly polarized waves in accordance with the frequency of each channel, and send the broadcasting signal of each channel to a predetermined service area in accordance with the classified circularly polarized wave; and
- causing a reception terminal apparatus arranged in the service area to selectively receive one of the broadcasting signal of the right-circularly polarized wave and the broadcasting signal of the left-circularly polarized wave sent from the satellite.

133. A broadcasting system using a satellite, comprising:
- a ground transmission apparatus which sends broadcasting signals of a plurality of channels having different frequencies to the satellite;
- a satellite repeat apparatus which is arranged in the satellite to receive the broadcasting signals of said plurality of channels sent from the ground transmission apparatus, classify the broadcasting signals into vertically polarized waves and horizontally polarized waves in accordance with the frequency of each channel, and send the broadcasting signal of each channel to a predetermined service area in accordance with the classified polarized wave; and
- a reception terminal apparatus which selectively receives, in the service area, one of the broadcasting signal of the vertically polarized wave and the broadcasting signal of the horizontally polarized wave sent from the satellite.

134. A system according to claim 133, wherein
- the satellite repeat apparatus code-division-multiplexes the classified broadcasting signals and sends the broadcasting signals, and
- the reception terminal apparatus receives the code-division-multiplexed broadcasting signals.

135. A ground transmission apparatus included in the system according to claim 133, which comprises:
- a production unit which produces classification information to be used to classify the broadcasting signals of said plurality of channels into the vertically polarized waves and the horizontally polarized waves; and
- a transmission unit which sends the classification information to the satellite together with the broadcasting signals of said plurality of channels.

136. A satellite repeat apparatus included in the system according to claim 133, which comprises:
- a reception unit which receives the broadcasting signals of said plurality of channels sent from the ground transmission apparatus;
- a classification unit which classifies the broadcasting signals into the vertically polarized waves and the horizontally polarized waves in accordance with the frequency of each channel; and
- a transmission unit which sends the broadcasting signal of each channel to the predetermined service area in accordance with the classified polarized wave.

137. An apparatus according to claim 136, wherein the transmission unit code-division-multiplexes the classified broadcasting signals of the respective channels and sends the broadcasting signals.

138. A reception terminal apparatus included in the system according to claim 133, which comprises:
- an antenna to receive, in the service area, the broadcasting signals of said plurality of channels by one of the vertically polarized wave and the horizontally polarized wave sent from the satellite;
- a reception unit which receives a broadcasting signal of an arbitrary channel from the broadcasting signals of said plurality of channels received by the antenna; and
- a playback unit which plays back the broadcasting signal of the received channel.

139. An apparatus according to claim 138, wherein the broadcasting signals of said plurality of channels are signals multiplexed by code division multiplex.

140. An apparatus according to claim 138, further comprising a selection unit which selects a type of polarized wave to be received by the antenna.

141. An apparatus according to claim 138, further comprising:
- a microphone which converts voice of a user into a speech signal;
- a speech recognition unit which recognizes, from the speech signal, operation contents designated by the user; and
- a control unit which controls the reception unit and the playback unit in accordance with the recognized operation contents.

142. An apparatus according to claim 138, further comprising:
  a storage unit which stores voiceprint data of a specific user;
  a voiceprint data extraction unit which extracts the voiceprint data from a speech signal obtained from the microphone; and
  an identification unit which compares the extracted voiceprint data with the voiceprint data stored in the storage unit and identifies on the basis of a comparison result whether the user is the specific user,
  wherein when the identification unit identifies that the user is not the specific user, the control unit limits control of specific operation.

143. An apparatus according to claim 138, wherein the playback unit hierarchically visually displays contents of the received channel.

144. An apparatus according to claim 138, further comprising:
  a date/time acquisition unit which acquires date/time data;
  a viewing data production unit which discriminates the channel received by the reception unit, receives date/time data of the reception from the date/time acquisition unit, and produces viewing data from a discrimination result of the channel and the date/time data; and
  a recording unit which records the viewing data in a data recording medium.

145. A broadcasting method using a satellite, comprising:
  causing a ground transmission apparatus to send broadcasting signals of a plurality of channels having different frequencies to the satellite;
  causing the satellite to receive the broadcasting signals of said plurality of channels sent from the ground transmission apparatus, classify the broadcasting signals into vertically polarized waves and horizontally polarized waves in accordance with the frequency of each channel, and send the broadcasting signal of each channel to a predetermined service area in accordance with the classified polarized wave; and
  causing a reception terminal apparatus arranged in the service area to selectively receive one of the broadcasting signal of the vertically polarized wave and the broadcasting signal of the horizontally polarized wave sent from the satellite.

146. A broadcasting system using a satellite, comprising:
  a ground transmission apparatus which sends digital signals of a plurality of channels to the satellite;
  a satellite repeat apparatus which is arranged in the satellite to receive the digital signals of said plurality of channels sent from the ground transmission station and send the received digital signals of said plurality of channels totally or divisionally to a plurality of service areas by a plurality of transmission beams; and
  a reception terminal apparatus which receives the transmission beams in one of said plurality of service areas and selectively extracts and plays back the digital signals of said plurality of channels.

147. A system according to claim 146, wherein a sent signal from the ground transmission apparatus and a sent signal from the satellite repeat apparatus have different frequency bands.

148. A system according to claim 146, wherein the digital signals of said plurality of channels include a communication channel.

149. A system according to claim 146, wherein the digital signal is content data encoded by MPEG4 (Moving Picture Expert Group 4).

150. A system according to claim 149, wherein the reception terminal apparatus has an MPEG4 decoder.

151. A ground transmission apparatus included in the system according to claim 146, which comprises:
  a multiplex unit which multiplexes the digital signals of said plurality of channels to be broadcast to each of said plurality of service areas; and
  a transmission unit which sends the multiplexed digital signals to the satellite.

152. An apparatus according to claim 151, wherein the digital signal is content data encoded by MPEG4 (Moving Picture Expert Group 4).

153. A satellite repeat apparatus included in the system according to claim 146, which comprises:
  a reception antenna which receives the digital signals of said plurality of channels sent from the ground transmission station;
  a reflection transmission antenna which has a plurality of primary radiators each of which radiates a transmission signal and a reflecting mirror which reflects a radio wave radiated by each primary radiator to form a plurality of independent transmission beams, and in which radiation areas of said plurality of transmission beams are assigned to areas obtained by dividing the service area; and
  a signal processing unit which executes signal conversion and power amplification for each of the digital signals of said plurality of channels received by the reception antenna, assigns the digital signal of each channel to the arbitrary transmission beam, and outputs the digital signal to a corresponding one of the primary radiators as a transmission signal.

154. An apparatus according to claim 153, wherein the signal processing unit frequency-converts the received digital signals of said plurality of channels and outputs the digital signals.

155. An apparatus according to claim 153, wherein said plurality of channels include a communication channel.

156. An apparatus according to claim 153, wherein the digital signal is content data encoded by MPEG4 (Moving Picture Expert Group 4).

157. A reception terminal apparatus included in the system according to claim 146, which comprises:
  a reception unit which receives the signal sent from the satellite and extracts one of the digital signals of said plurality of channels; and
  a playback apparatus which plays back the digital signal of the extracted channel.

158. An apparatus according to claim 157, wherein
  the digital signal is content data encoded by MPEG4 (Moving Picture Expert Group 4), and
  the playback apparatus comprises an MPEG4 decoder to decode the content data.

159. An apparatus according to claim 157, further comprising a reception antenna having a directivity to a direction of the satellite in all-round directions.

160. An apparatus according to claim 159, wherein the reception antenna is a rod antenna.

161. An apparatus according to claim 157, further comprising:
  a microphone which converts voice of a user into a speech signal;
  a speech recognition unit which recognizes, from the speech signal, operation contents designated by the user; and a control unit which controls the reception unit and the playback unit in accordance with the recognized operation contents.

162. An apparatus according to claim 161, further comprising:
- a storage unit which stores voiceprint data of a specific user;
- a voiceprint data extraction unit which extracts the voiceprint data from a speech signal obtained from the microphone; and
- an identification unit which compares the extracted voiceprint data with the voiceprint data stored in the storage unit and identifies on the basis of a comparison result whether the user is the specific user,
- wherein when the identification unit identifies that the user is not the specific user, the control unit limits control of specific operation.

163. An apparatus according to claim 157, wherein the playback unit hierarchically visually displays contents of the received channel.

164. An apparatus according to claim 157, further comprising:
- a date/time acquisition unit which acquires date/time data;
- a viewing data production unit which discriminates the channel received by the reception unit, receives date/time data of the reception from the date/time acquisition unit, and produces viewing data from a discrimination result of the channel and the date/time data; and
- a recording unit which records the viewing data in a data recording medium.

165. A reception terminal apparatus of a satellite broadcasting system which provides broadcasting signals of a plurality of channels, comprising:
- a reception unit which receives the broadcasting signals of said plurality of channels;
- a playback unit which plays back a broadcasting signal of an arbitrary channel from the received broadcasting signals of said plurality of channels;
- an estimation unit which estimates a fatigue state of a driver of a moving body from a moving state of the mobile body on which the reception terminal apparatus is arranged; and
- a control unit which controls to select a predetermined channel of the broadcasting signals of said plurality of channels in accordance with the estimated fatigue state.

166. A satellite broadcasting system comprising:
- a satellite (SAT1) for repeating a broadcasting signal transmitted from a ground broadcasting station (BC1 or BC2) and transmitting the broadcasting signal to a predetermined service area on the ground;
- a plurality of broadcasting receivers (MS) each having a function of receiving and reconstructing the broadcasting signal repeated by said satellite (SAT1) in the service area; and
- a gap filler apparatus (GFa–GFi) for receiving the broadcasting signal repeated by said satellite (SAT1) and transmitting the received broadcasting signal to an area in the service area, where the broadcasting signal from said satellite (SAT1) cannot be received, wherein
- said satellite (SAT1) comprises conversion means for converting the broadcasting signal transmitted from the ground broadcasting station (BC1 or BC2) into first and second broadcasting signals having different frequencies and radio-transmitting the first and second broadcasting signals, and
- said gap filler apparatus (GFa–GFi) comprises means for receiving the second broadcasting signal transmitted from said satellite (SAT1) and converting the second broadcasting signal into a third broadcasting signal having the same frequency as that of the first broadcasting signal, and means for radio-transmitting the third broadcasting signal to the area in the service area, where the first broadcasting signal from the satellite (SAT1) cannot be received.

167. A satellite broadcasting system according to claim 166, wherein said broadcasting receiver (MS) further comprises means for receiving the first broadcasting signal and the third broadcasting signal and synthesizing the first and third broadcasting signals.

168. A satellite broadcasting system according to claim 166, wherein said conversion means of said satellite (SAT1) converts the broadcasting signal transmitted from the ground broadcasting station (BC1 or BC2) into the first broadcasting signal in an S band and the second broadcasting signal in a frequency band higher than the S band, transmits the first broadcasting signal as a signal for said broadcasting receiver (MS), and simultaneously transmits the second broadcasting signal as a signal for said gap filler apparatus (GFa–GFi).

* * * * *